US010507748B2

(12) United States Patent
Watanabe

(10) Patent No.: US 10,507,748 B2
(45) Date of Patent: Dec. 17, 2019

(54) SEAT FOR VEHICLE

(71) Applicant: TS TECH CO., LTD., Asaka-shi, Saitama (JP)

(72) Inventor: Masato Watanabe, Tochigi (JP)

(73) Assignee: TS TECH CO., LTD., Saitama (JP)

(*) Notice: Subject to any disclaimer, the term of this patent is extended or adjusted under 35 U.S.C. 154(b) by 0 days.

(21) Appl. No.: 16/287,477

(22) Filed: Feb. 27, 2019

(65) Prior Publication Data

US 2019/0193593 A1    Jun. 27, 2019

Related U.S. Application Data

(63) Continuation of application No. 15/829,019, filed on Dec. 1, 2017, now Pat. No. 10,272,801, which is a
(Continued)

(30) Foreign Application Priority Data

Nov. 30, 2012 (JP) ................... 2012-262323
Dec. 21, 2012 (JP) ................... 2012-279193
(Continued)

(51) Int. Cl.
*B60N 2/68* (2006.01)
*B60N 2/06* (2006.01)
(Continued)

(52) U.S. Cl.
CPC ............. *B60N 2/68* (2013.01); *B60N 2/06* (2013.01); *B60N 2/062* (2013.01); *B60N 2/12* (2013.01);
(Continued)

(58) Field of Classification Search
CPC . B60N 2/688; B60N 2/22; B60N 2/12; B60N 2/68; B60N 2/06; B60R 22/26; B60R 2022/1818; B60R 22/00
(Continued)

(56) References Cited

U.S. PATENT DOCUMENTS 1,247,521 A * 11/1917 Fischer ............... B60N 2/0715
297/344.1
4,057,214 A * 11/1977 Harder, Jr. ............ B60N 2/242
248/634
(Continued)

FOREIGN PATENT DOCUMENTS

CN    101791953 A    8/2010
CN    102233832 A    11/2011
(Continued)

OTHER PUBLICATIONS

International Search Report issued in PCT/JP2013/080543 (dated Feb. 10, 2014).
(Continued)

*Primary Examiner* — Milton Nelson, Jr.
(74) *Attorney, Agent, or Firm* — Hamre, Schumann, Mueller & Larson, P.C.

(57) ABSTRACT

A vehicle seat is provided in which a seat back is constrained from tilting down when a seat cushion is moved to a position in which the seat back cannot be tilted down. The vehicle seat includes a base frame, a seat cushion frame (3) horizontally movable relative to the base frame between a first position and a second position different from the first position, a seat back frame (4) rotatable relative to the seat cushion frame (3), a lock member (5) configured to constrain the seat back frame (4) from tilting rearward, and an unlock mechanism (6) configured to release a lock applied by the lock member (5) when the seat cushion frame (3) is moved from the first position to the second position.

7 Claims, 40 Drawing Sheets

Related U.S. Application Data continuation of application No. 14/648,142, filed as application No. PCT/JP2013/080543 on Nov. 12, 2013, now Pat. No. 9,849,809.

(30) Foreign Application Priority Data

| | | | |
|---|---|---|---|
| Dec. 21, 2012 | (JP) | ................................ | 2012-279194 |
| Dec. 28, 2012 | (JP) | ................................ | 2012-286692 |
| Dec. 28, 2012 | (JP) | ................................ | 2012-287231 |
| Dec. 28, 2012 | (JP) | ................................ | 2012-287261 |

(51) Int. Cl.

| | |
|---|---|
| *B60N 2/12* | (2006.01) |
| *B60N 2/22* | (2006.01) |
| *B60R 22/00* | (2006.01) |
| *B60N 2/60* | (2006.01) |
| *B60N 2/34* | (2006.01) |
| *B60R 22/18* | (2006.01) |
| *B60N 2/90* | (2018.01) |

(52) U.S. Cl.

CPC .................. *B60N 2/22* (2013.01); *B60N 2/34* (2013.01); *B60N 2/6009* (2013.01); *B60N 2/688* (2013.01); *B60R 22/00* (2013.01); *B60N 2002/948* (2018.02); *B60N 2002/957* (2018.02); *B60R 2022/1818* (2013.01)

(58) Field of Classification Search

USPC .............................. 297/473, 452.18, 316, 342

See application file for complete search history.

(56) References Cited

U.S. PATENT DOCUMENTS

| | | | | |
|---|---|---|---|---|
| 4,623,114 | A | * | 11/1986 | Nishino .................. B60N 2/682 248/415 |
| 5,028,028 | A | | 7/1991 | Yamada et al. |
| 5,439,272 | A | * | 8/1995 | Hallet ................... B60N 2/2352 297/473 |
| 5,785,387 | A | * | 7/1998 | Hernandez ........... B60N 2/0705 248/429 |
| 5,791,738 | A | * | 8/1998 | Niezoldt .................. B60N 2/68 297/452.18 |
| 6,189,975 | B1 | | 2/2001 | Okazaki et al. |
| 6,371,556 | B1 | | 4/2002 | Arai |
| 6,402,240 | B1 | | 6/2002 | Toba et al. |
| 7,431,398 | B2 | | 10/2008 | Kuebler et al. |
| 8,245,994 | B2 | | 8/2012 | Yamada et al. |
| 9,539,916 | B2 | | 1/2017 | Sei et al. |
| 2001/0001221 | A1 | | 5/2001 | Okazaki et al. |
| 2003/0098601 | A1 | | 5/2003 | Minai |
| 2004/0239168 | A1 | | 12/2004 | Persad et al. |
| 2007/0012487 | A1 | | 1/2007 | Becker et al. |
| 2009/0139774 | A1 | | 6/2009 | Takayasu et al. |
| 2010/0187397 | A1 | | 7/2010 | Yamada et al. |
| 2011/0148164 | A1 | | 6/2011 | Oori |
| 2011/0266850 | A1 | | 11/2011 | Sei et al. |
| 2012/0133187 | A1 | | 5/2012 | Ootsuka et al. |
| 2012/0181833 | A1 | | 7/2012 | Nock et al. |

FOREIGN PATENT DOCUMENTS

| | | | |
|---|---|---|---|
| JP | H0228979 | Y2 | 8/1990 |
| JP | H0342729 | U | 4/1991 |
| JP | H0424129 | A | 1/1992 |
| JP | H04135949 | A | 5/1992 |
| JP | H05112205 | A | 5/1993 |
| JP | H0649809 | U | 7/1994 |
| JP | H07257242 | A | 10/1995 |
| JP | H11245692 | A | 9/1999 |
| JP | 2002059770 | A | 2/2002 |
| JP | 3498177 | B2 | 2/2004 |
| JP | 2004122919 | A | 4/2004 |
| JP | 2004330889 | A | 11/2004 |
| JP | 2008044559 | A | 2/2008 |
| JP | 2009262796 | A | 11/2009 |
| JP | 2010035970 | A | 2/2010 |
| JP | 2010173487 | A | 8/2010 |
| JP | 2010188907 | A | 9/2010 |
| JP | 2012116209 | A | 6/2012 |
| JP | 5087991 | B2 | 12/2012 |
| JP | 2013107445 | A | 6/2013 |

OTHER PUBLICATIONS

Office Action issued in counterpart Japanese Patent Application No. 2012-262323 on Feb. 16, 2016 and corresponding English translation.

Office Action issued for Japanese Patent Application No. 2012-279194, dated Jul. 19, 2016, 4 pages including English translation.

Office Action issued for Japanese Patent Application No. 2012-286692, dated Jul. 19, 2016, 6 pages including English translation.

Office Action issued for Japanese Patent Application No. 2012-287261, dated Jul. 19, 2016, 5 pages including English translation.

Office Action issued for Japanese Patent Application No. 2012-279193, dated Jul. 19, 2016, 4 pages including English translation.

Office Action issued for Chinese Patent Application No. 201710882404. 1, dated Feb. 3, 2019, 16 pages including English translation.

\* cited by examiner

FIG.8
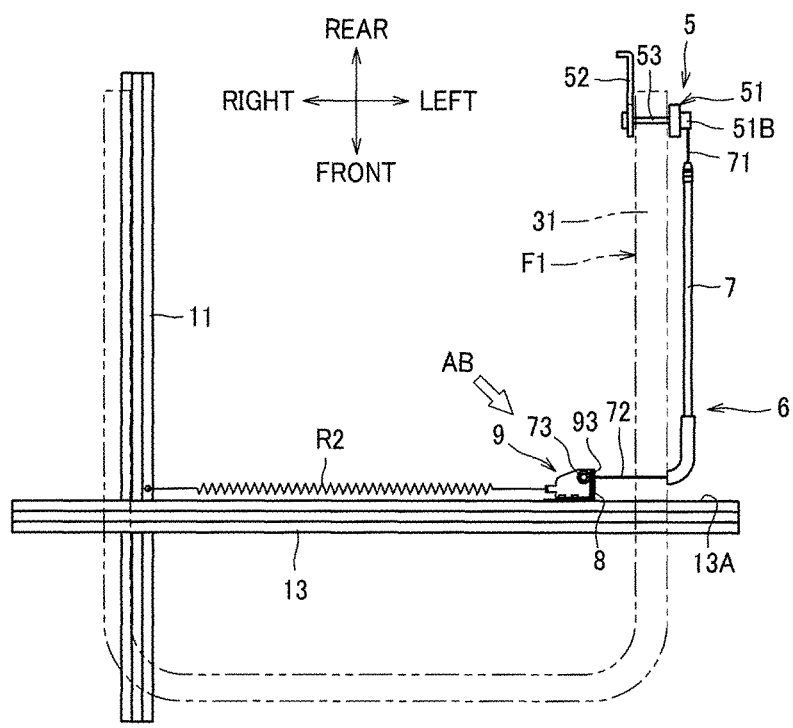
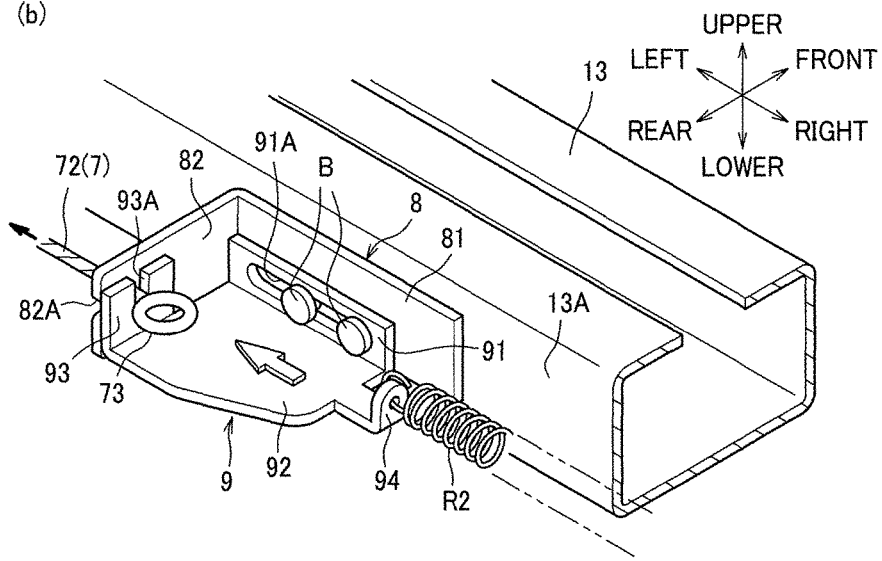

FIG.13
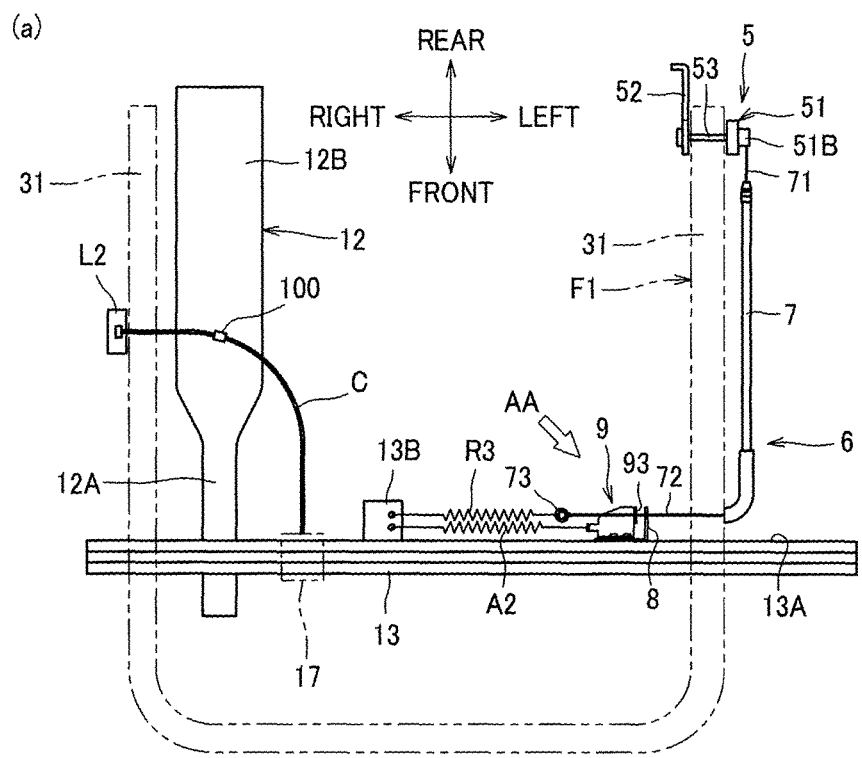
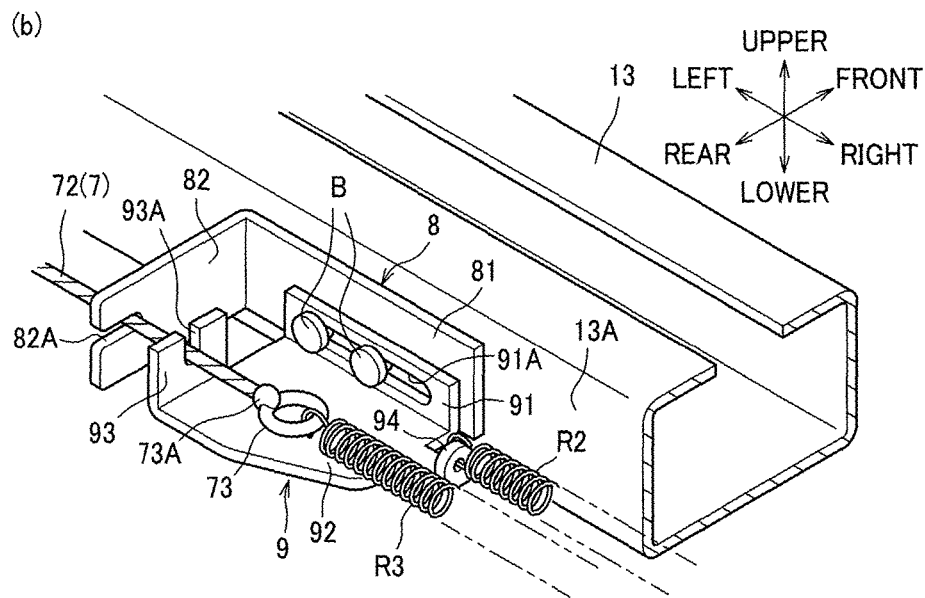

FIG.15
(a)
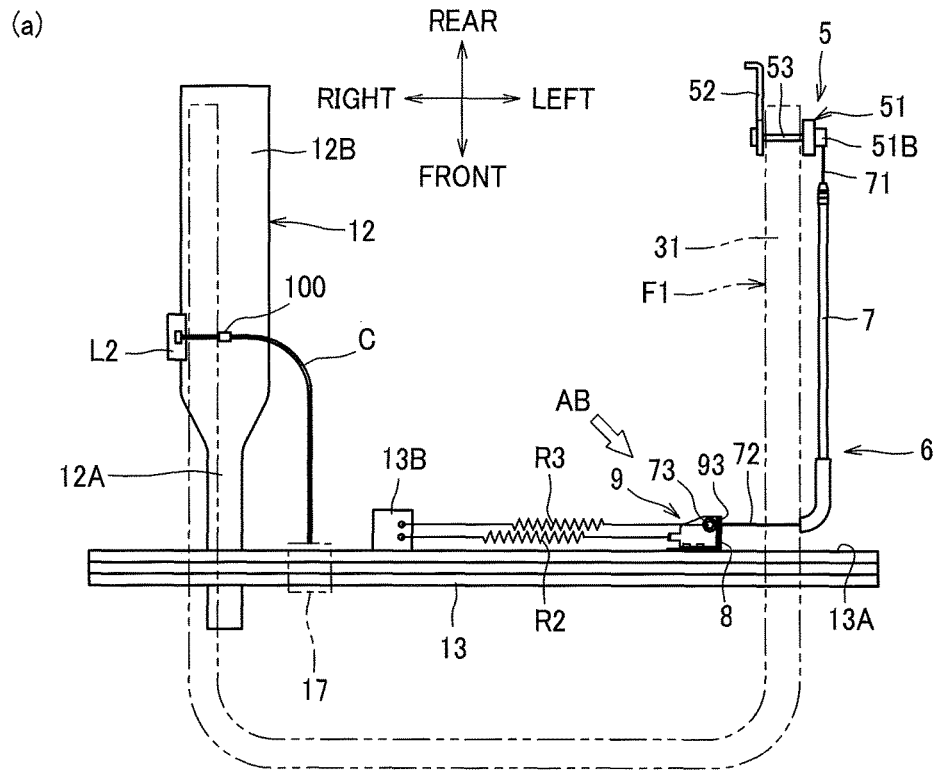
(b)
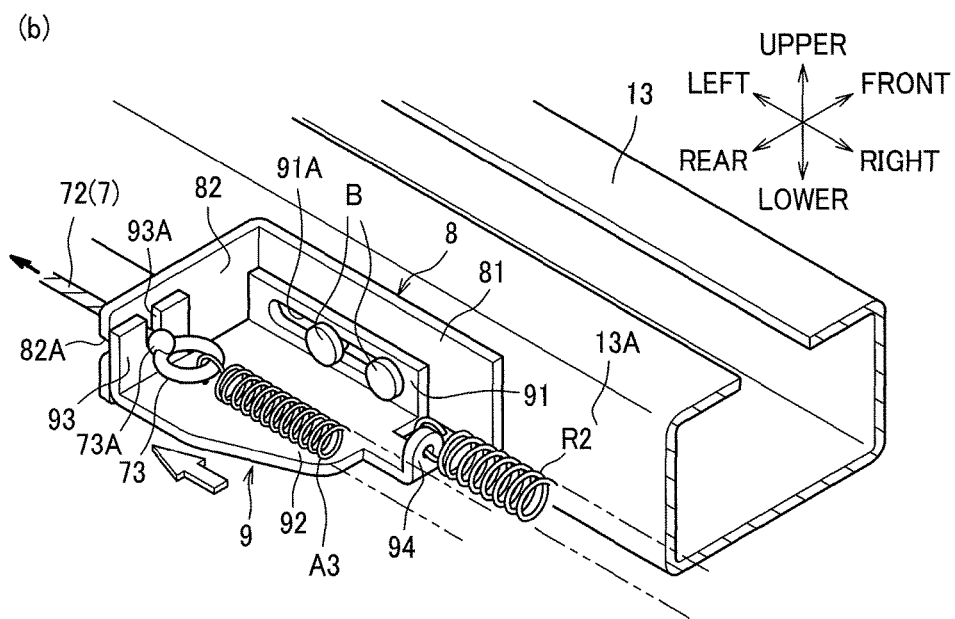

FIG.16
(a)
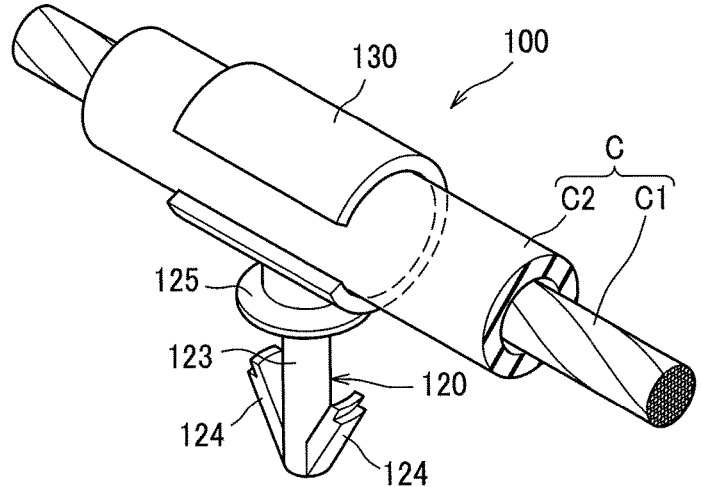
(b)
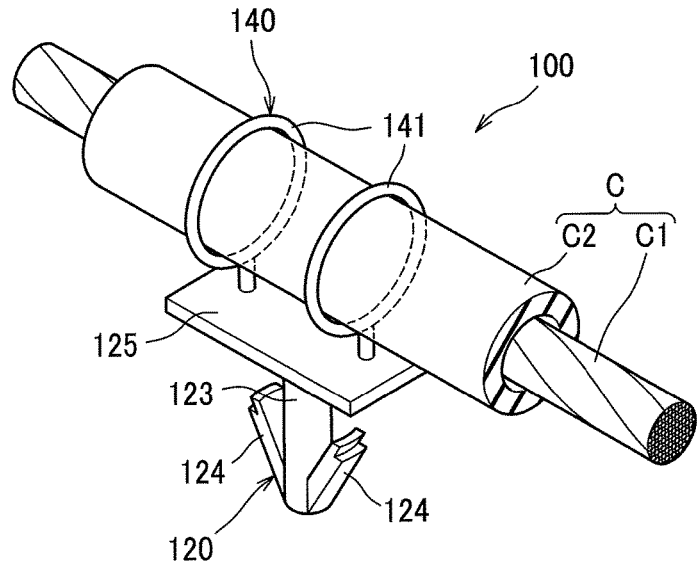

FIG.20
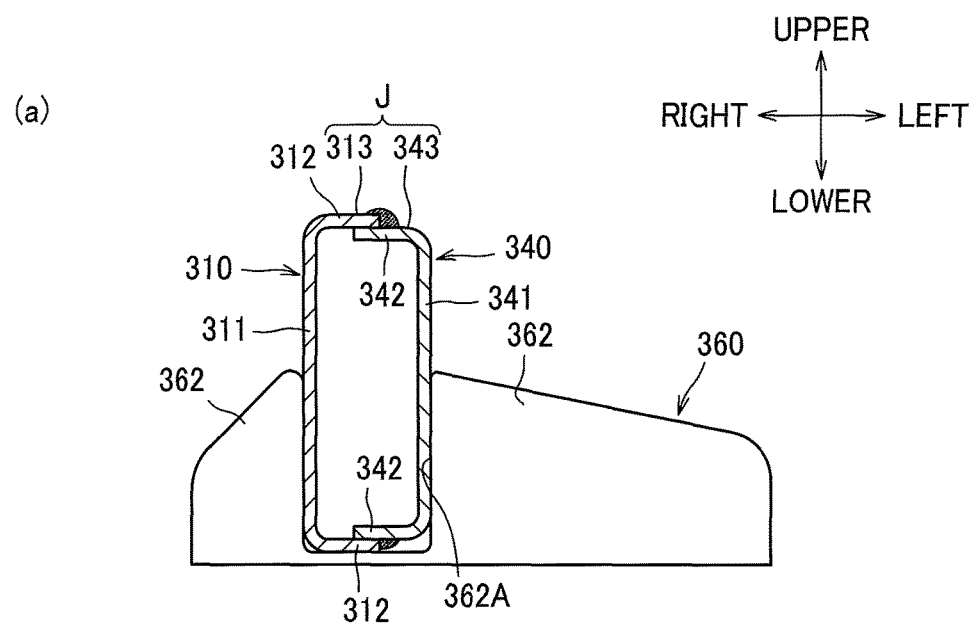
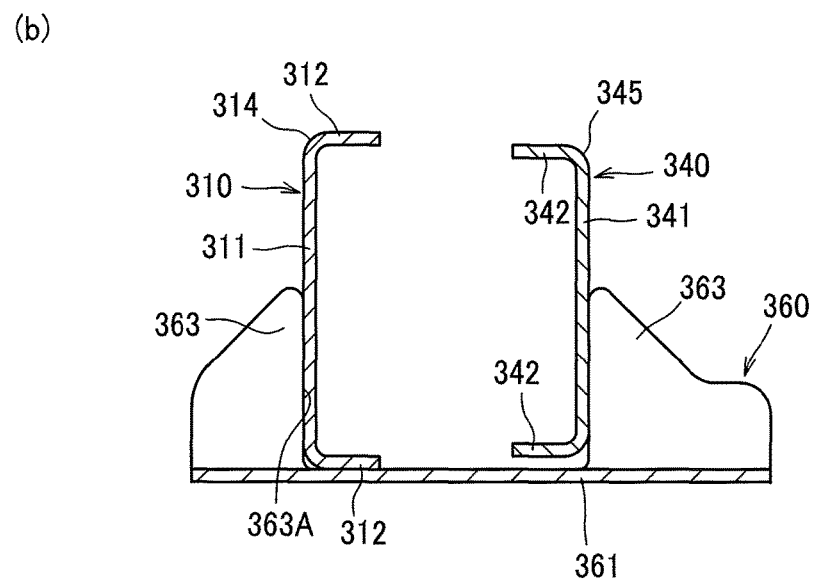

FIG.35
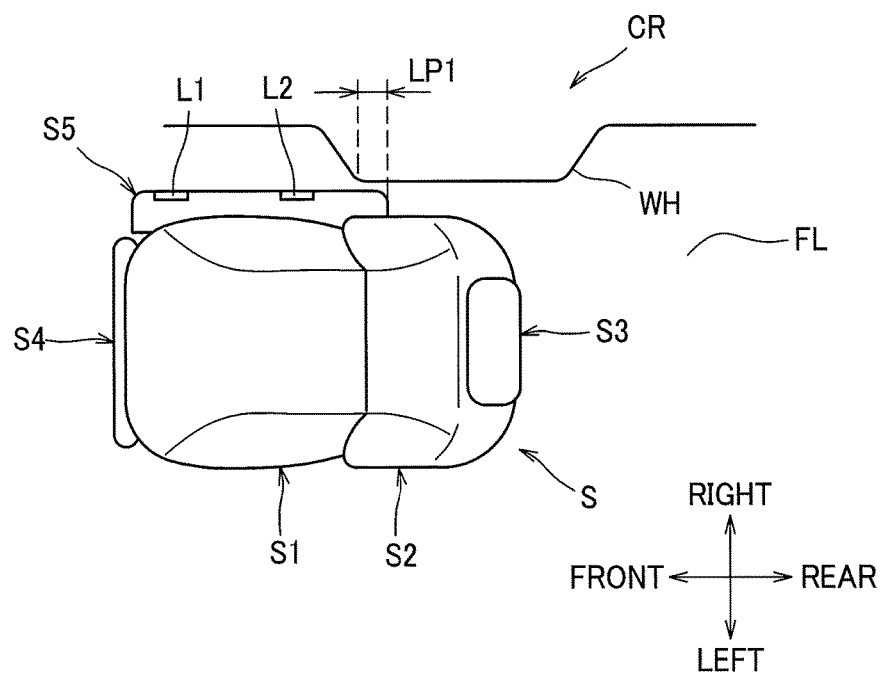
(a)
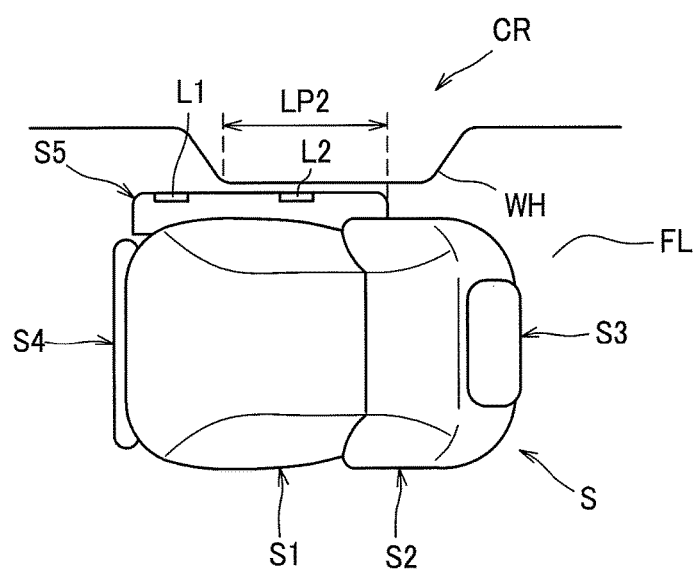
(b)

SEAT FOR VEHICLE

TECHNICAL FIELD

The present invention relates to a vehicle seat having a seat bottom provided by a seat cushion of which a frame is a seat cushion frame that is horizontally movable relative to a vehicle body.

BACKGROUND ART

A vehicle seat having a seat bottom provided by a seat cushion which is mounted to a vehicle body via a slide mechanism is hitherto known in the art (e.g., see Patent Literature 1). In this vehicle seat, a seat cushion is configured to be horizontally movable together with a seat back relative to a vehicle body.

Also known in the art is a vehicle seat with a cable installed therein which includes a clip clamping and thereby holding a sheath of the cable so that the sheath is protected from damage by contact with the edge of a seat frame (e.g., see Patent Literature 2).

Also known in the art is a seat with a seat belt which is configured to be pulled out from an upper end of a shoulder of a seat back (e.g., see Patent Literature 3). This seat includes a retractor for the seat belt, and the retractor is held in an appropriate position of the seat. Also known in the art is a vehicle seat including left and right side frames and a lateral slide mechanism configured to support the side frames in a manner that renders the side frames movable in a lateral direction (e.g., see Patent Literature 4).

Also known in the art is a vehicle seat including a movable member configured to support a seat cushion, and the movable member is supported by a side frame via a link so as to render the seat cushion tillable (e.g., see Patent Literature 5).

CITATION LIST

Patent Literatures

Patent Literature 1: JP 2009-262796 A
Patent Literature 2: JP 3498177 B2
Patent Literature 3: JP H04-135949 A
Patent Literature 4: JP 5087991 B2
Patent Literature 5: JPH07-257242 A

SUMMARY OF INVENTION

Actually, in cases where a seat cushion is horizontally movable relative to a vehicle body as in the art described in Patent Literature 1 mentioned above, depending on a location to which the seat cushion is configured to be moved, the seat back would interfere with part of the vehicle body located at the rear of the vehicle seat when the seat back is tilted rearward.

It would be desirable to provide a vehicle seat in which a seat back is constrained from tilting down when the seat cushion is moved to a position in which the seat back cannot be tilted down.

It would be further desirable that a lock for constraining a seat back from tilting down be released in a manner coordinated with a motion of the seat cushion.

It would be still further desirable that the vehicle seat be such that the seat cushion can be horizontally moved even when a lock member for constraining a seat back from tilting down catches and becomes nonoperational.

In the art described in Patent Literature 2 mentioned above, when the seat frame is to be moved, the sheath would catch on the clip and get into a state of being pulled by the clip, making the sheath difficult to move. Moreover, the sheath being pulled by the clip would possibly become deformed.

It would thus be desirable to provide a vehicle seat with a cable routed therein such that the seat frame can be moved easily and the possibility of deformation of the sheath of the cable can be reduced.

In a seat with a seat belt which is configured to be pulled out from an upper end of a shoulder of a seat back as described in Patent Literature 3, when a large pulling load is placed on the seat belt, such as in a collision of a vehicle, a large load directed frontward and downward is placed on the belt guide at the upper end of the shoulder. This load is transmitted to a seat cushion which supports a seat back via a reclining device or the like, and possibly causes deformation of the seat cushion.

In this respect, it would be desirable to suppress the deformation of a seat cushion in a vehicle seat with a seat belt which is configured to be pulled out from an upper end of a shoulder of a seat back.

As a vehicle seat may be installed slidably relative to a vehicle, the seat belt and the slide rail mechanism may interfere with each other when the vehicle seat slides or the seat belt is pulled out or retracted, which would possibly obstruct their smooth operations and damage the seat belt.

In this respect, it would be desirable to suppress interference of a seat belt with a slide rail mechanism so that smooth operations of the seat belt and the slide rail mechanism can be achieved, and the service life of the seat belt can be increased.

It would also be desirable to suppress increase the number of parts for that purpose.

When a vehicle seat as described in Patent Literature 4 makes a sliding motion in a lateral direction, a large load would possibly be placed on a joint portion of the side frames and the lateral slide mechanism if the vehicle seat could be interfered with by an object. It would thus be desirable to increase the rigidity of the side frames and to stably support the side frames by the lateral slide mechanism.

In cases that a vehicle seat as described in Patent Literature 5 is provided with an ottoman mechanism for supporting the feet of an occupant, and a lever bracket provided to attach an operation lever for an ottoman to a side frame is disposed to overlap the aforementioned link as viewed from the lateral direction, the vehicle seat would disadvantageously become upsized in the lateral direction.

In this respect, it would be desirable to downsize a vehicle seat in the lateral direction.

To be more specific, in one aspect of the present invention, a vehicle seat comprising a base frame and a seat frame disposed above the base frame is provided, the seat frame comprising: a seat cushion frame horizontally movable relative to the base frame between a first position and a second position different from the first position; a seat back frame rotatable relative to the seat cushion frame; a lock member configured to constrain the seat back frame from tilting rearward; and an unlock mechanism configured to release a lock applied by the lock member, in a manner coordinated with a motion of the seat cushion frame from the first position to the second position.

With this configuration, in the first position, the seat back frame can be constrained from tilting down, while in the second position, the seat back frame can be allowed to tilt down.

The vehicle seat as described above may be configured such that the lock member is configured to be movable to a lock position in which the seat back frame is constrained from tilting rearward, and to an unlock position in which the seat back frame is allowed to tilt rearward, wherein the unlock mechanism comprises a pull member connected to the lock member, and an engageable portion provided at the base frame, the engageable portion being engageable with the pull member, and wherein engagement of the engageable portion with the pull member occurring while the seat cushion frame is moving from the first position to the second position causes the pull member to be pulled, which in turn causes the pull member to move the lock member from the lock position toward the unlock position.

With this configuration, the lock applied by the lock member to the seat back frame can be released in a manner coordinated with the motion of the seat bottom (seat cushion) from the first position to the second position.

In this configuration, the engageable portion may be configured to be movable relative to the base frame, preferably, such that a force of a predetermined magnitude or greater applied from the pull member causes the engageable portion to move together with the pull member.

When a force which forces the seat back frame to tilt rearward is exerted on the seat back frame to which a lock is applied by the lock member, the lock member would possibly catch and become nonoperational. In this state, if the seat cushion frame were horizontally moved, the pull member would stretch tensely and prevent the seat cushion frame from moving; however, the above-described configuration allows the engageable portion to move, and thus can mitigate the stretch of the pull member, making the seat cushion frame movable.

In this configuration, preferably, an elastic member may be provided which is configured to bias the engageable portion in a direction reverse to that of a force received by the engageable portion from the pull member, wherein a biasing force of the elastic member is greater than a force required to move the lock member.

With this configuration, the engageable portion can be returned back to its original position upon removal of the stretch of the pull member.

In the aforementioned vehicle seat comprising a pull member by which the lock member is pulled, preferably, a biasing member may be provided which is configured to bias the lock member form the unlock position toward the lock position.

With this configuration, when the seat cushion frame is moved from the second position back to the first position, the lock member can be returned from the unlock position back to the lock position upon disengagement of the pull member and the engageable portion.

The aforementioned vehicle seat comprising a pull member by which the lock member is pulled may preferably be configured such that engagement of the pull member with the engageable portion occurs immediately before the seat cushion frame comes to the second position.

With this configuration, the distance the pull member pulls the lock member can be shortened.

The vehicle seat as described above may further comprise: a cable provided at the seat frame, the cable including a wire and a sheath covering and holding the wire in a manner that renders the wire movable therein; and a guide configured to hold the sheath, wherein the guide has a pair of openings provided in positions separate in a direction of extension of the sheath held by the guide, the sheath being disposed through the pair of openings, the guide being configured to be capable of guiding the sheath moving along a path connecting the pair of openings.

With this configuration, the sheath is not fixed by the guide and rendered movable relative to the guide; therefore, when the seat frame is moved, the sheath is not pulled by the guide. Accordingly, the seat frame can be moved with ease. In addition, as the sheath is not pulled by the guide, undesirable deformation of the sheath can be suppressed.

The vehicle seat comprising: a seat cushion including the seat cushion frame; a seat back including the seat back frame; and a seat belt may be configured such that the seat back includes a belt guide configured to support the seat belt in a position corresponding to an upper end of a shoulder in a manner that permits the seat belt to be pulled out, wherein the seat cushion includes a pair of side frames disposed in laterally separate positions and extending in a frontward-rearward direction, and an inner frame provided at an inner side of one of the pair of side frames provided on a side on which the belt guide is provided, the inner frame being joined to the one of the side frames and extending in the frontward-rearward direction, and wherein the belt guide is disposed in a position such that at least part of the belt guide is in a region of which a lateral range is defined by a lateral range in which the one of the side frames and the inner frame are disposed.

With this configuration, first of all, the side frames can be enhanced in rigidity because the inner frame is provided at the inner side of at least one of the pair of side frames which inner frame is joined to the at least one of the side frames and extends in the frontward-rearward direction. Furthermore, even when a large tensile load is applied to the seat belt for example in a collision of the vehicle and a large force in a frontward or downward direction is imposed on the belt guide and transmitted to the seat cushion, this load can be received by the side frame and the inner frame. In particular, with the above-described configuration in which the belt guide is disposed in a position such that at least part of the belt guide is disposed in a lateral range covered by the one of the side frames and the inner frame, the load received from the seat belt is directed toward a position between the side frame and the inner frame, and the seat back and the seat cushion is thus unlikely to be distorted so that the side frame and the inner frame can stably receive the load. Accordingly, the deformation of the seat cushion (specifically, the frame included in the seat cushion) can be suppressed.

In the above-described vehicle seat, the inner frame may preferably be bent with a rear side thereof shifted inward.

With this configuration, the inner frame is enhanced in rigidity, and the deformation of the seat cushion can be suppressed more effectively.

In the vehicle seat as described above, the inner frame may be provided to both of the left and right side frames, and a connecting member that connects the both inner frames may further be provided therein.

With this configuration, the deformation of the inner frame in the leftward or rightward direction is suppressed, and the inner frame is enhanced in rigidity, so that the deformation of the seat cushion can be suppressed more effectively.

There is provided a vehicle seat comprising: a seat cushion including the aforementioned seat cushion frame; a seat back including the aforementioned seat back frame; and a seat belt, the seat belt extending along the aforementioned seat cushion under the seat cushion, wherein the vehicle seat comprises: a slide rail mechanism configured to support the seat cushion in a manner that renders the seat cushion slidable therealong; and a cover member disposed between the slide rail mechanism and the seat belt under the seat cushion.

With this configuration, in which the cover member is disposed between the seat belt under the seat cushion and the slide rail mechanism, interference between the seat belt and the slide rail mechanism can be prevented. Accordingly, when the slide rail mechanism is actuated, the seat belt and the slide rail mechanism do not interfere with each other; also when the seat belt is pulled out or retracted, the slide rail mechanism and the seat belt do not interfere with each other. Accordingly, interference between the seat belt and the slide rail mechanism can be suppressed so that smooth operations of the seat belt and the slide rail mechanism can be realized and the service life of the seat belt can be increased.

In the vehicle seat as described above, the cover member may preferably have a protrusion formed on a surface of the cover member which faces the slide rail mechanism.

With this configuration, even when the cover member and the slide rail mechanism interfere with each other, the slide rail mechanism and the cover member contact only at an apex of the protrusion, so that the slide rail mechanism can be actuated relatively smoothly.

The vehicle seat as described above may be further configured to comprise a rod-shaped member supported on the rear end portion of the side frame, the rod-shaped member extending in a lateral direction, wherein the seat belt under the seat cushion and the cover member extend long in a frontward-rearward direction, and wherein the cover member includes a rear end portion having an opening that opens rearward, the opening being engaged with the rod-shaped member.

With this configuration, the rear end portion of the cover member can be stably supported.

This vehicle seat may be configured such that the seat belt is looped around the rod-shaped member, and routed from under the seat cushion upward.

With this configuration, in which the cover member is supported by the member for guiding the routing of the seat belt, the number of parts can thus be reduced.

The aforementioned seat cushion frame may be configured to comprise: left and right side frames that constitute left and right frames of a seat cushion; and a lateral slide mechanism configured to support the side frames in a manner that renders the side frames movable in a lateral direction, wherein the lateral slide mechanism is attached to an extension portion formed by bending a rear portion of a side frame inward in the lateral direction, the extension portion extending inward in the lateral direction from the rear portion of the side frame.

With this configuration, the rear portion of the side frame can be enhanced by bending the rear portion of the side frame. Moreover, the lateral slide mechanism is attached to the extension portion enhanced in rigidity by bending, and thus the side frame can be stably supported by the lateral slide mechanism.

There is provided a vehicle seat comprising: a seat cushion including the aforementioned seat cushion frame; a seat back including the aforementioned seat back frame; an ottoman configured to be movable between a support position in which the ottoman protrudes frontward beyond the seat cushion to support feet of an occupant and a retracted position that is below the support position; and an operation lever configured to be manipulated to operate the ottoman, wherein the seat cushion frame comprises: left and right side frames that constitute left and right frames of the seat cushion; a movable member configured to be movable relative to the side frames by being supported by the side frames via a plurality of links; and a lever bracket provided to attach the operation lever to a side frame, wherein the lever bracket is disposed below one of the plurality of links and attached to the side frame.

With this configuration, the vehicle seat can be downsized in the lateral direction, for example, in comparison with a configuration in which the lever bracket and the link overlap as viewed from the lateral direction.

BRIEF DESCRIPTION OF DRAWINGS

FIG. 8 includes (a) a view of the lock member in a non-rotatable state and the unlock mechanism when the seat cushion frame is in a second position, as viewed from above; and (b) a perspective view showing the fixed plate and the engaging member as viewed from an arrow AB of the view (a).

FIG. 13 is includes (a) a view of the lock member and the unlock mechanism in the first position as viewed from above; and (b) a perspective view showing the fixed plate and the engaging member as viewed from an arrow AA of the view (a).

FIG. 15 includes (a) a view of the lock member in a non-rotatable state and the unlock mechanism when the seat bottom frame is in a second position, as viewed from above; and (b) a perspective view showing the fixed plate and the engaging member as viewed from an arrow AB of the view (a).

FIG. 16 includes (a) a perspective view showing a guide in a first modified example; and (b) a perspective view showing a guide in a second modified example.

FIG. 20 includes (a) a sectional view taken along line I-I of FIG. 19; and (b) a sectional view taken along line II-II of FIG. 19.

FIG. 35 includes (a) a plan view showing the car seat located in the first position; and (b) a plan view showing the car seat located in the second position.

DESCRIPTION OF EMBODIMENTS

Next, several embodiments illustrating various aspects of the present invention will be described in detail with reference made to the drawings where appropriate. In the description given below, the front, rear, left, right, upper and lower are designated with reference to a person seated in a vehicle seat.

First Embodiment

Figure 1:
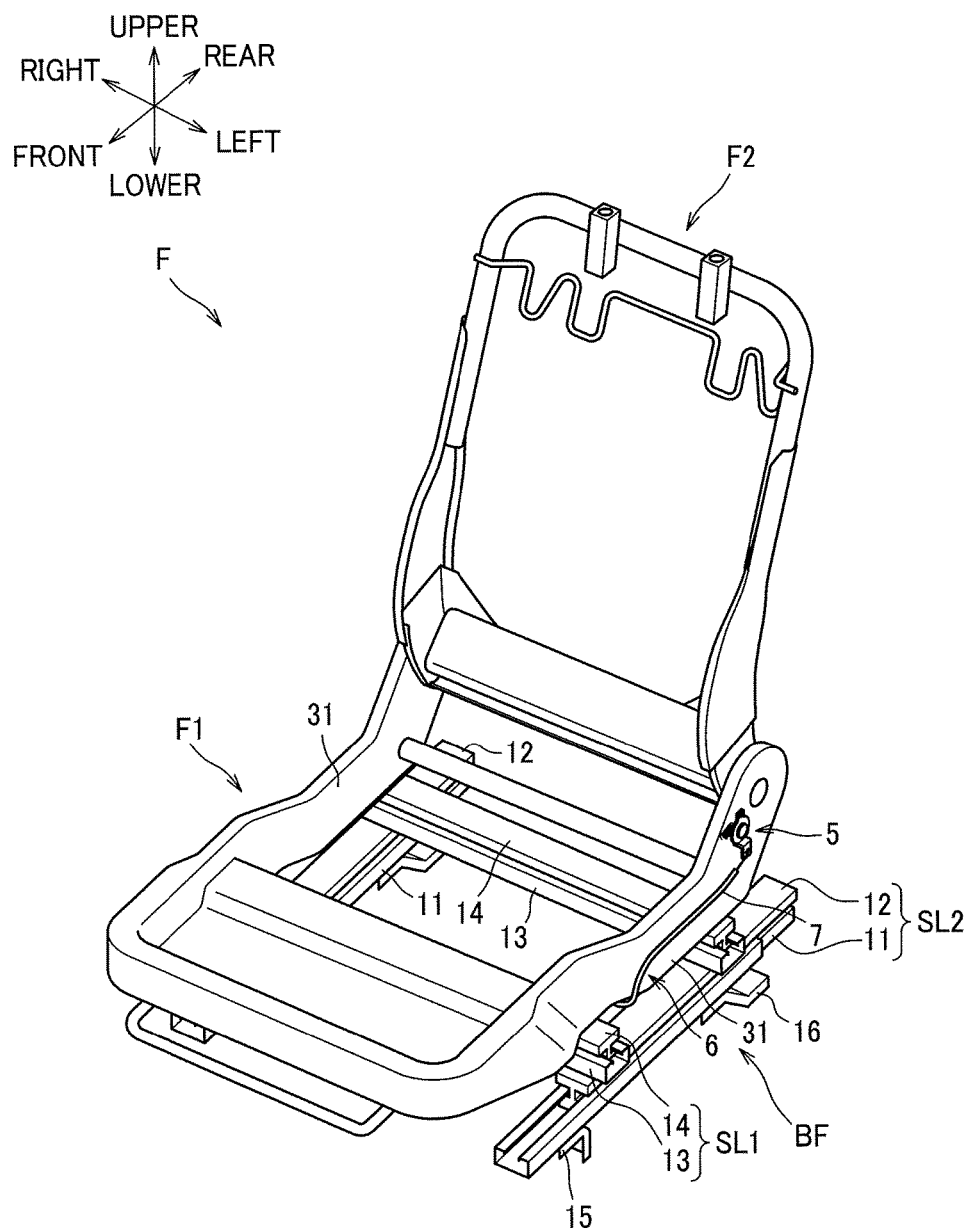
FIG. 1 is a perspective view showing an entire seat frame of a car seat according to a first embodiment.

A car seat as one example of a vehicle seat according to a first embodiment is configured as shown in FIG. 1 to include a base frame BF fixed on a vehicle body as one example of a vehicle, and a seat frame F disposed on the base frame BF; an outside of the seat frame F is upholstered with a seat cushion made of urethane foam.

The base frame BF includes a rail slider assembly (a first slide rail mechanism SL1 and a second slide rail mechanism SL2); the first slide rail mechanism SL1 mainly includes transverse rails 13 and transverse sliders 14, while the second slide rail mechanism SL2 mainly includes longitudinal rails 11 and longitudinal sliders 12.

A longitudinal rail 11 has an elongate shape extending long in a frontward-rearward direction; two similarly configured longitudinal rails 11 are provided in positions separate laterally from each other and extend parallel to each other. Each longitudinal rail 11 is fixed to the floor of the vehicle body by a front bracket 15 and a rear bracket 16. A longitudinal slider 12 has an elongate shape extending long in the frontward-rearward direction, and is configured to be slidable along the longitudinal rail 11.

A transverse rail 13 has an elongate shape extending long in a lateral direction; two similarly configured transverse rails 13 are provided in positions separate in the frontward-rearward direction from each other and extend parallel to each other. Each transverse rail 13 is fixed on upper surfaces of the longitudinal sliders 12.

The seat frame F includes a seat cushion frame F1 included in the seat cushion by which a seat bottom is provided, and a seat back frame F2.

The seat cushion frame F1 is a frame including a pair of left and right sidewalls 31 and formed in the shape of a substantially rectangular frame. This seat cushion frame F1 is fixed on upper surfaces of the transverse sliders 14 that are configured to be slidable along the transverse rails 13, so that the seat cushion frame F1 is horizontally movable between a first position and a second position which are the rightmost and leftmost positions, with respect to the base frame BF. The seat cushion frame F1 is also configured to be horizontally movable in the frontward-rearward direction with respect to the base frame BF, as the longitudinal slider 12 is slidable in the frontward-rearward direction with respect to the longitudinal rail 11.

The seat back frame F2 is a frame formed in the shape of a substantially rectangular frame and configured to be rotatable with respect to the seat cushion frame F1, i.e., capable of reclining, by means of a known mechanism.

Figure 2:
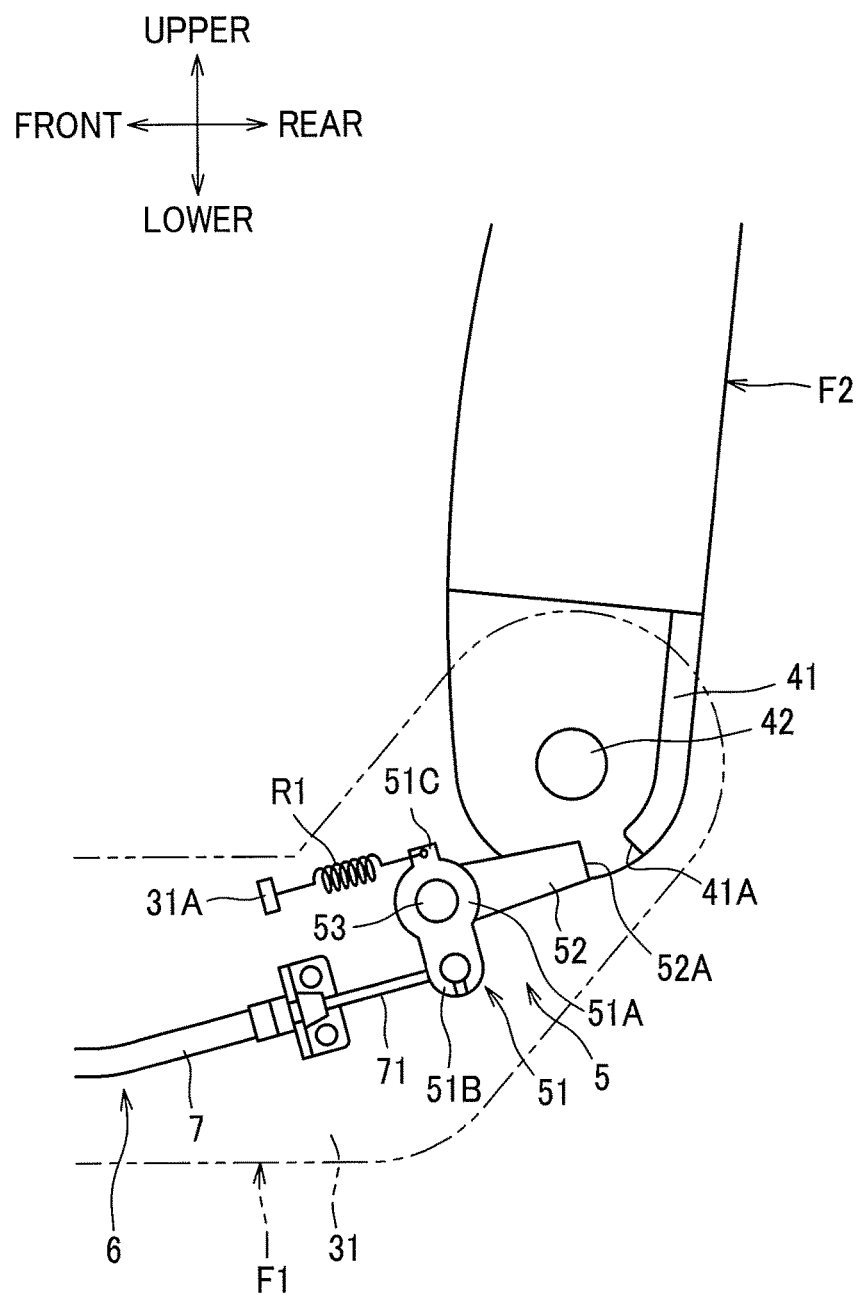
FIG. 2 is a side view showing a lock member located in a lock position and a seat back frame.

The seat back frame F2 includes, as shown in FIG. 2, a protrusion (to be more specific, a rib 41) provided at a lower end of a left side thereof. The rib 41 protrudes from the side surface of the seat back frame F2 laterally outward, and extends along the rear end edge in the upward-downward direction. The lower end of the rib 41 located rearwardly of the position immediately below a rotary shaft 42 of the seat back frame F2 when the seat back frame F2 is in a raised posture relative to the seat cushion frame F1 is moved around the rotary shaft 42 in an obliquely-frontward-and-downward direction by tilting the seat back frame F2 rearward.

The car seat includes a lock member 5 configured to constrain the seat back frame F2 from tilting rearward, and an unlock mechanism 6 configured to release a lock applied by the lock member 5, in a manner coordinated with a motion of the seat cushion frame F1 from the first position to the second position.

The lock member 5 is a member rotatably supported at a rear portion of a left sidewall 31 of the seat cushion frame F1. The lock member 5 includes an actuation part 51 disposed on a laterally outer side of the sidewall 31, and a lock part 52 disposed on a laterally inner side of the sidewall 31; the actuation part 51 and the lock part 52 thus provided with the sidewall 31 sandwiched therebetween are connected by a rotary shaft 53 (see FIG. 4(a)).

The actuation part 51 includes a substantially circular core portion 51A on which the rotary shaft 53 is fixed, a cable fixing portion 51B extending from the core portion 51A downward, and a spring fixing portion 51C extending from the core portion 51A upward.

The lock portion 52 has a proximal end portion to which the rotary shaft 53 is fixed, and has a shape of a plate extending from the rotary shaft 53 rearward. A distal end face 52A of the lock portion 52 is so formed that when a distal end 41A of the rib 41 of the seat back frame F2 is brought into contact with that distal end face 52A, a force of the distal end 41A of the rib 41 pushing the lock portion 52 is directed toward the rotary shaft 53 to prevent the lock member 5 from rotating.

The lock member 5 configured as described above is designed to be movable between a lock position (the position shown in FIG. 2) in which the distal end of the lock portion 52 is disposed in such a position that it can come in contact with the distal end 41A of the rib 41 of the seat back frame F2 when the seat back frame F2 is tilted backward and an unlock position (the position shown in FIG. 6) in which the lock portion 52 is disposed in such a position that it will not interfere with the rib 41 of the seat back frame F2 when the seat back frame F2 is tilted backward. In other words, the lock member 5 in the lock position can constrain the seat back frame F2 from tilting backward, and the lock member 5 in the unlock position can allow the seat back frame F2 from tilting backward.

The lock member 5 is biased from the unlock position toward the lock position by a first tension spring R1 as one example of a biasing member. The first tension spring R1 has one end engaged with a support portion 31A protruding laterally outward from the sidewall 31 of the seat cushion frame F1 in a position frontward of the lock member 5, and another end engaged with the spring fixing portion 51C of the lock member 5. The first tension spring R1 is configured to pull the spring fixing portion 51C frontward, thereby biasing the lock member 5 so that the lock member 5 rotates counterclockwise in FIG. 2.

Figure 4:
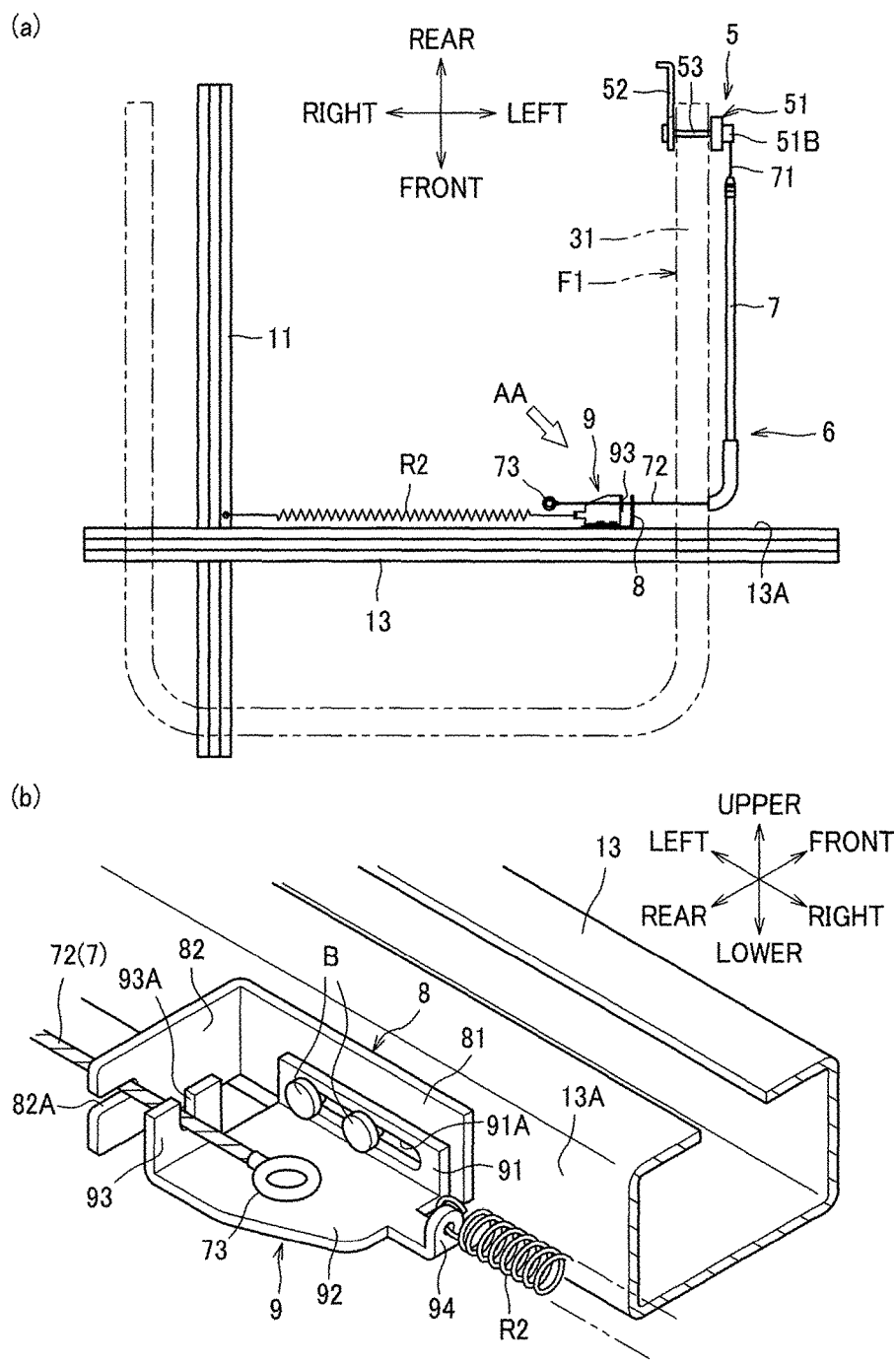
FIG. 4 includes (a) a view of the lock member and an unlock mechanism in a first position as viewed from above; and (b) a perspective view showing a fixed plate and an engaging member as viewed from an arrow AA of the view (a).

The unlock mechanism 6 includes a cable 7 as one example of a pull member which is supported by the seat cushion frame F1, and a fixed plate 8 and an engaging member 9 which are supported by a front transverse rail 13 as shown in FIG. 4(b).

The cable 7 extends in the frontward-rearward direction along the outer surface of the sidewall 31 of the seat cushion frame F1 as shown in FIG. 4(a). The cable 7 has a rear end 71 connected with the cable fixing portion 51B of the lock member 5, and a front end 72 disposed inside the frame of the seat cushion frame F1, and extends to a substantially central position in the lateral direction between the pair of sidewalls 31 of the seat cushion frame F1. An annular stopper 73 having a diameter larger than that of the cable is provided at the front end 72 of the cable 7.

The fixed plate 8 is, as shown in FIG. 4(b), a generally L-shaped plate, and includes a first plate portion 81 extending laterally along a rear surface 13A of the transverse rail 13 and a second plate portion 82 extending from the left end of the first plate portion 81 rearward. The first plate portion 81 has two laterally arranged through holes (not shown) provided in a substantially central position in the lateral direction. The second plate portion 82 has a frontwardly recessed slot 82A provided at its rear end.

The engaging member 9 is a member having a shape of a plate, engageable with the distal end of the cable 7. The engaging member 9 includes a supported portion 91 lapped on the first plate portion 81 of the fixed plate 8, a connecting portion 92 extending from the lower end of the supported portion 91 rearward, an engageable portion 93 extending from the left end of the connecting portion 92 upward, and a spring support portion 94 provided at the right end of the connecting portion 92.

The supported portion 91 is formed to extend long in the lateral direction along the first plate portion 81 of the fixed plate 8, and has a laterally elongated slot hole 91A piercing in the frontward-rearward direction.

The connecting portion 92 is formed to have substantially the same lateral dimension as that of the supported portion 91, and extends rearward with its rear end located at substantially the same position as that of the rear end of the second plate portion 82 of the fixed plate 8.

The engageable portion 93 is provided at the rear of the connecting portion 92, and has a slot 93A disposed opposite to the slot 82A of the fixed plate 8, wherein the slot 93A is recessed from the upper end of the engageable portion 93 downward (i.e., in a direction different from the direction of recess of the slot 82A). The width of the slot 93A is configured to be smaller than that of the stopper 73 of the cable 7.

The spring support portion 94 protrudes rightward from the right end of the connecting portion 92 with its distal end portion bent upward. The spring support portion 94 has a through hole piercing through in the lateral direction at the distal end portion.

The fixed plate 8 and the engaging member 9 configured as described above are arranged such that the first plate portion 81 of the fixed plate 8, the supported portion 91 of the engaging member 9 are laminated in this sequence on the rear surface 13A of the transverse rail 13.

The engaging member 9 is configured such that the engageable portion 93 is disposed on the left side of the stopper 73 of the cable 7, to be more specific, in such a position that the engageable portion 93 is engageable with the stopper 73 of the cable 7 immediately before the seat cushion frame F1 moving from the first position toward the second position comes to the second position; the front end 72 of the cable 7 is disposed in the slot 93A of the engageable portion 93 so as to be held thereby from the front and from the rear. The fixed plate 8 is configured such that the second plate portion 82 is disposed in a position separate from the engageable portion 93 to the left the same distance as or a distance longer than a distance of travel of the seat cushion frame F1 from a position in which the stopper 73 of the cable 7 engages the engageable portion 93 of the engaging member 9 to the second position; the front end 72 of the cable 7 is disposed in the slot 82A of the second plate portion 82 so as to be held thereby from above and from below.

The fixed plate 8 is fixed on the transverse rail 13 by two flanged pins B inserted through the through holes formed in the first plate portion 81. The engaging member 9 has its slot hole 91A formed in its supported portion 91 and engaged with the two flanged pins B, whereby the engaging member 9 is laterally movable with respect to the transverse rail 13 (base frame BF) and the fixed plate 8.

The engaging member 9 is biased by a second tension spring R2 as one example of an elastic member, in a direction (i.e., rightward direction) reverse to a direction of a force received by the engageable portion 93 of the engaging member 9 from the stopper 73 of the cable 7 when the stopper 73 of the cable 7 engages the engageable portion 93 of the engaging member 9.

The second tension spring R2 has its left end hooked on the spring support portion 94 of the engaging member 9 and its right end hooked on the right longitudinal rail 11 as shown in FIG. 4(a). The second tension spring R2 pulls the engaging member 9 in the rightward direction.

The biasing force of the second tension spring R2 is smaller than a sufficient force for laterally moving the seat cushion frame F1, and greater than a necessary force for moving the lock member 5 from the lock position to the unlock position. In this setting, the engaging member 9 to which a force greater than the biasing force of the second tension spring R2 is not applied from the cable 7 comes to the rightmost position in which the flanged pin B comes in contact with the left end of the slot hole 91A, and when a force greater than the biasing force of the second tension spring R2 is applied from the cable 7, the engaging member 9 can move leftward together with the cable 7 against the biasing force of the second tension spring R2.

Operations and advantages realized in the car seat configured as described above will be discussed below.

Figure 3:
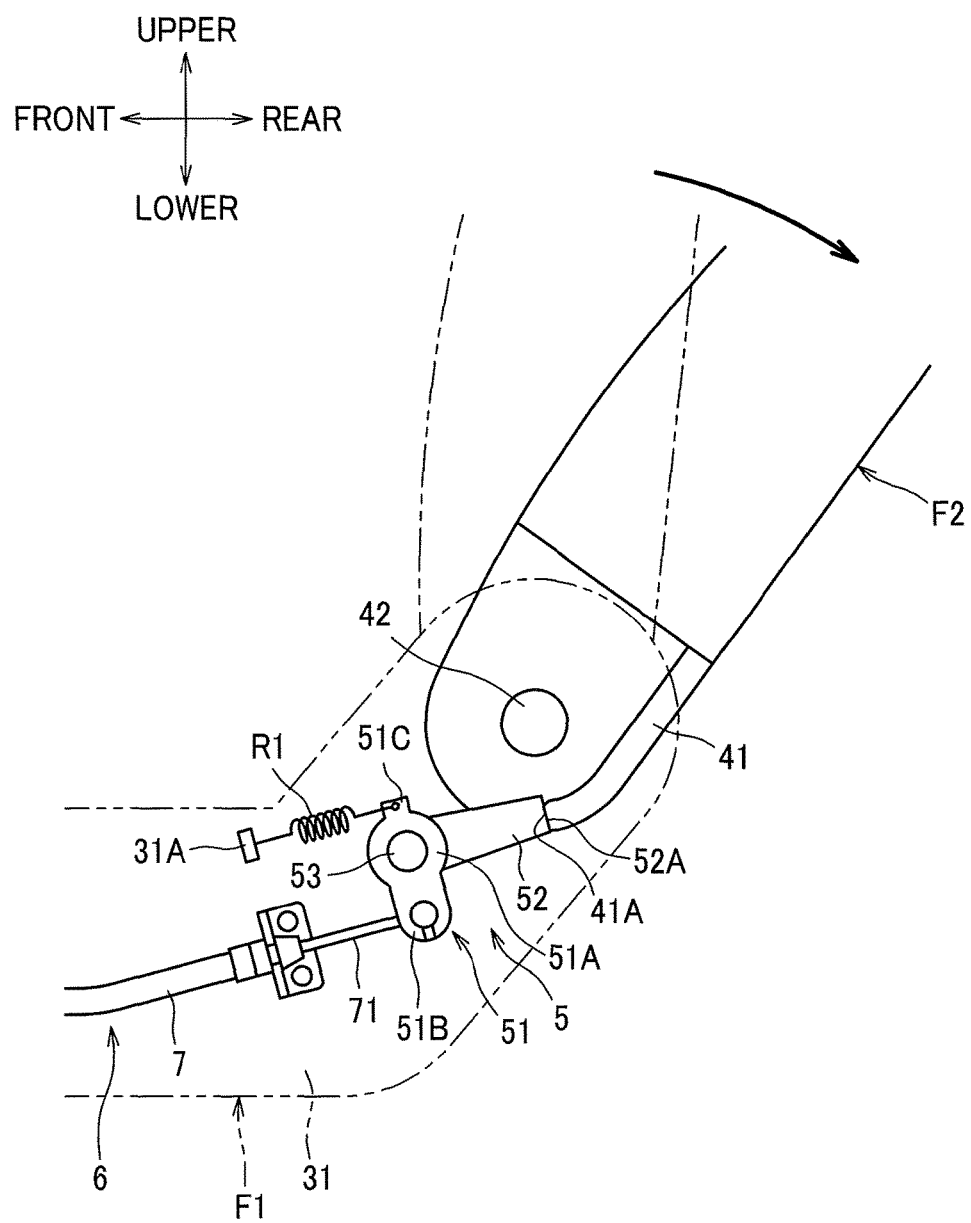
FIG. 3 is a side view showing the lock member and the seat back frame in a state shifted from the state shown in FIG. 2 by tilting down the seat back frame.

As shown in FIG. 4(a), when the car seat is in the rightmost position, the seat cushion frame F1 is in the first position, and the lock member 5 is in the lock position as shown in FIG. 2. In this state, when the seat back frame F2 is operated to tilt rearward, the distal end 41A of the rib 41 of the seat back frame F2 is brought into contact with the distal end face 52A of the lock portion 52 of the lock member 5 as shown in FIG. 3, and the rearward tilting motion of the seat back frame F2 is constrained.

As described above, when the seat cushion frame F1 is in the first position, the rearward tilting motion of the seat back frame F2 is constrained; therefore, even when a part of the vehicle body such as a wheelhouse exists at the rear side of the car seat, interference of the seat back frame F2 with such a part of the vehicle body can be suppressed.

Figure 5:
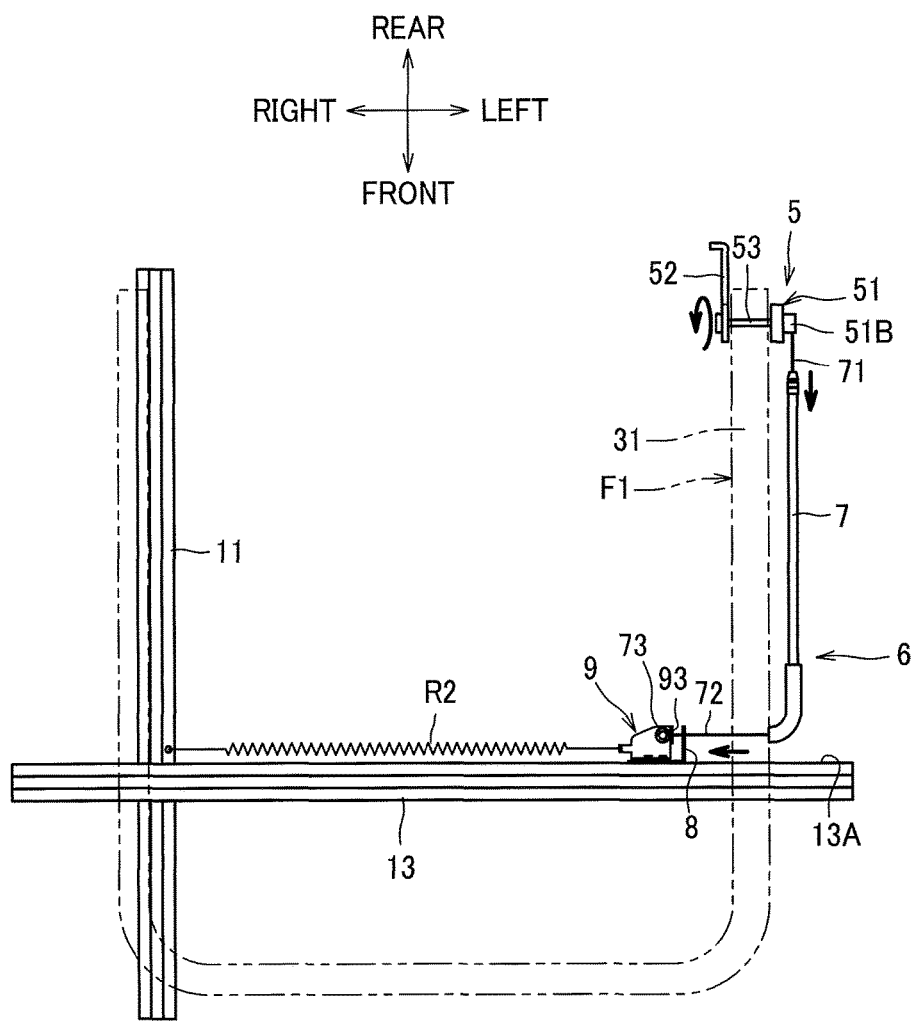
FIG. 5 is a view of the lock member and the unlock mechanism in a second position as viewed from above.

When the seat cushion frame F1 with the seat back frame F2 raised thereon is moved to the left, the stopper 73 of the cable 7 catches in and engages with the engageable portion 93 (the edges of the slot 93A) of the engaging member 9, as shown in FIG. 5. In other words, the engagement of the engageable portion 93 with the stopper 73 of the cable 7 occurs while the seat cushion frame F1 is moving from the first position to the second position.

Figure 6:
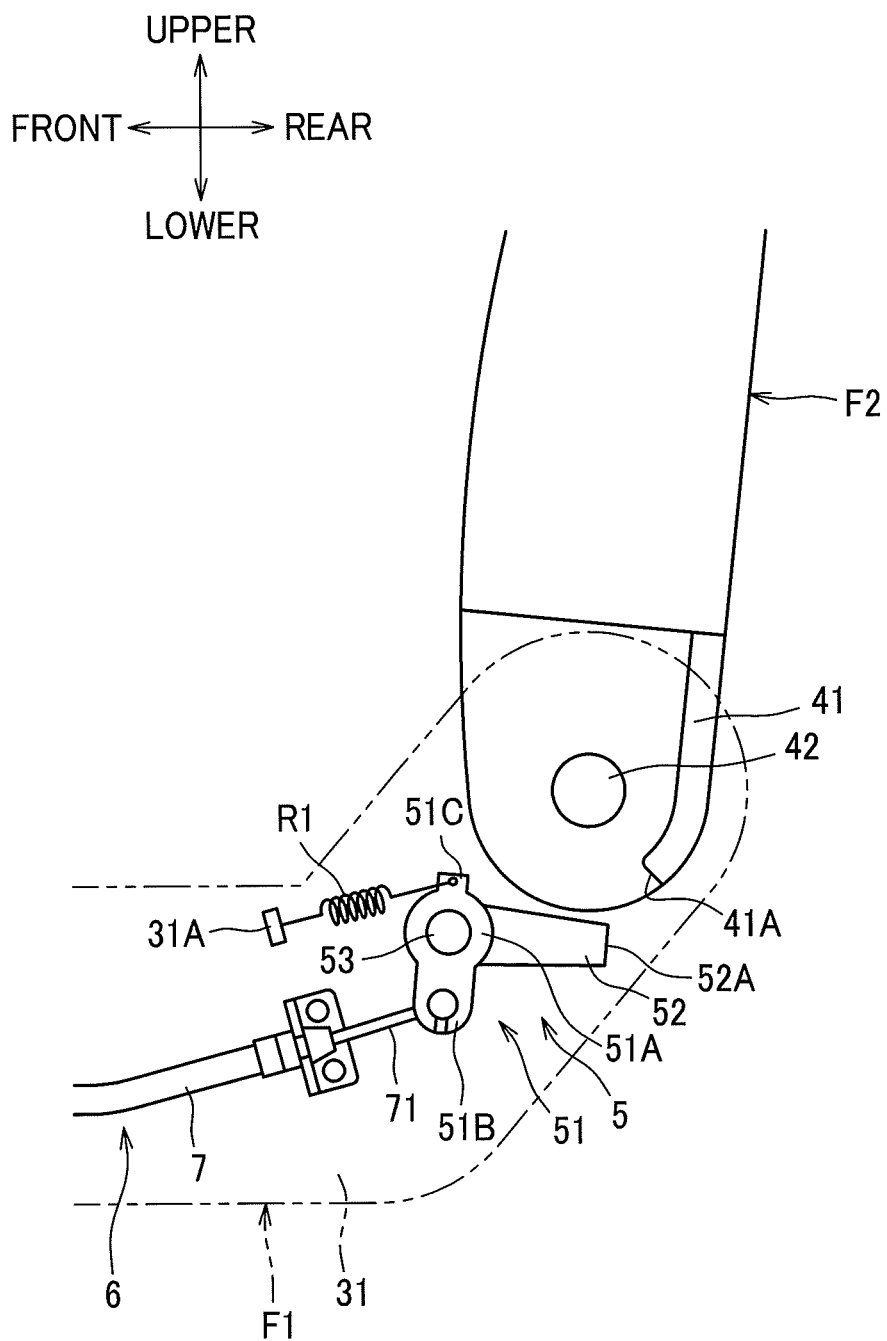
FIG. 6 is a side view showing the lock member located in an unlock position and the seat back frame.

In this state, when the seat cushion frame F1 is operated to move further leftward toward the second position, a force directed in the leftward direction is acted on the engageable portion 93 from the stopper 73 of the cable 7; however, as the biasing force of the second tension spring R2 pulling the engaging member 9 to the right is greater than this force, and thus the engaging member 9 does not move relative to the fixed plate 8. Accordingly, the engageable portion 93 pulls the cable 7, and the cable 7 causes the lock member 5 to rotate and move from the lock position to the unlock position as shown in FIG. 6, so that the lock applied by the lock member 5 is released.

Figure 7:
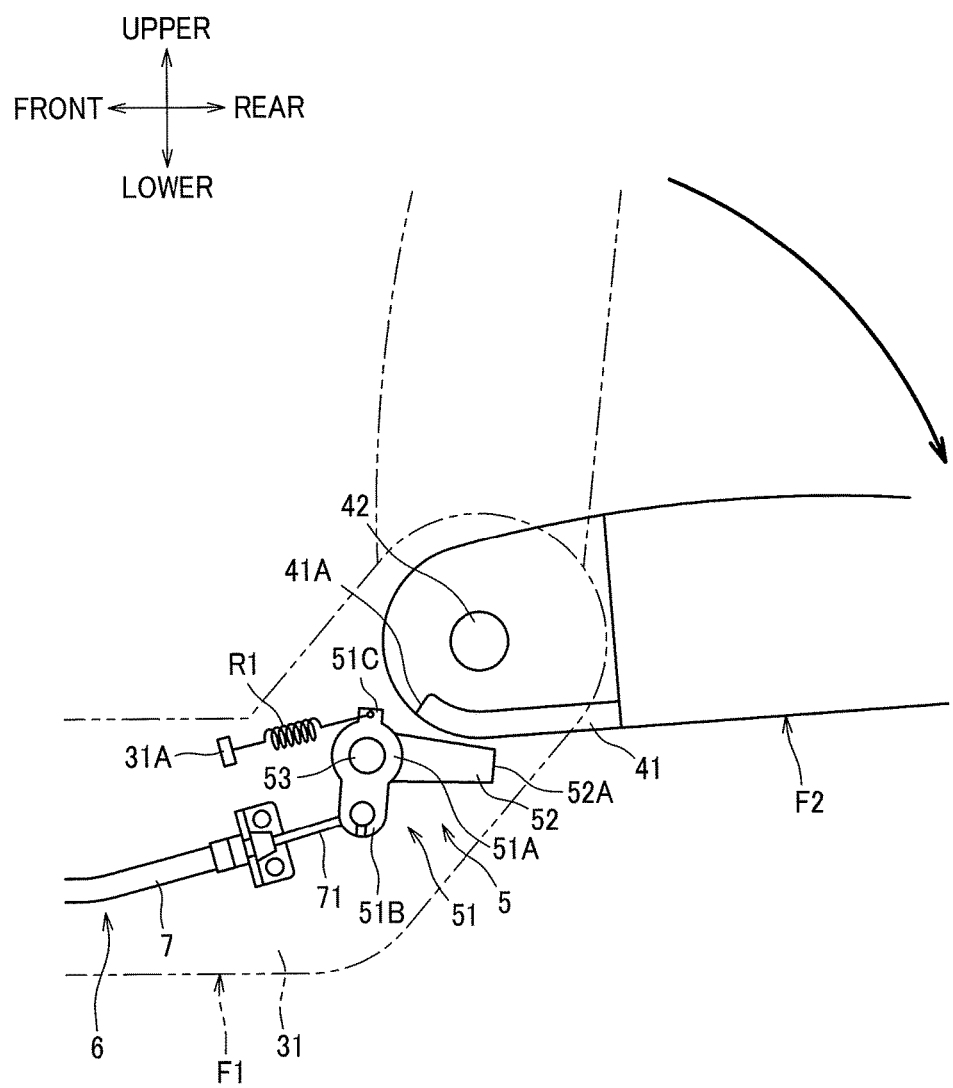
FIG. 7 is a side view showing the lock member and the seat back frame in a state shifted from the state shown in FIG. 6 by tilting down the seat back frame.

When the seat cushion frame F1 is in the second position, the rib 41 of the seat back frame F2 operated to tilt rearward never interferes with the lock member 5 as shown in FIG. 7, so that the seat back frame F2 can be tilted down to the full.

Since the engagement of the stopper 73 of the cable 7 with the engageable portion 93 of the engaging member 9 occurs immediately before the seat cushion frame F1 comes to the second position, the distance the cable 7 is pulled can be shortened.

To return the car seat from the second position back to the first position, the seat back frame F2 is first raised, and then the car seat is moved. When the seat cushion frame F1 is moved from the second position toward the first position, the stopper 73 of the cable 7 moves to the right, and thus the engagement of the engageable portion 93 of the engaging member 9 with the cable 7 is released. As a result, the cable 7 is no more pulled by the engageable portion 93, and the lock member 5 is moved from the unlock position to the lock position by the biasing force of the first tension spring R1.

If the seat back frame F2 on the seat cushion frame F1 located in the first position is forcefully operated to tilt rearward, the lock member 5 may possibly catch on the rib 41 and become unrotatable. If the seat cushion frame F1 in this state is moved toward the second position, engagement of the stopper 73 of the cable 7 with the engageable portion 93 of the engaging member 9 fails to cause the lock member 5 to rotate, and thus the engageable portion 93 cannot pull the cable 7, bringing about a tensely stretched state of the cable 7, so that a force greater than the biasing force (predetermined force) of the second tension spring R2 is applied by the cable 7 to the engageable portion 93. Accordingly, as shown in FIG. 8(a), (b), the cable 7 pulls the engaging member 9 by the force greater than the biasing force of the second tension spring R2, and causes the engaging member 9 to move to the left.

Since the engaging member 9 will not pull the cable 7 but move together with the cable 7 with respect to the fixed plate 8 when the lock member 5 becomes unmovable, the stretch of the cable 7 can be suppressed.

When the seat cushion frame F1 is returned back to the first position, the stopper 73 of the cable 7 is separated from the engageable portion 93, and thus the engaging member 9 is returned to the original position (the position on the right side) by the biasing force of the second tension spring R2.

The first embodiment has been described above, but it is to be understood that the present invention is not limited to the above-described embodiment. Specific configurations may be modified where appropriate without departing from the gist of the present invention.

In the above-described embodiment, the unlock mechanism 6 is configured to release the lock applied by the lock member 5 when the seat cushion frame F1 is caused to move leftward from the first position toward the second position, but the present invention is not limited to this configuration. For example, the unlock mechanism may be configured to release the lock applied by the lock member 5 when the seat cushion frame F1 is caused to move rightward, or to release the lock applied by the lock member 5 when the seat cushion frame F1 is caused to move frontward or rearward.

In the above-described embodiment, the first tension spring R1 configured to bias the lock member 5 from the unlock position toward the lock position is provided, but the present invention is not limited to this configuration. For example, the lock member may be formed to have weight distribution such that the lock member is always in the lock position under its own weight unless no external force is applied.

Second Embodiment

Next, a detailed description of a second embodiment will be given with reference made mainly to FIGS. 9 to 16. As the position of the lock member 5 associated with the location of the seat back frame F2 is similar to that of the first embodiment, the following discussion will refer to FIG. 2 showing the lock member 5 located in the lock position and the seat back frame F2, FIG. 3 showing the lock member 5 and the seat back frame F2 in a state shifted from the state shown in FIG. 2 by tilting down the seat back frame F2, FIG. 6 showing the lock member 5 located in the unlock position and the seat back frame F2, and FIG. 7 showing the lock member 5 and the seat back frame F2 in a state shifted from the state shown in FIG. 6 by tilting down the seat back frame F2.

Figure 9:
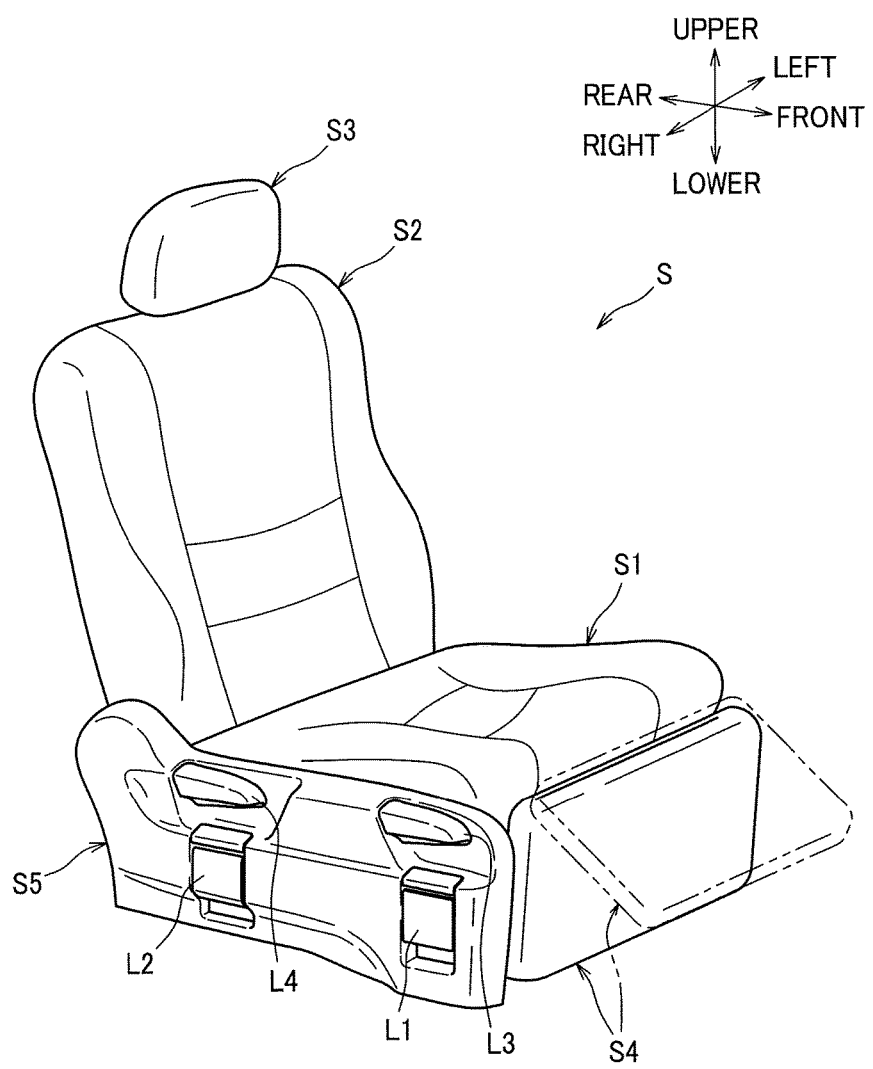
FIG. 9 is a perspective view showing a car seat according to a second embodiment

As shown in FIG. 9, a car seat S as one example of a vehicle seat is a seat configured to recline and to be slidable in the frontward, rearward, leftward or rightward direction with respect to the floor of the vehicle. The car seat S mainly includes a seat cushion S1, a seat back S2, a headrest S3, an ottoman S4, and a side cover S5.

Figure 10:
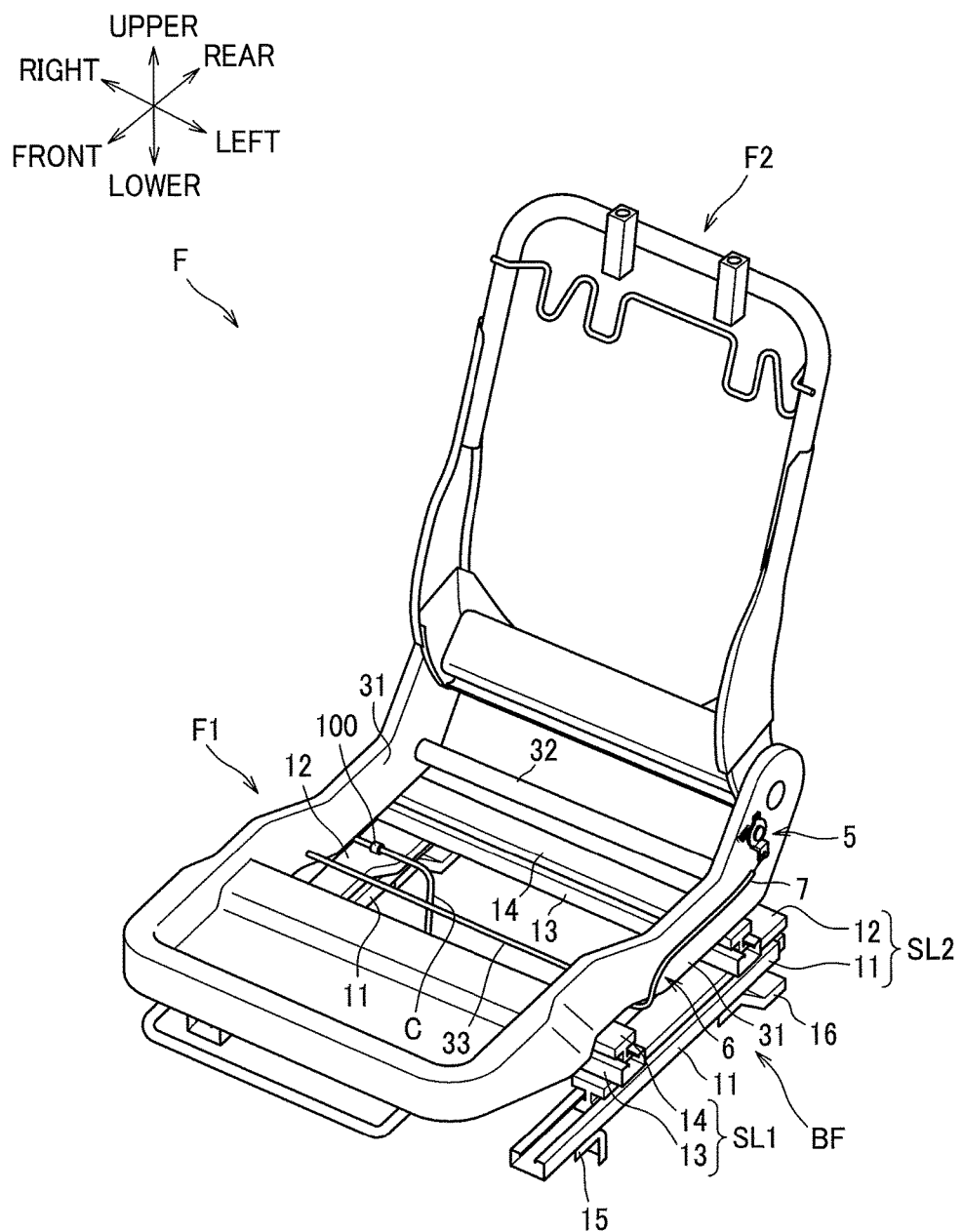
FIG. 10 is a perspective view showing a base frame, a first slide rail mechanism and an entire seat frame.

The seat cushion S1 and the seat back S2 are configured to include a seat frame F supported by a base frame BF through a first slide rail mechanism SL1 as shown in FIG. 10, wherein the seat frame F is upholstered with a cushion pad made of a cushiony material such as urethane foam and an outer covering made of synthetic leather, fabric or the like.

Referring back to FIG. 9, the ottoman S4 is a cushion for supporting feet of an occupant, and configured to include a known frame (not shown) upholstered with a cushion pad and an outer covering. The ottoman S4 is configured to be movable by a known ottoman actuator mechanism (not shown) between a support position (see chain double-dashed lines) in which the ottoman protrudes frontward beyond the seat cushion S1 to support feet of an occupant and a retracted position (see solid lines) that is below the support position.

The side cover S5 includes a first operation lever L1 for operating the ottoman S4, a second operation lever L2 for sliding the car seat S in the lateral direction, a third operation lever L3 for adjusting the height of the car seat S, and a fourth operation lever L4 for tilting the seat back S2. Each of the levers L1, L2, L3, L4 is supported by the seat frame F, and the side cover S5 moves together with the seat fame F when the seat frame F slides along the base frame BF.

As shown in FIG. 10, the base frame BF includes a second slide rail mechanism SL2. The second slide rail mechanism SL2 mainly includes longitudinal rails 11 as one example of second rails and longitudinal sliders 12 as one example of second sliders.

A longitudinal rail 11 has an elongate shape extending long in the frontward-rearward direction; two similarly configured longitudinal rails 11 are provided in positions separate laterally from each other and extend parallel to each other. Each longitudinal rail 11 is fixed to the floor of the vehicle body by a front bracket 15 and a rear bracket 16.

Figure 11:
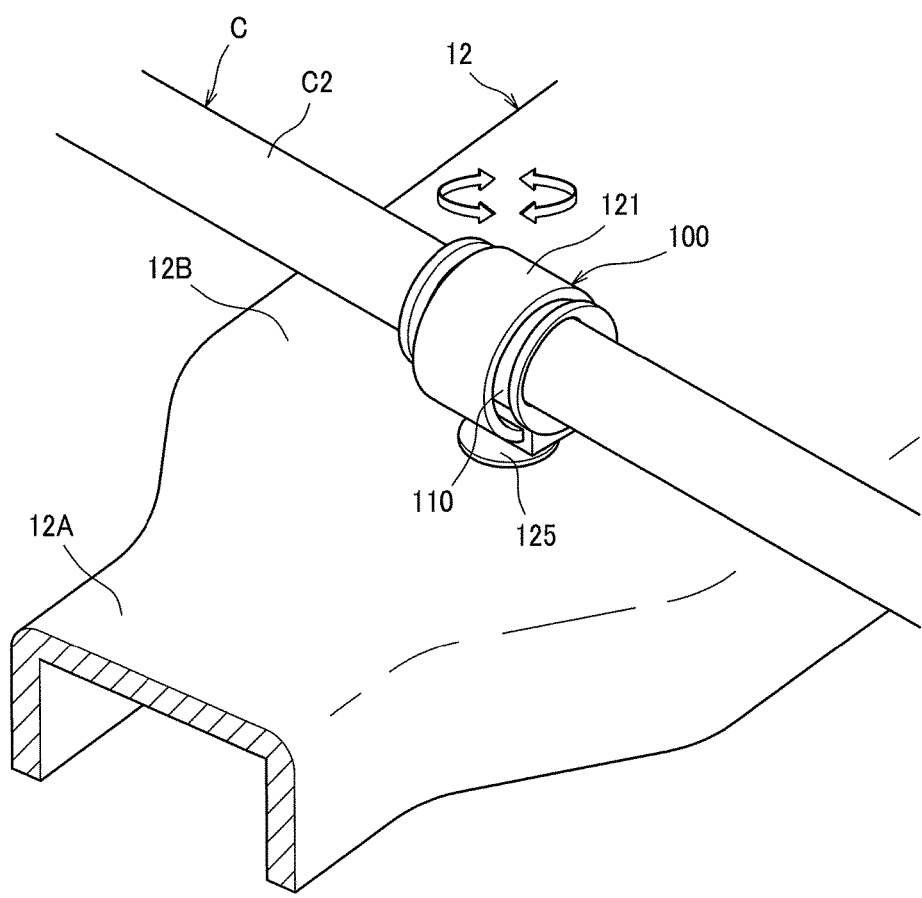
FIG. 11 is a perspective view showing a guide.

A longitudinal slider 12 has an elongate shape extending long in the frontward-rearward direction, and is configured to engage with the longitudinal rail 11 and to be slidable along the longitudinal rail 11. The longitudinal slider 12 is, as shown in FIG. 11, configured to include a narrow-width portion 12A and a wide-width portion 12B having a width wider than the narrow-width portion 12A, such that a rear-side half thereof is thicker than a front-side half thereof. The wide-width portion 12B has a through hole 12C (see FIG. 12(a)) formed therein in which a clip 122 of a guide 100 as will be described later is fixed.

Referring back to FIG. 10, the first slide rail SL1 mainly includes transverse rails 13 as one example of first rails and transverse sliders 14 as one example of first sliders.

A transverse rail 13 has an elongate shape extending long in a lateral direction; two similarly configured transverse rails 13 are provided in positions separate in the frontward-rearward direction from each other and extend parallel to each other. Each transverse rail 13 is fixed to upper surfaces of the longitudinal sliders 12, i.e., to the base frame BF.

A transverse slider 14 has an elongate shape extending long in the lateral direction, and is configured to engage with the transverse rail 13, and to be slidable along the transverse rail 13.

The transverse slider 14 is, as shown in FIG. 13(a), configured to include a slide lock member 17 for locking the transverse slider 14 on the transverse rail 13. The slide lock member 17 has a known configuration, such that an engageable projection provided on the slide lock member 17 engages with a plurality of engageable grooves provided in the transverse rail 13 to thereby lock the transverse slider 14 on the transverse rail 13.

This slide lock member 17 is connected to the second operation lever L2 of the side cover S5 by a cable C, and configured to release a lock of the transverse slider 14 through operation of the second operation lever L2. To be more specific, the cable C includes a wire C1 and a sheath C2 configured to cover and hold the wire C1 in a manner that renders the wire C1 movable inside the sheath C2 (see FIG. 12); one end of the wire C1 is connected to the slide lock member 17, while the other end of the wire C1 is connected to the second operation lever L2. When the second operation lever L2 is operated, the wire C1 pulls the slide lock member 17, so that the engageable projection is disengaged from the engageable grooves of the transverse rail 13.

The cable C is held by the guide 100 provided in the right longitudinal slider 12, and routed so that the sheath C2 does not get in touch with the edge of the seat frame F. Configuration of the guide 100 will be described in detail.

As shown in FIG. 10, the seat frame F includes a seat cushion frame F1 constituting the seat cushion S1 and a seat back frame F2 constituting the seat back S2.

The seat cushion frame F1 is a frame including a pair of laterally opposed sidewalls 31 as one example of side frames and formed in the shape of a substantially rectangular frame. The seat cushion frame F1 includes a connecting pipe 32 and an outer covering attachment member 33 each configured as one example of a connecting member that connects the pair of sidewalls 31. The connecting pipe 32 is a cylindrical pipe, and connects rear portions of the pair of sidewalls 31. The outer covering attachment member 33 is a columnar member made of metal, and connects middle portions (at the middle in the frontward-rearward direction) of the pair of sidewalls 31; on the outer covering attachment member 33, hooks (not shown) provided at one end of an outer covering of the seat cushion S1 are engaged.

The second operation lever L2 is attached to the right sidewall 31 of the seat cushion frame F1 (see FIG. 13(a)).

This seat cushion frame F1 is, as in the first embodiment, fixed on the upper surfaces of the transverse sliders 14, and configured to be horizontally movable between a first position and a second position which are the rightmost and leftmost positions, with respect to the base frame BF; since the longitudinal sliders 12 are configured to move in the frontward-rearward direction with respect to the longitudinal rails 11, the seat cushion frame F1 is also configured to be horizontally movable in the frontward-rearward direction with respect to the base frame BF.

The seat back frame F2 is a frame formed in the shape of a substantially rectangular frame and configured to be rotatable with respect to the seat cushion frame F1, i.e., capable of reclining, by means of a known mechanism through the operation of the fourth operation lever L4 provided on the side cover S5.

The seat back frame F2 includes, as in the configuration shown in FIG. 2 of the first embodiment, a protrusion (to be more specific, a rib 41) provided at a lower end of a left side thereof. The rib 41 protrudes from the side surface of the seat back frame F2 laterally outward, and extends along the rear end edge in the upward-downward direction. The lower end of the rib 41 located rearwardly of the position immediately below a rotary shaft 42 of the seat back frame F2 when the seat back frame F2 is in a raised posture relative to the seat cushion frame F1 is moved around the rotary shaft 42 in an obliquely-frontward-and-downward direction by tilting the seat back frame F2 rearward.

The car seat S includes a lock member 5 configured to constrain the seat back frame F2 from tilting rearward, and an unlock mechanism 6 configured to release a lock applied by the lock member 5, in a manner coordinated with a motion of the seat cushion frame F1 from the first position to the second position.

The lock member 5 is a member rotatably supported at a rear portion of a left sidewall 31 of the seat cushion frame F1. The lock member 5 includes an actuation part 51 disposed on a laterally outer side of the sidewall 31, and a lock part 52 disposed on a laterally inner side of the sidewall 31; the actuation part 51 and the lock part 52 thus provided with the sidewall 31 sandwiched therebetween are connected by a rotary shaft 53 (see FIG. 13(a)).

The actuation part 51 includes a substantially circular core portion 51A on which the rotary shaft 53 is fixed, a cable fixing portion 51B extending from the core portion 51A downward, and a spring fixing portion 51C extending from the core portion 51A upward.

The lock portion 52 has a proximal end portion to which the rotary shaft 53 is fixed, and has a shape of a plate extending from the rotary shaft 53 rearward. A distal end face 52A of the lock portion 52 is so formed that when a distal end 41A of the rib 41 of the seat back frame F2 is brought into contact with that distal end face 52A, a force of the distal end 41A of the rib 41 pushing the lock portion 52 is directed toward the rotary shaft 53 to prevent the lock member 5 from rotating.

The lock member 5 configured as described above is designed to be movable between a lock position (the position shown in FIG. 2) to which the lock member 5 comes when the seat back frame F2 is tilted backward and in which the distal end of the lock portion 52 is disposed in such a position that it can come in contact with the distal end 41A of the rib 41 of the seat back frame F2 and an unlock position (the position shown in FIG. 6) to which the lock member 5 is rotated from the lock position and in which the lock portion 52 is disposed in such a position that it will not interfere with the rib 41 of the seat back frame F2 when the seat back frame F2 is tilted backward. In other words, the lock member 5 in the lock position can constrain the seat back frame F2 from tilting backward, and the lock member 5 in the unlock position can allow the seat back frame F2 from tilting backward.

The lock member 5 is biased from the unlock position toward the lock position by a first tension spring R1. The first tension spring R1 has one end engaged with a support portion 31A protruding laterally outward from the sidewall 31 of the seat cushion frame F1 in a position frontward of the lock member 5, and another end engaged with the spring fixing portion 51C of the lock member 5. The first tension spring R1 is configured to pull the spring fixing portion 51C frontward, thereby biasing the lock member 5 so that the lock member 5 rotates counterclockwise in FIG. 2.

The unlock mechanism 6 includes a cable 7 which is supported by the seat cushion frame F1, and a fixed plate 8 and an engaging member 9 which are supported by a front transverse rail 13 as shown in FIG. 13(b).

The cable 7 extends in the frontward-rearward direction along the outer surface of the sidewall 31 of the seat cushion frame F1 as shown in FIG. 13(a). The cable 7 has a rear end 71 connected with the cable fixing portion 51B of the lock member 5, and a front end 72 disposed inside the frame of the seat cushion frame F1, and extends to a substantially central position in the lateral direction between the pair of sidewalls 31 of the seat cushion frame F1. An annular stopper 73 having a diameter larger than that of the cable is provided at the front end 72 of the cable 7. The cable 7 provided with this configuration is biased by the third tension spring R3 which pulls the front end 72 in a direction reverse to a side on which the rear end 71 is provided. To be more specific, the third tension spring R3 has a left end hooked on the stopper 73 of the cable 7, and a right end hooked on the spring support plate 13B fixed on the rear surface 13A of the transverse rail 13 in a position rightward of the engaging member 9 which will be described later. The third tension spring R3 pulls the stopper 73 of the cable 7 rightward. Accordingly, the front end 72 of the cable 7 is made unlikely to shift upward, downward, frontward or rearward.

As shown in FIG. 13(b), a joint portion 73A of the annular stopper 73 and the front end 72 of the cable 7 is a part (enlarged part) having a spherical shape bulged to a size larger than the thicknesses of the front end 72 of the cable 7 and the stopper 73. Accordingly, even when the stopper 73 rotates, the joint portion 73A is caught by the edges of the slot 93A of the engageable portion 93 that will be described later, so that the stopper 73 can be made unlikely to come out of the slot 93A.

The fixed plate 8 is a generally L-shaped plate, and includes a first plate portion 81 extending laterally along a rear surface 13A of the transverse rail 13 and a second plate portion 82 extending from the left end of the first plate portion 81 rearward. The first plate portion 81 has two laterally arranged through holes (not shown) provided in a substantially central position in the lateral direction. The second plate portion 82 has a frontwardly recessed slot 82A provided at its rear end.

The engaging member 9 is a member having a shape of a plate engageable with the distal end of the cable 7 (to be more specific, the stopper 73 or the joint portion 73A). The engaging member 9 includes a supported portion 91 lapped on the first plate portion 81 of the fixed plate 8, a connecting portion 92 extending from the lower end of the supported portion 91 rearward, an engageable portion 93 extending from the left end of the connecting portion 92 upward, and a spring support portion 94 provided at the right end of the connecting portion 92.

The supported portion 91 is formed to extend long in the lateral direction along the first plate portion 81 of the fixed plate 8, and has a laterally elongated slot hole 91A piercing in the frontward-rearward direction.

The connecting portion 92 is formed to have substantially the same lateral dimension as that of the supported portion 91, and extends rearward with its rear end located at substantially the same position as that of the rear end of the second plate portion 82 of the fixed plate 8.

The engageable portion 93 is provided at the rear of the connecting portion 92, and has a slot 93A disposed opposite to the slot 82A of the fixed plate 8, wherein the slot 93A is recessed from the upper end of the engageable portion 93 downward (i.e., in a direction different from the direction of recess of the slot 82A). The lateral width of the slot 93A is configured to be smaller than those of the stopper 73 and the joint portion 73A of the cable 7.

The spring support portion 94 protrudes rightward from the right end of the connecting portion 92 with its distal end portion bent upward. The spring support portion 94 has a through hole (designation of reference character omitted) piercing through in the lateral direction at the distal end portion.

The fixed plate 8 and the engaging member 9 configured as described above are arranged such that the first plate portion 81 of the fixed plate 8, the supported portion 91 of the engaging member 9 are laminated in this sequence on the rear surface 13A of the transverse rail 13.

The engaging member 9 is configured such that the engageable portion 93 is disposed on the left side of the stopper 73 of the cable 7, to be more specific, in such a position that the engageable portion 93 is engageable with the stopper 73 of the cable 7 immediately before the seat cushion frame F1 moving from the first position toward the second position comes to the second position; the front end 72 of the cable 7 is disposed in the slot 93A of the engageable portion 93 so as to be held thereby from the front and from the rear. The fixed plate 8 is configured such that the second plate portion 82 is disposed in a position separate from the engageable portion 93 to the left the same distance as or a distance longer than a distance of travel of the seat cushion frame F1 from a position in which the stopper 73 of the cable 7 engages the engageable portion 93 of the engaging member 9 to the second position; the front end 72 of the cable 7 is disposed in the slot 82A of the second plate portion 82 so as to be held thereby from above and from below.

The fixed plate 8 is fixed on the transverse rail 13 by two flanged pins B inserted through the through holes formed in the first plate portion 81. The engaging member 9 has its slot hole 91A formed in its supported portion 91 and engaged with the two flanged pins B, whereby the engaging member 9 is laterally movable with respect to the transverse rail 13 (base frame BF) and the fixed plate 8.

The engaging member 9 is biased by a second tension spring R2 in a direction (i.e., rightward direction) reverse to a direction of a force received by the engageable portion 93 of the engaging member 9 from the stopper 73 of the cable 7 when the stopper 73 of the cable 7 engages the engageable portion 93 of the engaging member 9.

The second tension spring R2 has its left end hooked on the spring support portion 94 of the engaging member 9 and its right end hooked on the spring support plate 13B as shown in FIG. 13(a). The second tension spring R2 pulls the engaging member 9 in the rightward direction.

The biasing force of the second tension spring R2 is smaller than a sufficient force for laterally moving the seat cushion frame F1, and greater than a necessary force for moving the lock member 5 from the lock position to the unlock position. In this setting, the engaging member 9 to which a force greater than the biasing force of the second tension spring R2 is not applied from the cable 7 comes to the rightmost position in which the flanged pin B comes in contact with the left end of the slot hole 91A, and when a force greater than the biasing force of the second tension spring R2 is applied from the cable 7, the engaging member 9 can move leftward together with the cable 7 against the biasing force of the second tension spring R2.

Next, a detailed description will be given of the guide 100 holding the sheath C2 of the cable C.

Figure 12:
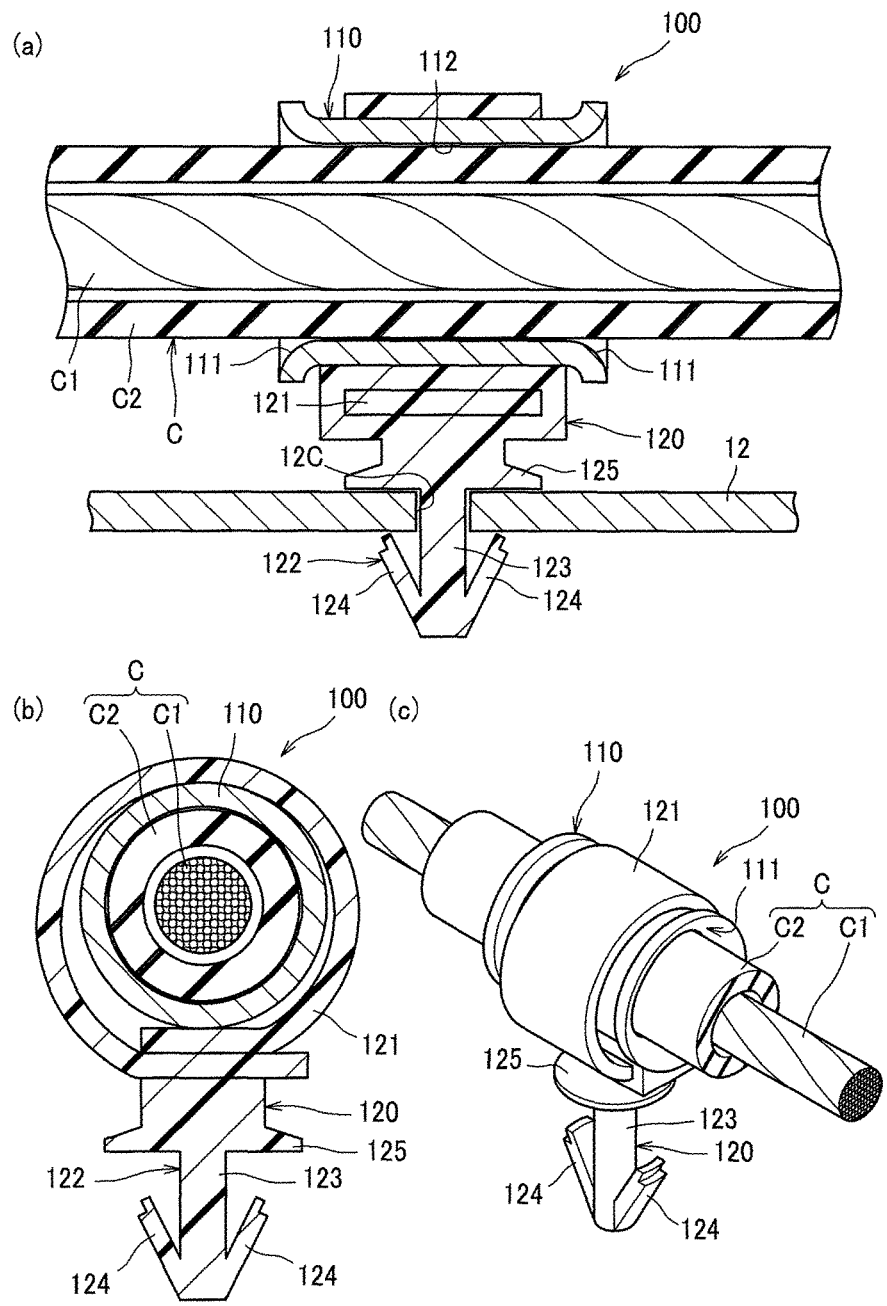
FIG. 12 includes (a) a sectional view of the guide taken along a plane extending in a direction of extension of a wire; (b) a sectional view of the guide taken along a plane intersecting the direction of extension of the wire; and (c) a perspective view of the guide.

The guide 100 is, as shown in FIG. 12, configured to include a guiding body 110 in which the sheath C2 is inserted, and a supporting member 120 supporting the guiding body 110.

The guiding body 110 is formed in the shape of a circular cylinder having two open ends. To be more specific, the guiding body 110 has a pair of openings 111 at both ends, and a passage 112 connecting the pair of openings 111 is formed between the pair of openings 111. The guiding body 110 has an inside diameter larger than an outside diameter of the sheath C2, so that the sheath C2 is movable along the passage 112 inside the guiding body 110.

The guiding body 110 is configured such that the openings 111 assume shapes widening toward the outer ends, i.e., the exits of the passage 112. This makes it unlikely that the sheath C2 catches in the edges of the guiding body 110, thus making the sheath C2 easily movable, as well as making it possible to reduce the risk of damage to the sheath C2 which would be caused by its contact with the edges of the guiding body 110.

The supporting member 120 includes a band 121 wound around the guiding body 110, and a clip 122. The supporting member 120 is preferably formed of plastic so that hooks 124 of the clip 122 that will be described later have flexibility.

The band 121 is a tie-down band integrally formed with the clip 122, and is wound around the guiding body 110 having the sheath C2 passed therethrough, to thereby fix the guiding body 110 to the clip 122.

The clip 122 includes a neck 123 extending in the upward-downward direction, a pair of hooks 124 provided at a lower end of the neck 123, and a flange 125 provided at an upper end of the neck 123.

The neck 123 is formed to be narrower than the through hole 12C provided in the longitudinal slider 12.

The pair of hooks 124 are provided in respective positions on the opposite sides of the neck 123, and each shaped like a plate extending from the lower end of the neck 123 radially outside in an upwardly-slanted direction. This hooks 124 have flexibility such as to yield, making the distal end of the clip 122 able to pass through the through hole 12C of the longitudinal slider 12, when the guide 100 is attached to the longitudinal slider 12.

The flange 125 extends radially outside from the neck 123, and has a size larger than that of the through hole 12C of the longitudinal slider 12. The flange 125 is formed integrally with the band 121 provided on its upper surface. The distance between the upper end of the pair of hooks 124 and the lower surface of the flange 125 are determined to be substantially the same as the thickness of the longitudinal slider 12.

The guide 100 configured as described above is provided, as shown in FIG. 11 and FIG. 12(a), on the longitudinal slider 12, with the sheath C2 passed through the pair of openings 111 of the guiding body 110 and thus disposed inside the guiding body 110, in such a manner that the passage 112 orients in the direction of extension of the sheath C2 held by the guide 100.

To be more specific, as shown in FIG. 12(a), the guide 100 is supported by the longitudinal slider 12 with the clip 122 fitted in the through hole 12C of the longitudinal slider 12. The guide 100 retained on the longitudinal slider 12 is configured to hold the longitudinal slider 12 by the flange 125 and the upper ends of the hooks 124, thus rendered unlikely to come off from the longitudinal slider 12. Play provided between the neck 123 of the guide 100 and the through hole 12C of the longitudinal slider 12 renders the guide 100 rotatable relative to the longitudinal slider 12 about an axis perpendicular to the direction of extension of the passage 112 of the guiding body 110, more specifically, about an axis extending in the upward-downward direction.

The guide 100 is preferably disposed, as shown in FIG. 10, in a position shifted in a frontward or rearward direction from the connecting pipe 32 and the outer covering attachment member 33 of the seat cushion frame F1. This arrangement facilitates the operation of mounting the guide 100 in that the connecting pipe 32 and the outer covering attachment member 33 will not become an obstacle when the guide 100 is mounted.

Operations and advantages realized in the car seat S configured as described above according to the present embodiment will be discussed below.

As shown in FIG. 13(a), when the car seat S is in the rightmost position, the seat cushion frame F1 is in the first position, and the lock member 5 is in the lock position as shown in FIG. 2. In this state, when the fourth operation lever L4 is operated to cause the seat back frame F2 to tilt rearward, the distal end 41A of the rib 41 of the seat back frame F2 is brought into contact with the distal end face 52A of the lock portion 52 of the lock member 5 as shown in FIG. 3, and the rearward tilting motion of the seat back frame F2 is constrained.

As described above, when the seat cushion frame F1 is in the first position, the rearward tilting motion of the seat back frame F2 is constrained; therefore, even when a part of the vehicle body such as a wheelhouse exists at the rear side of the car seat S, interference of the seat back S2 with such a part of the vehicle body can be suppressed.

Figure 14:
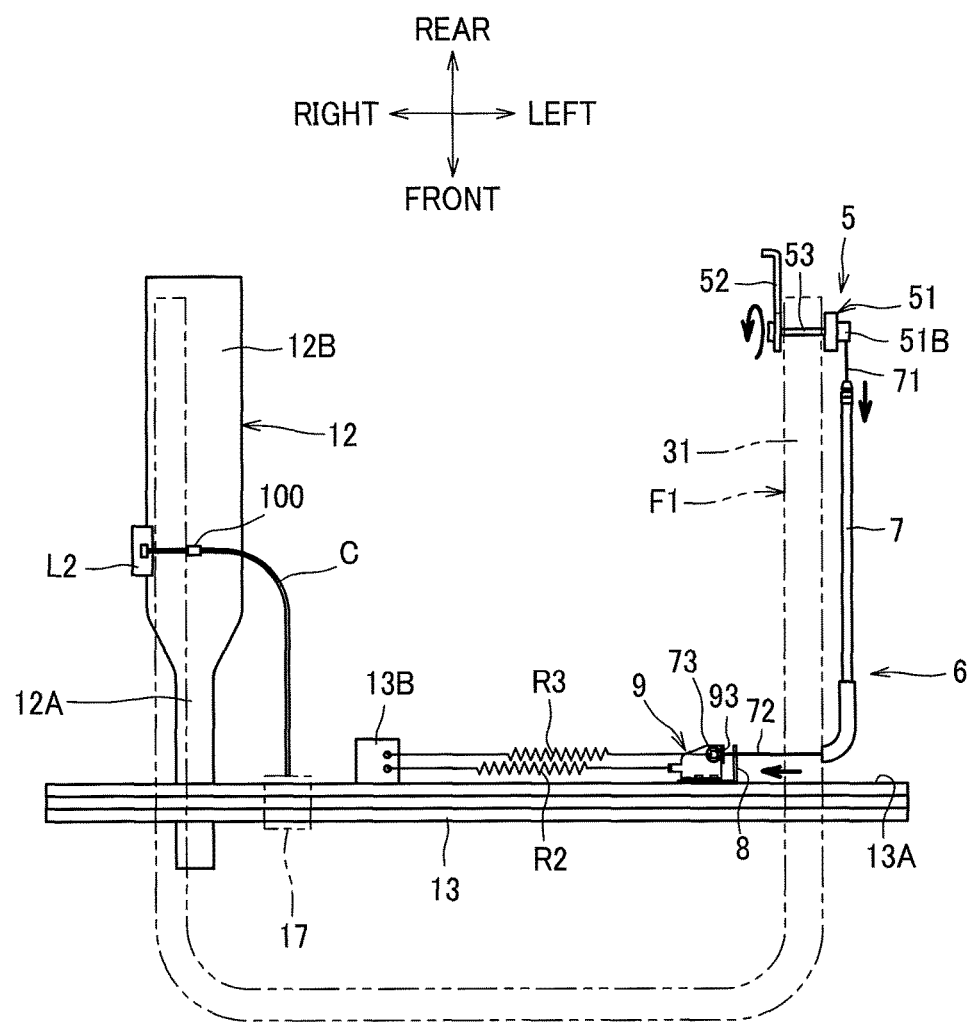
FIG. 14 is a view of the lock member and the unlock mechanism in the second position as viewed from above.

When the seat cushion frame F1 with the seat back frame F2 raised thereon is moved to the left through the operation of the second operation lever L2, the stopper 73 of the cable 7 catches in and engages with the engageable portion 93 (the edges of the slot 93A) of the engaging member 9, as shown in FIG. 14. In other words, the engagement of the engageable portion 93 with the stopper 73 of the cable 7 occurs while the seat cushion frame F1 is moving from the first position to the second position.

In this state, when the seat cushion frame F1 is operated to move further leftward toward the second position, a force directed in the leftward direction is acted on the engageable portion 93 from the stopper 73 of the cable 7; however, as the biasing force of the second tension spring R2 pulling the engaging member 9 to the right is greater than this force, and thus the engaging member 9 does not move relative to the fixed plate 8. Accordingly, the engageable portion 93 pulls the cable 7, and the cable 7 causes the lock member 5 to rotate and move from the lock position to the unlock position as shown in FIG. 14, so that the lock applied by the lock member 5 is released.

When the seat cushion frame F1 is in the second position, the rib 41 of the seat back frame F2 caused to tilt rearward through the operation of the fourth operation lever L4 never interferes with the lock member 5 as shown in FIG. 7, so that the seat back frame F2 can be tilted down to the full.

As shown in FIG. 14, when the seat cushion frame F1 is being moved from the first position toward the second position, the cable C as a whole moves together with the seat cushion frame F1. Then, the sheath C2 of the cable C is movable through the passage 112 of the guide 100 relative to the guide 100, and thus the cable C is not caught by the guide 100. Accordingly, the seat cushion frame F1 can be slid smoothly. Since the moving sheath C2 is then not pulled by the guide 100, deformation of the sheath C2 can be suppressed.

Since the guide is rotatable relative to the longitudinal slider 12, even when the mode of bending of the cable C in the position where the guide 100 is located changes in accordance with the movement of the seat cushion frame F1 relative to the longitudinal slider 12 (guide 100), the orientations of the openings 111 of the guide 100 can be changed according to the mode of bending of the cable C. Thus, the movable range of the sheath C2 is enlarged, and the deformation of the sheath C2 can be suppressed more effectively.

Since the guide 100 is provided on the wide-width portion 12B, i.e., a portion having a higher rigidity, of the longitudinal slider 12, the guide 100 can be supported stably even when the guide 100 receives a force from the sheath C2.

To return the car seat S from the second position back to the first position, the fourth operation lever L4 is first operated to raise the seat back frame F2, and then the second operation lever L2 is operated to move the car seat S. When the seat cushion frame F1 is moved from the second position toward the first position, the stopper 73 of the cable 7 moves to the right, and thus the engagement of the engageable portion 93 of the engaging member 9 with the cable 7 is released. As a result, the cable 7 is no more pulled by the engageable portion 93, and the lock member 5 is moved from the unlock position to the lock position by the biasing force of the first tension spring R1.

In this operation of moving the seat cushion frame F1 from the second position to the first position, as well, the sheath C2 of the cable C can be moved while being guided by the guide 100, and thus the sheath C2 is not caught by the guide 100. Therefore, the seat cushion frame F1 can be slide smoothly. The sheath C2 is then not pulled by the guide 100, and thus the deformation of the sheath C2 can be suppressed.

If the seat back frame F2 on the seat cushion frame F1 located in the first position is forcefully operated to tilt rearward, the lock member 5 may possibly catch on the rib 41 and become unrotatable. If the seat cushion frame F1 in this state is moved toward the second position, engagement of the stopper 73 of the cable 7 with the engageable portion 93 of the engaging member 9 fails to cause the lock member 5 to rotate, and thus the engageable portion 93 cannot pull the cable 7, bringing about a tensely stretched state of the cable 7, so that a force greater than the biasing force (a specific force) of the second tension spring R2 is applied by the cable 7 to the engageable portion 93. Accordingly, as shown in FIG. 15(a), (b), the cable 7 pulls the engaging member 9 by the force greater than the biasing force of the second tension spring R2, and causes the engaging member 9 to move to the left.

Since the engaging member 9 will not pull the cable 7 but move together with the cable 7 with respect to the fixed plate 8 when the lock member 5 becomes unmovable, the stretch of the cable 7 can be suppressed.

When the seat cushion frame F1 is returned back to the first position, the stopper 73 of the cable 7 is separated from the engageable portion 93, and thus the engaging member 9 is returned to the original position (the position on the right side) by the biasing force of the second tension spring R2.

When the seat cushion frame F1 is moved in the frontward-rearward direction, i.e., a direction different from the direction of extension of the passage 112 of the guiding body 110, the longitudinal slider 12 moves along the longitudinal rail 11, and the seat cushion frame F1 and the guide 100 move together with the longitudinal slider 12. In other words, the guide 100 moves along with the sheath C2;

therefore, the sheath C2 is not pulled by the guide 100. Accordingly, the seat cushion frame F1 can be slid smoothly. Since the sheath C2 in this operation is not pulled by the guide 100, deformation of the sheath C2 can be suppressed.

Although the second embodiment has been described above, the present invention is not limited to the embodiment described above. Specific configurations may be modified where appropriate without departing from the gist of the present invention.

In the above-described embodiment, the guiding body 110 of the guide 100 has the shape of a circular cylinder, but the present invention is not limited to this configuration. For example, the guiding body may be formed in the shape of a tube having a polygonal cross section. Also, as shown in FIG. 16(a), a guiding body 130 may be formed with a partially cutaway cylindrical sidewall to have a shape of a letter C as viewed in cross section. In this configuration, if the guiding body 130 is formed integrally with the supporting member 120, i.e., of plastic, then the cutaway portion of the sidewall can be spread wide apart to hold the sheath C2; therefore, the sheath C2 can be held in the guide 100 after the guide 100 is attached to the longitudinal slider 12. This facilitates the operation of attachment of the guide 100 in comparison with a configuration in which attachment of the sheath C2 to the guiding body is followed by the attachment of the guide 100 to the longitudinal slider 12.

In the above-described embodiments, the guiding body 110 of the guide 100 is formed in a tubular shape, but the present invention is not limited to this configuration. For example, as shown in FIG. 16(b), a guiding body 140 is configured as a pair of rings 141 fixed on the upper surface of the flange 125 of the supporting member 120. The pair of rings 141 are disposed in positions separate from each other in the direction of extension of the sheath C2, and each ring 141 has an opening through which the sheath C2 is passed. The guiding body 140 with the sheath C2 passed through the openings of the pair of rings 141 can guide the sheath C2 along a path connecting the openings of the pair of rings 141.

In the above-described embodiment, the guide 100 is provided to rotate with respect to the longitudinal slider 12, about an axis extending in the upward-downward direction, but the present invention is not limited to this configuration. For example, the guide 100 may be configured, with a ball joint or the like, to rotate about an axis extending in a direction perpendicular to the both of the direction of extension of the passage 112 of the guiding body 110 and the upward-downward direction. In other words, the guiding body 110 may be configured to rotate with the ends thereof allowed to be movable upward and downward in seesaw fashion.

Configuring the guide 100 like this increases the movable range of the sheath C2, thus reducing the risk of deformation of the sheath C2 more significantly.

In the above-described embodiment, the guide 100 is made rotatable relative to the longitudinal slider 12 by making the neck 123 of the clip 122 rotatable in the through hole 12C of the longitudinal slider 12, but the present invention is not limited to this configuration. For example, the guide may be configured such that the guiding body made rotatable relative to the clip is provided, and that the guide can be rotated relative to the longitudinal slider 12 by causing the guiding body to rotate relative to the clip.

With this configuration, the risk of wearing out of the neck of the clip in contact with the edge of the through hole 12C of the longitudinal slider 12 can be reduced.

In the above-described embodiment, the guide 100 is provided at the longitudinal slider 12, but the present invention is not limited to this configuration. For example, the guide 100 may be provided at the other member constituting the base frame BF, or the transverse rail 13. To be more specific, the guide 100 may be provided on the side surface of the longitudinal rail 11, or the underside of the transverse rail 13.

In the above-described embodiment, the guide 100 is configured to hold the sheath C2 of the cable C connecting the second operation lever L2 and the slide lock member 17, but the present invention is not limited to this configuration. The guide 100 may be provided for a cable provided at the seat frame F, for example, for a harness used for power supply, signal transmission, or the like.

Third Embodiment

Figure 17:
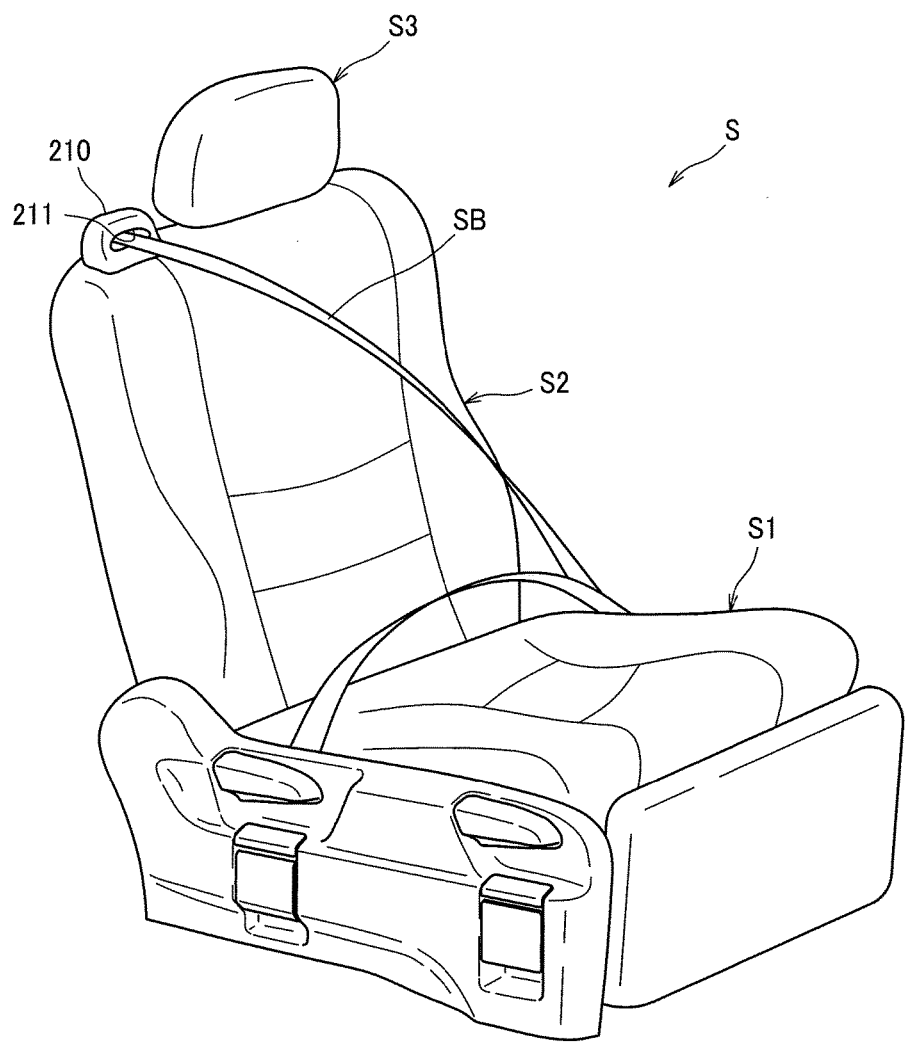
FIG. 17 is a perspective view of a car seat as a vehicle seat according to a third embodiment.

Next, a detailed description of a third embodiment will be given with reference made mainly to FIGS. 17 to 29. As shown in FIG. 17, a car seat S is a seat used as a rear seat of an automobile, and mainly includes a seat cushion S1, a seat back S2, and a headrest S3.

At an upper end (right end of the upper end) of a right shoulder of the seat back S2, a belt guide member 210 supporting a seat belt SB in a manner that permits the seat belt SB to be pulled out through a guide hole 211 is provided.

Figure 18:
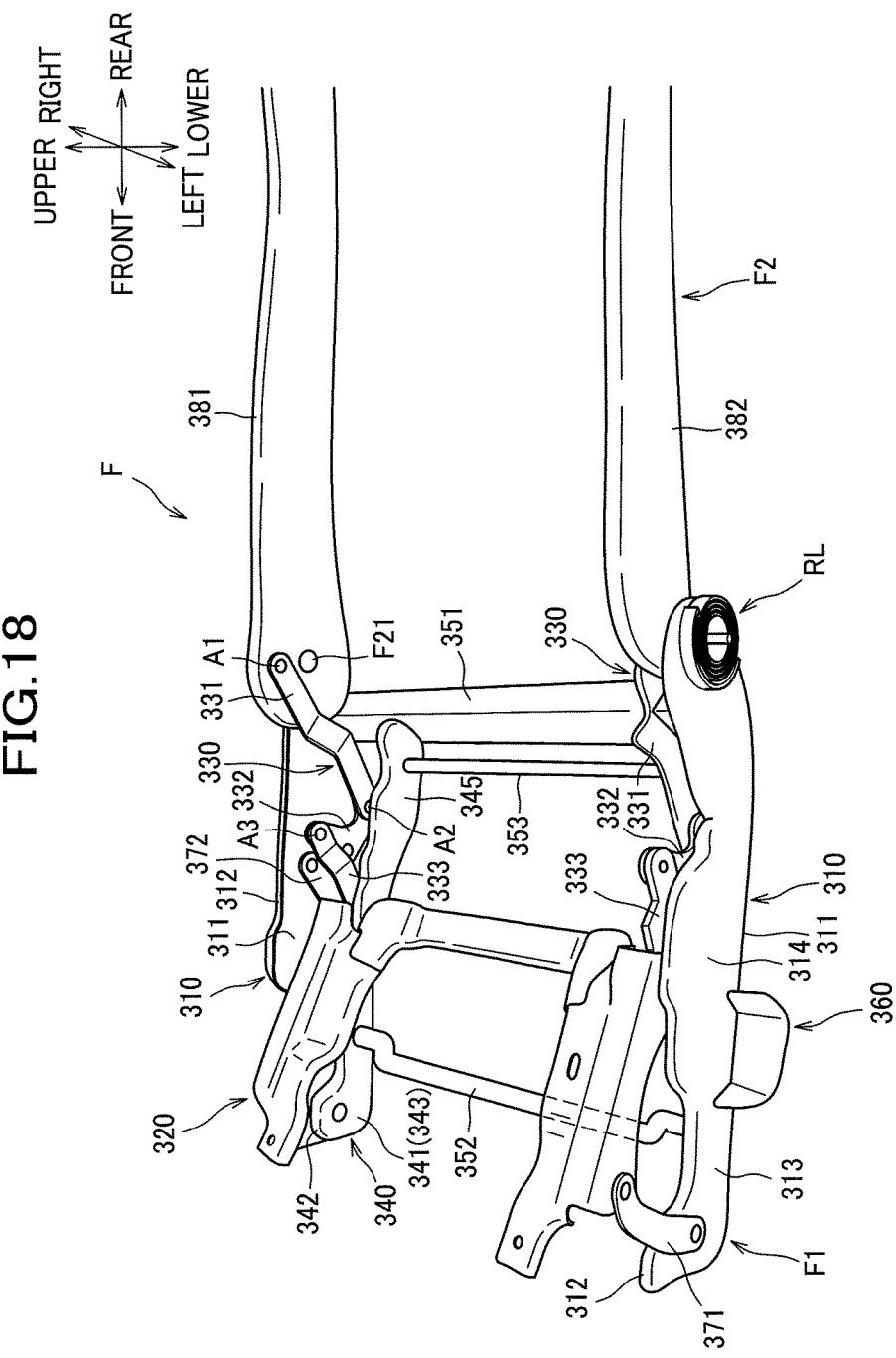
FIG. 18 is a perspective view showing a seat frame in a state with a seat back tilted down.

The seat cushion S1 and the seat back S2 are configured to incorporate a seat frame F as shown in FIG. 18. The seat frame F mainly includes a seat cushion frame F1 constituting a frame of the seat cushion 51 and a seat back frame F2 constituting a frame of the seat back S2. The seat cushion S1 is configured such that the seat cushion frame F1 is upholstered with a seat cushion pad made of a cushiony material such as urethane foam and an outer covering made of synthetic leather, fabric or the like, whereas the seat back S2 is configured such that the seat back frame F2 is upholstered with a seat back pad made of a cushiony material such as urethane foam and an outer covering made of synthetic leather, fabric or the like.

Figure 25:
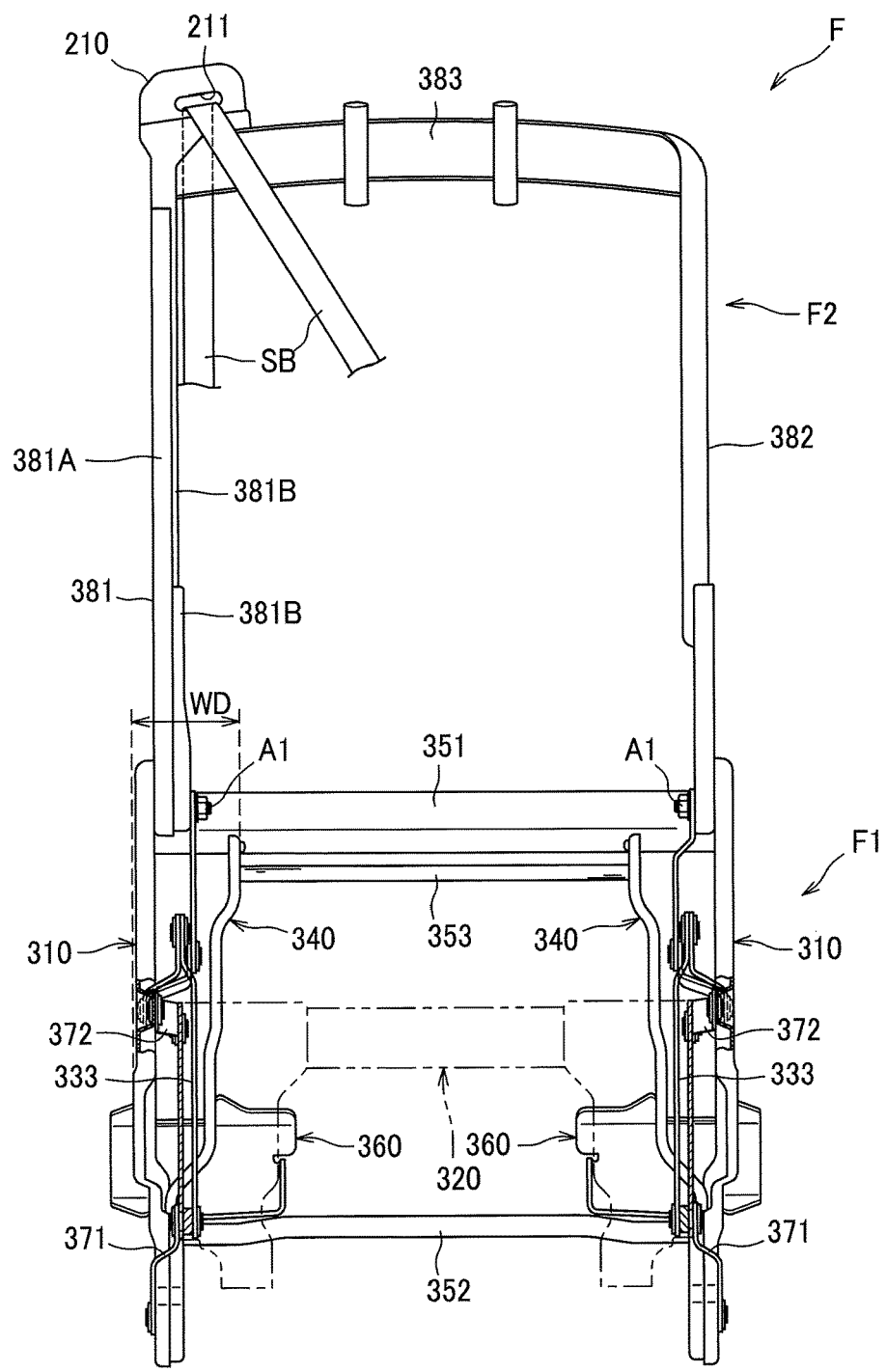
FIG. 25 is a view of a seat frame as viewed from an obliquely-frontward-and-upward direction.

The seat back frame F2 is configured, as shown in FIG. 25, to include left and right side frames 381, 382, and an upper connecting member 383 as a pipe member connecting upper ends of these side frames 381, 382. The seat back frame F2 is, as shown in FIG. 18, configured to be rotatable with a lower end thereof rotatably supported via a reclining mechanism RL to the rear portion of the seat cushion frame F1. With this configuration, the seat back S2 is allowed to be tilted frontward and rearward with respect to the seat cushion S1.

It is to be understood that FIG. 18 shows a state in which the seat back frame F2 is tilted to a rearmost position (rearward-tilted position that will be described later) with respect to the seat cushion frame F1. In this disclosure, the frontward, rearward, leftward, rightward, upward and downward are used to indicate directions with reference to an occupant seated on the car seat S assuming a state in which the seat back S2 is not tilted by the reclining mechanism RL (reference position that will be described later).

Next, a detailed description of the seat cushion frame F1 will be given below.

Figure 19:
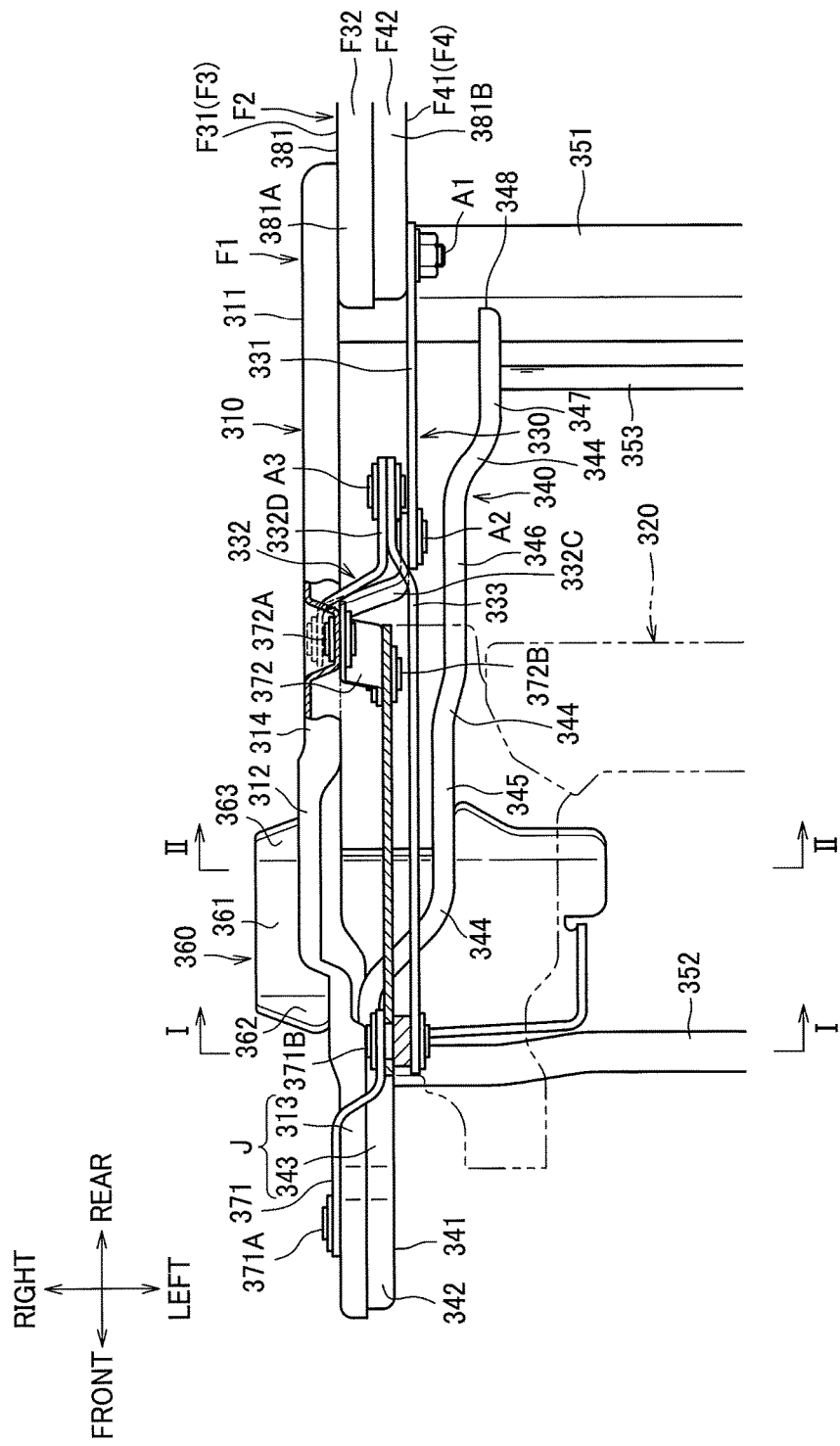
FIG. 19 is a plan view showing a right-side portion of a seat cushion frame.

As shown in FIGS. 18 to 20, the seat cushion frame F1 includes left and right side frames 310, a movable member 320 capable of making a frontward-rearward motion and a tilting motion with respect to the left and right side frames 310, and transmission mechanisms 330 connected to the movable member 320 and the seat back frames F2 to transmit the tilting motion of the seat back frame F2 to the movable member 320.

The left and right side frames 310 are metal frames extending in the frontward-rearward direction, and disposed in laterally separate positions. A side frame 310 includes a first sidewall portion 311 forming a side surface of the side frame 310, and a first flange portion 312 extending from a peripheral edge of the first sidewall portion 311 to a laterally inner side. A front end portion 313 that is a front-end-side portion of the side frame 310 is formed to extend in the frontward-rearward direction, and a rear portion 314 that is a portion rearward of the front end portion 313 is formed to bend at a rear end of the front end portion 313 to a laterally outer side, and further bend to extend rearward. Inner frames 340 (only one of which is shown in the drawing) extending in the frontward-rearward direction and each connected to the corresponding side frame 310 are provided, respectively, at laterally inner sides of the left and right side frames 310.

An inner frame 340 includes a second sidewall portion 341 forming a side surface of the inner frame 340, and a second flange portion 342 extending from a peripheral edge of the second sidewall portion 341 to a laterally inner side. A front end portion 343 that is a front-end-side portion of the inner frame 340 is formed to extend in the frontward-rearward direction, and directly joined by welding to the front end portion 313 of the side frame 310.

The inner frame 340 includes three bent portions 344, that is, the inner frame 340 is bent at three locations in such a manner that a portion rearward of each bent portion is shifted to a laterally inner side relative to the front end portion 343. To be more specific, the inner frame 340 includes, besides the aforementioned front end portion 343, three bent portions 344, a first intermediate portion 345, a second intermediate portion 346, and a rear end portion 347; these portions 345, 346 and 347 are disposed laterally inward of the front end portion 343. The first intermediate portion 345 is connected to a rear end of the front end portion 343 via the bent portion 344, thus disposed in a position shifted to the laterally inner side than that of the front end portion 343, and the second intermediate portion 346 is connected to a rear end of the first intermediate portion 345 via the bent portion 344, thus disposed in a position shifted to the laterally inner side than that of the first intermediate portion 345.

The rear end portion 347 is connected via the bent portion 344 to the rear end of the second intermediate portion 346, and thus disposed in a position shifted to the laterally inner side than that of the second intermediate portion 346. With this configuration, the rear end portion 347 of the inner frame 340 and the rear portion 314 of the side frame 310 are located in positions laterally separate from each other.

Accordingly, the rear end 348 of the inner frame 340 is disposed separately in a laterally inward direction with respect to the side frame 310. This rear end 348 is connected to a connecting beam 351 as one example of a connecting member. The connecting beam 351 is a tubular member with a generally rectangular cross section, extending in the lateral direction, and the both ends thereof are joined to the rear portions 314 of the left and right side frames 310.

The inner frames 340 are connected at rear end portions 347 rearward of the rearmost bent portions 344 in positions separate frontwardly from the connecting beam 351 by a connecting pipe (connecting member) 353 having a cylindrical shape which connects the left and right inner frames 340.

Connection of the inner frames 340 to the side frames 310 as described above serves to reinforce the side frames 310 by the inner frames 340, and thus can enhance the rigidity of the side frames 310. Also, since the inner frames 340 reinforcing the side frames 310 are disposed on laterally inner sides of the side frames 310, the car seat S can be downsized in the lateral direction in comparison, for example, with a configuration in which reinforcing members are provided on laterally outer sides of the side frames.

The inner frames 340 have bent portions 344, and thus assume three-dimensional shapes, which have a high rigidity. The left and right inner frames 340 are not only connected by the connecting beams 351 at the rear ends 348 which are short in distance, but also connected by the connecting pipe 353 at the rear end portion 347 which are high in rigidity and short in distance; therefore, twisting is suppressed, and an extremely high-rigidity structure is achieved.

Since the front end portions 313 of the side frame 310 and the front end portion 343 of the inner frame 340 are directly joined together, obstruction to the motion of a transmission mechanism 330 that will be described later, by a joint portion J between the side frame 310 and the inner frame 340 can be suppressed, in comparison, for example, with a configuration in which the rear end portions of the side frame and the inner frame are directly joined together, and thus the transmission mechanism 330 can be operated smoothly.

The side frame 310, the inner frame 340 and the connecting beam 351 are configured to have a triangular shape in a plan view, and thus have a high rigidity such that deformation is unlikely to occur in a horizontal plane. These members are also configured as plates extending generally vertically, and thus have a high rigidity such that deformation is unlikely to occur upward or downward as well.

The joint portion J provided by directly joining the front end portion 313 of the side frame 310 and the front end portion 343 of the inner frame 340 is, as shown in FIG. 20(a), configured to have a closed-section structure. To be more specific, the joint portion J is configured with the front-end-side portions of the first sidewall portion 311 and the first flange portion 312 of the side frame 310, and the front-end-side portions of the second sidewall portion 341 and the second flange portion 342 of the inner frame 340 as described above, such that the front-end-side portion of the first flange portion 312 and the front-end-side portion of the second flange portion 342 are joined together by welding to form the closed-section structure.

Providing the joint portion J with a closed-section structure as described above makes it possible to increase the rigidity of the joint portion J, which increases the rigidity of the side frames 310.

Such a closed-section structure is, as shown in FIG. 19, applied to the seat back frame F2, as well. To be more specific, the seat back frame F2 includes an outside back frame F3 disposed at a laterally outer side, and an inside back frame F4 disposed at a laterally inner side; the outside back frame F3 includes a third sidewall portion F31 forming a side surface of the outside back frame F3, and a third flange portion F32 extending from a peripheral edge of the third sidewall portion F31 to a laterally inner side; the inside back frame F4 includes a fourth sidewall portion F41 forming a side surface of the inside back frame F4, and a fourth flange portion F42 extending from a peripheral edge of the fourth sidewall portion F41 to a laterally outer side. The flange portions F32, F42 are joined together by welding.

The seat back frame F2 having such a closed-section structure is disposed between the side frame 310 and the first transmission link 331.

Left and right joint portions J that are provided, respectively, for the left and right side frames 310 and the left and right inner frames 340 are connected by a connecting pipe 352 having a cylindrical shape as one example of a laterally extending connecting member. This configuration makes it possible to suppress twisting of the inner frames 340, to further increase the rigidity of the left and right joint portions J, and to further increase the rigidity of the side frames 310.

To lower sides of the side frame 310 and the inner frame 340, specifically in a position near the rear end of the joint portion J, a bracket 360 that laterally sandwiches and holds the side frame 310 and the inner frame 340 is joined by welding. The bracket 360 is an integral part including a base portion 361 having a shape of a plate extending in a direction perpendicular to the vertical direction from a laterally outer side position of the side frame 310 to a laterally inner side position of the inner frame 340, a first holding portion 362 extending from a front end of the base portion 361 upward to hold the joint portion J, and a second holding portion 363 extending from a rear end of the base portion 361 upward to hold a portion other than the joint portion J.

As shown in FIG. 20(a), the first holding portion 362 has a slot 362A having substantially the same width as the lateral width of the joint portion J, such that the joint portion J is held within the slot 362A, and both of left and right side edges of the slot 362A are welded to the joint portion J. As shown in FIG. 20(b), the second holding portion 363 has a slot 363A having substantially the same width as the length from an outer surface at a laterally outer side of the rear portion 314 of the side frame 310 to an inner surface at a laterally inner side of the first intermediate portion 345 of the inner frame 340, such that the rear portion 314 of the side frame 310 and the first intermediate portion 345 of the inner frame 340 are held within the slot 363A, and both of left and right side edges of the slot 363A are welded to the side frame 310 or the inner frame 340.

Provision of the bracket 360 configured as described above makes it possible to further improve the rigidity of the side frame 310. Moreover, since the bracket 360 includes the first holding portion 362 and the second holding portion 363 configured as an integral part, the number of parts can be reduced and an operation of mounting the bracket 360 can be simplified, in comparison, for example, with a configuration in which a bracket for holding a joint portion and a bracket for holding a portion other than the joint portion are provided separately.

Figure 21:
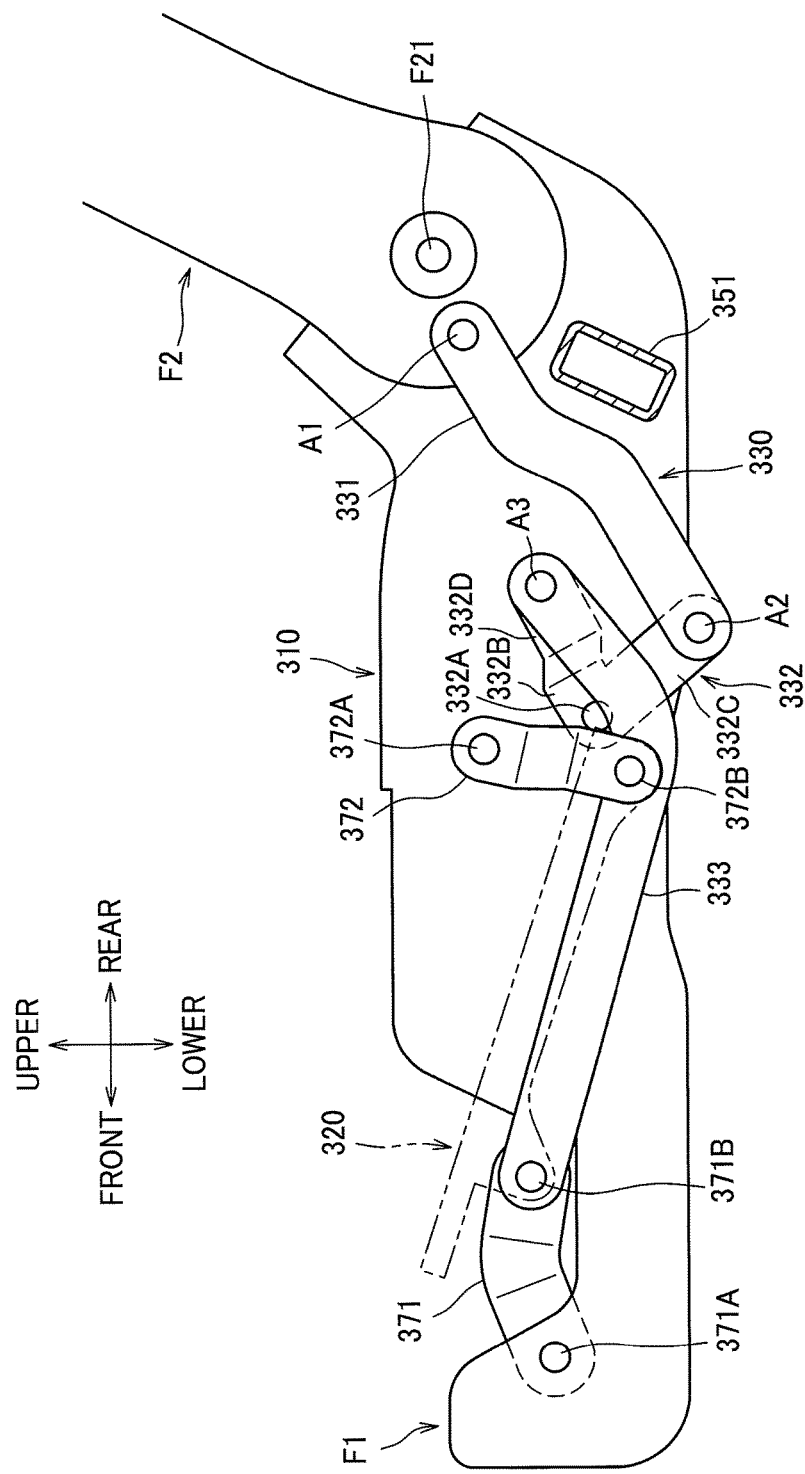
FIG. 21 is a side view showing a transmission mechanism.

As shown in FIG. 20, the movable member 320 is formed generally in the shape of a letter U in a plan view, and a pan frame (not shown) is provided thereon. The movable member 320 is, as shown in FIG. 21, supported by left and right front links 371 and rear links 372 that are pivotally provided on the left and right side frames 310, and thereby configured to be able to move frontward and rearward and to tilt relative to the side frames 310. A front link 371 is so formed as to extend from a laterally outer side to a laterally inner side of the front end portion 313 of the side frame 310, with one end pivotally connected to a laterally outer side of the front end portion 313 of the side frame 310, and the other end pivotally connected to a front-side portion of the movable member 320 (see also FIG. 19).

To be more specific, the front link 371 extends from a front-side fixed shaft 371A in a substantially rearward direction along an outer surface of the laterally outer side of the side frame 310, then is bent in a laterally inward direction and extends to a position laterally inward of the side frame 310, thereafter extends in a substantially rearward direction, and its rear end portion is pivotally connected to the movable member 320 via a front-side movable shaft 371B. Since the one end of the front link 371 is connected to the laterally outer side of the side frame 310, interference of the front link 371 with the connecting pipe 352 can be suppressed, and the movable member 320 can be operated smoothly, in comparison, for example, with a configuration in which one end portion of the front link is connected to an inner side of the inner frame.

The rear link 372 is disposed in a position rearward of the front link 371 and laterally inward of the side frame 310, with one end pivotally connected to the side frame 310 via a rear-side fixed shaft 372A, and the other end pivotally connected to a rear portion of the movable member 320 via a rear-side movable shaft 372B. To be more specific, the rear link 372 is formed to extend from the rear-side fixed shaft 372A in a substantially downward direction, then be bent in a laterally inward direction and extend to a side surface of the movable member 320, and thereafter extend in the substantially downward direction along the side surface.

Figure 22:
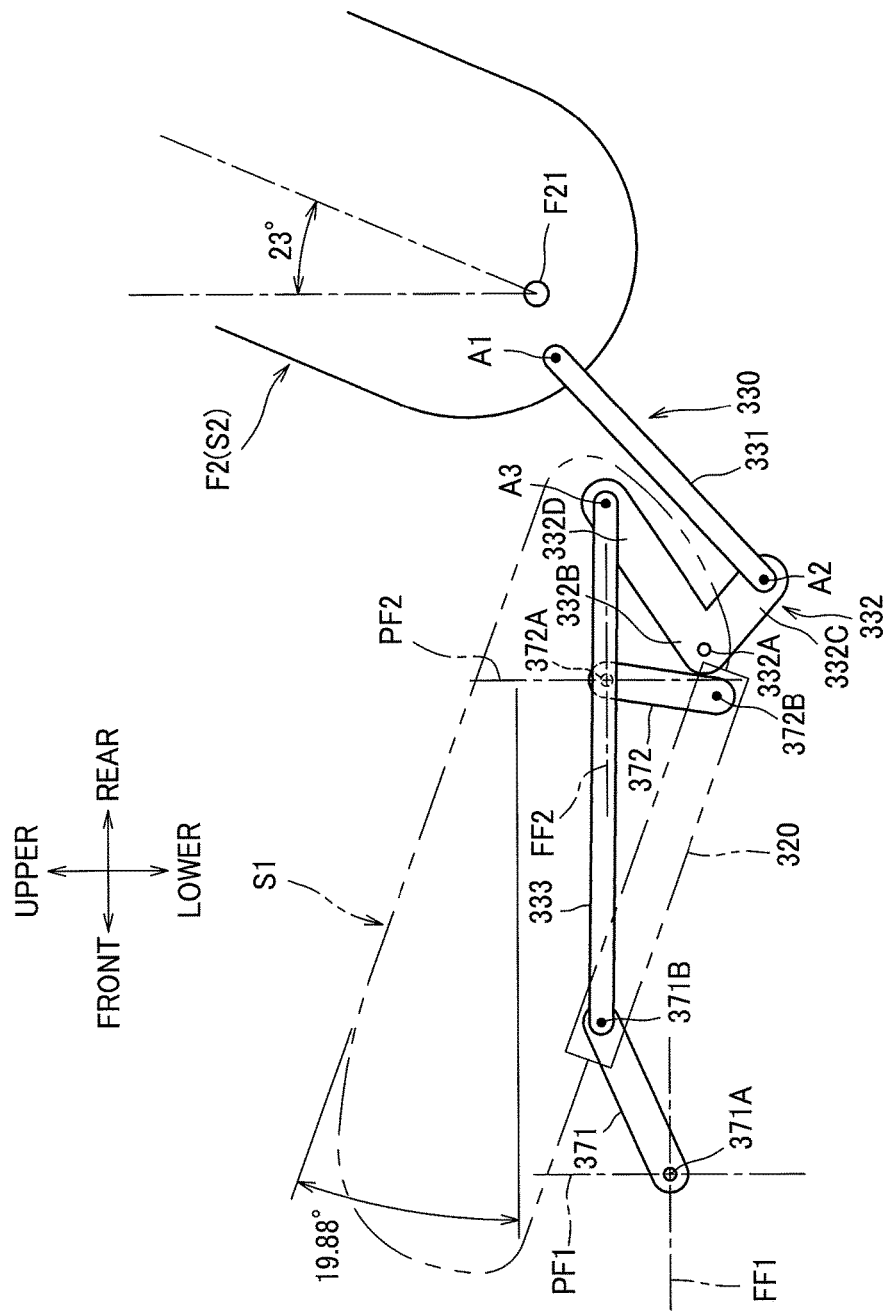
FIG. 22 is a schematic view showing a state of the transmission mechanism, respective links and a movable member in a reference position.
Figure 23:
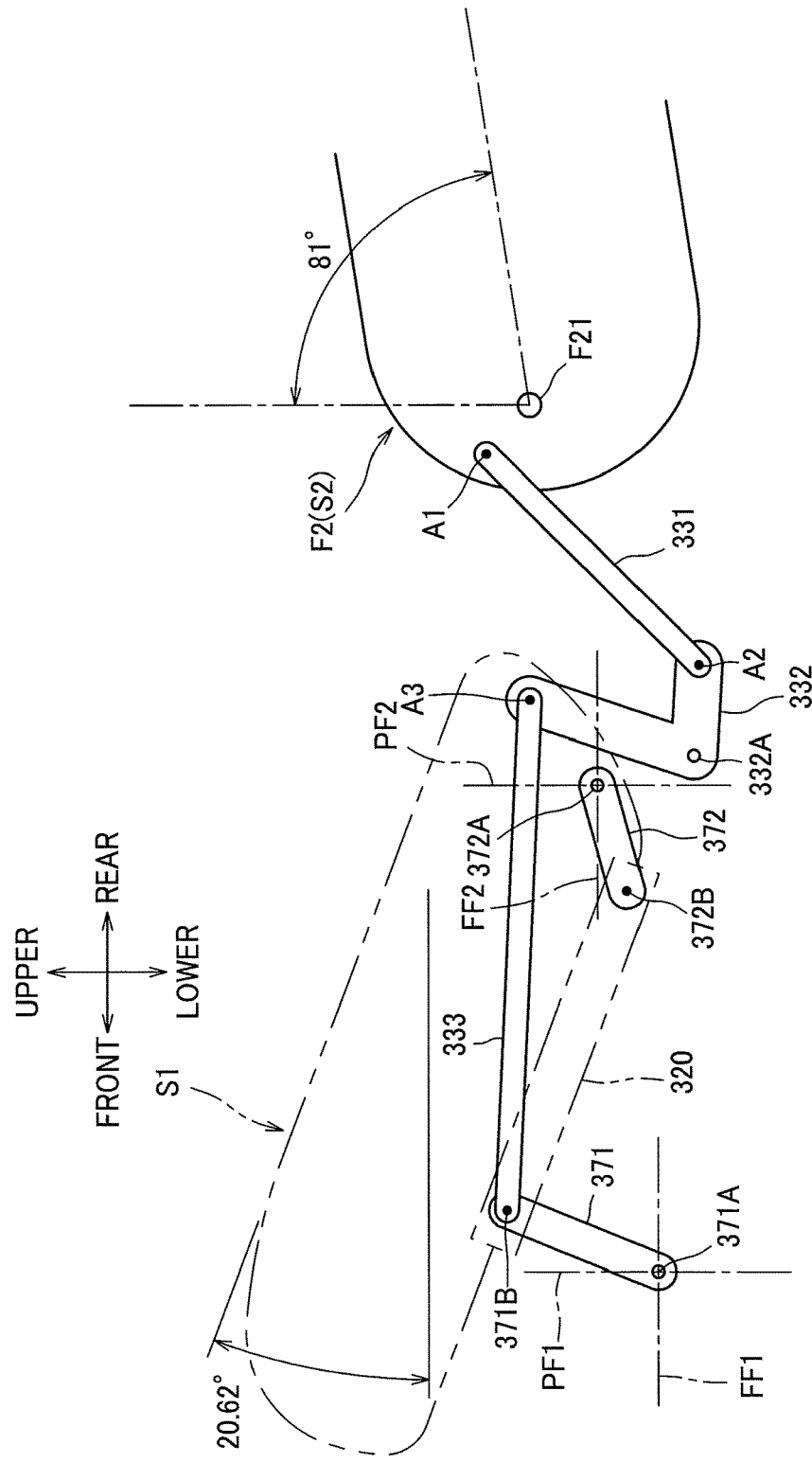
FIG. 23 is a schematic view showing a state of the transmission mechanism, the respective links and the movable member when the seat back is tilted 81 degrees rearward with respect to the vertical plane.
Figure 24:
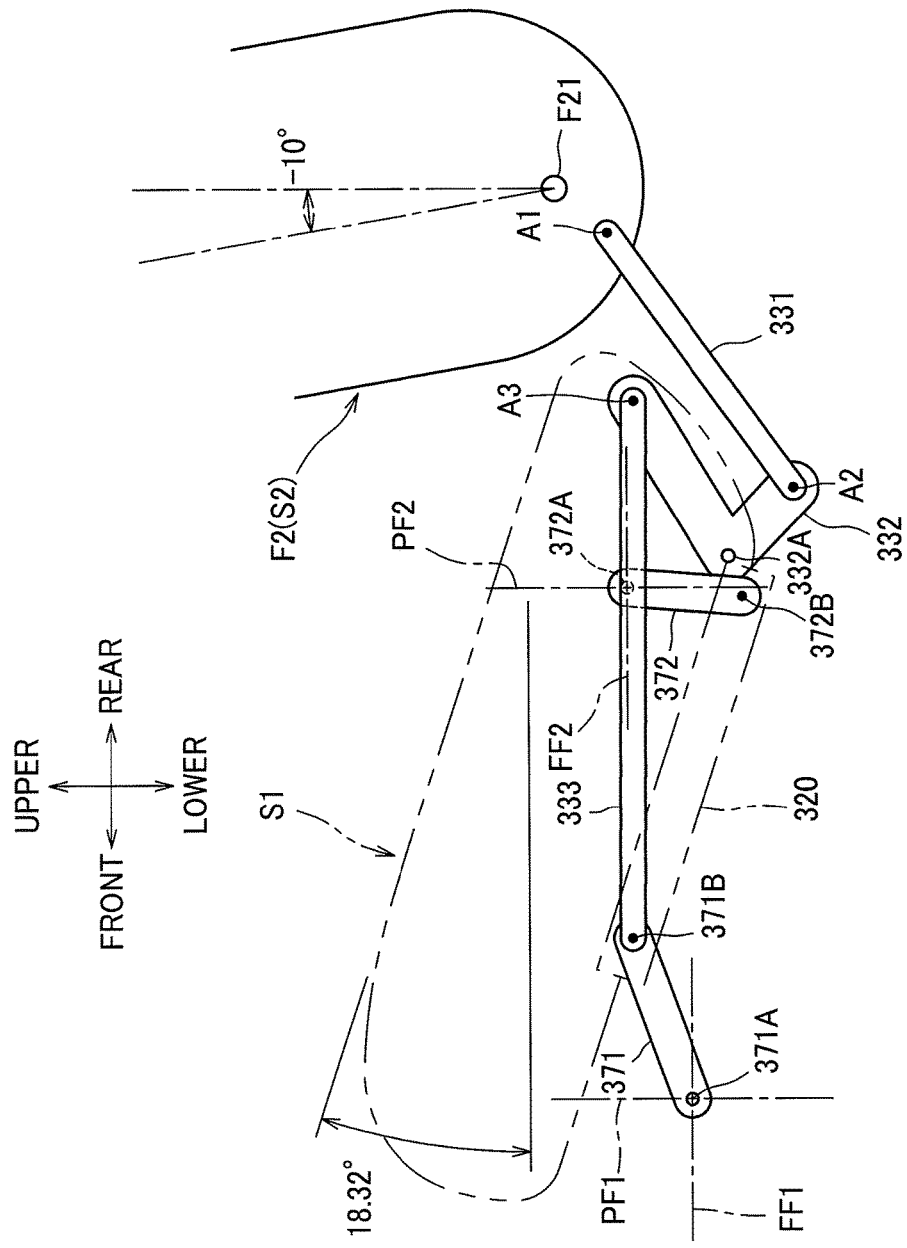
FIG. 24 is a schematic view showing a state of the transmission mechanism, the respective links and the movable member when the seat back is tilted 33 degrees frontward from the reference position (−10 degrees with respect to the vertical plane).

More specifically, the front link 371 and the rear link 372 are, as shown in FIG. 22, configured such that the front-side movable shaft 371B is located in a position higher than the front-side fixed shaft 371A, and the rear-side movable shaft 372B is located in a position lower than the rear-side fixed shaft 372A when the seat back S2 is in the reference position, i.e., raised at a predetermined angle. The predetermined angle as used herein is an angle of the seat back S2 with respect to the vertical plane, and the predetermined angle in this embodiment is 23 degrees. In FIGS. 22 to 24, for convenience's sake, the fixed shafts that make no change in position relative to the side frame 310 in accordance with the tilting motion of the seat back S2 are indicated by outlined circles and the movable shafts that move relative to the side frame 310 in accordance with the tilting motion of the seat back S2 are indicated by dots.

By this arrangement of the front link 371 and the rear link 372, the tendency of the tilting motion of the movable member 320 in an early stage of a period when the seat back S2 makes a tilting motion from the reference position to the rearward-tilted position in which the seat back S2 is tilted to a rearmost position (the position in FIG. 23) takes a first tendency with which the front end moves upward relative to the rear end. In other words, in this early stage, the angle of the movable member 320 with respect to the horizontal plane gradually increases.

With this configuration, the angle between the seat back S2 and the seat cushion S1 can be adjusted to an appropriate angle for keeping a relaxed natural posture of an occupant, so that the occupant can obtain a good rest on the car seat S.

Since the configuration of imparting a tilting motion to the movable member 320 is realized only by the front link 371 and the rear link 372 as described above, the movable member 320 can be tilted with a simpler configuration, in comparison, for example, with a configuration in which more than two members such as a cam member, a roller, and a link, are used to tilt a movable member.

Moreover, in this embodiment, the front link 371 and the rear link 372 are so arranged that the tendency of the tilting motion of the movable member 320 is switched, during the period when the seat back S2 makes a tilting motion from the reference position (FIG. 22) to the rearward-tilted position (FIG. 23), from the aforementioned first tendency to a second tendency with which the front end moves downward relative to the rear end. In other words, in a late stage of the period when the seat back S2 makes a tilting motion from the reference position to the rearward-tilted position, the angle of the movable member 320 with respect to the horizontal plane gradually decreases.

With this configuration, when the seat back S2 is set to the rearward-tilted position, the both of the movable member 320 and the seat back S2 can be nearly in a substantially flat state, so that an occupant can stretch himself/herself out on the substantially flat car seat S and obtain a good rest.

In the reference position (FIG. 22), the front-side movable shaft 371B is located in a position rearward of the front-side fixed shaft 371A and closer to a first horizontal plane FF1 containing an axis of the front-side fixed shaft 371A than to a first vertical plane PF1 containing the axis of the front-side fixed shaft 371A.

With this arrangement, the amount of upward movement of the front-side movable shaft 371B (the amount of upward movement per unit rotation angle) in an early stage of a period when the front-side movable shaft 371B is rotated about the front-side fixed shaft 371A in an obliquely-frontward-and-upward direction can be increased. Moreover, the amount of upward movement of the front-side movable shaft 371B in a late stage of the period that is the stage after the front-side movable shaft 371B is closer to the first vertical plane PF1 than to the first horizontal plane FF1 can be restricted to a small amount. Therefore, the tendency of the tilting motion of the movable member 320 can be switched properly from the first tendency to the second tendency.

The rear-side movable shaft 372B is located in a position closer to a second vertical plane PF2 containing an axis of the rear-side fixed shaft 372A than to a second horizontal plane FF2 containing the axis of the rear-side fixed shaft 372A and frontward of the second vertical plane PF2. With this arrangement, the amount of upward movement of the rear-side movable shaft 372B (the amount of upward movement per unit rotation angle) in an early stage of a period when the rear-side movable shaft 372B is rotated about the rear-side fixed shaft 372A in an obliquely-frontward-and-upward direction can be restricted to a small amount. Moreover, the amount of upward movement of the rear-side movable shaft 372B in a late stage of the period that is the stage after the rear-side movable shaft 372B is closer to the second horizontal plane FF2 than to the second vertical plane PF2 can be increased. Therefore, the tendency of the tilting motion of the movable member 320 can be switched properly from the first tendency to the second tendency.

As shown in FIGS. 18, 19 and 21, the transmission mechanisms 330 each configured to include a first transmission link 331, a second transmission link 332 and a third transmission link 333 are provided, respectively, at laterally inner sides of the left and right side frames 310. Provision of the transmission mechanisms 330 at laterally inner sides of the side frames 310 serves to downsize the car seat S in the lateral direction, in comparison, for example, with a configuration in which the transmission mechanisms are provided at laterally outer sides of the side frames.

Part of the transmission mechanisms 330 (part other than the front-end-side portion of the third transmission link 333) is disposed between the rear portion 314 of the side frame 310 and the rear portion (the portion rearward of the joint portion J) of the inner frame 340 in the lateral direction. With this configuration, entry of object from the laterally inner side into part of the transmission mechanisms 330 located between the side frame 310 and the inner frame 340 can be suppressed, so that the transmission mechanism 330 can be operated properly.

The first transmission link 331 is so formed as to extend from the proximal end portion of the seat back frame F2 (near the tilting motion axis F21) in an obliquely-frontward-and-downward direction, with a rear end portion thereof connected to the seat back frame F2 via a first connecting shaft A1 and a front end portion thereof connected to the second transmission link 332 via a second connecting shaft A2. In other words, the front end portion of the first transmission link 331 is connected indirectly to the movable member 320 via the second connecting shaft A2, and a second transmission link 332 and a third transmission link 333 that will be described later. Accordingly, the tilting motion of the seat back frame F2 is transmitted via the first transmission link 331, the second transmission link 332, and the third transmission link 333, to the movable member 320.

To be more specific, in the reference position (FIG. 22), the first connecting shaft A1 is located in a position frontward of the tilting motion shaft F21 (axis of tilting motion), specifically, slightly shifted upward from a straight line connecting the tilting motion shaft F21 and the second connecting shaft A2. The first connecting shaft A1, the second connecting shaft A2, and the tilting motion shaft F21 are so arranged as to be in alignment with each other when the seat back S2 is tilted in an intermediate position midway from the reference position toward a frontward-tilted position in which the seat back S2 is tilted to a frontmost position (FIG. 24).

With this configuration, the tilting motion shaft F21, the first connecting shaft A1 and the second connecting shaft A2 are in alignment when the seat back S2 is tilted in the intermediate position midway from the reference position toward the forward-tilted position, and thus the first connecting shaft A1 passes over the straight line connecting the tilting motion shaft F21 and the second connecting shaft A2, and thus the direction of movement of the movable member 320 can be switched to a reverse direction.

The second transmission link 332 is a link having a shape of a letter V in a side view, and includes a base portion 332B pivotally connected to the side frame 10 via a rotary shaft 332A, a first arm portion 332C extending from the base portion 332B in an obliquely-rearward-and-downward direction, and second arm portion 332D extending from the base portion 332B in an obliquely-rearward-and-upward direction. At a distal end portion of the first arm portion 332C, the first transmission link 331 is pivotally connected via the second connecting shaft A2; at a distal end portion of the second arm portion 332D, the third transmission link 333 is pivotally connected via the third connecting shaft A3. In other words, the distal end portion of the first arm portion 332C that is located in a position separate from the axis of rotation of the second transmission link 332 provides an input part which receives an amount of actuation from the first transmission link 331; the distal end portion of the second aim portion 332D that is located in a position separate from the center of rotation of the second transmission link 332 and different from the input part provides an output part which transmits the amount of actuation to the third transmission link 333.

The third transmission link 333 is a link extending in the frontward-rearward direction, with a rear end portion thereof pivotally connected to the second transmission link 332 via the third connecting shaft A3, and a front end portion thereof pivotally connected to the front side portion of the movable member 320 via the aforementioned front-side movable shaft 371B. In other words, a connecting shaft by which the third transmission link 333 is connected to the movable member 320 and a connecting shaft by which the front link 371 is connected with the movable member 320 are configured to be coaxial, that is, as one and the same front-side movable shaft 371B. With this configuration, the structure can be simplified, in comparison, for example, with a configuration in which the third transmission link and the front link are connected to different spots on the movable member.

With the transmission mechanism 30 configured as described above, as shown in FIGS. 22 and 23, when the seat back frame F2 is tilted from the reference position rearward, the first transmission link 331 is pulled by the seat back frame F2 in an obliquely-rearward-and-upward direction, and the second transmission link 332 is caused to rotate counterclockwise from the viewpoint of the drawing, and the third transmission link 333 is caused to move frontward. Accordingly, since a force toward frontward is acted on the front-side portion of the movable member 320 from the transmission mechanism 330 (so as to raise the front link 371) when the seat back frame F2 is tilted backward, the movable member 320 supported by the front link 371 and the rear link 372 as described above moves frontward, while the tendency of the tilting motion thereof is switched by the action of the links 371 and 372 from the first tendency to the second tendency.

As shown in FIGS. 22 and 24, when the seat back frame F2 is tilted frontward from the reference position, in an early stage, the first transmission link 331 is pushed by the seat back frame F2 in an obliquely-frontward-and-downward direction, and the second transmission link 332 is caused to rotate clockwise from the viewpoint of the drawing, and the third transmission link is caused to move rearward. Accordingly, in the early stage of the operation of the seat back frame F2 tilted frontward from the reference position, a force toward rearward is acted on the movable member 320 from the transmission mechanism 330, and the movable member 320 is caused to move rearward, while the angle of the movable member 320 with reference to the horizontal plane gradually decreases by the action of the front link 371 and the rear link 372. When the seat back frame F2 is tilted 23 degrees frontward from the reference position (i.e., 0 degree with reference to the vertical plane) (illustration of this state in the drawing is omitted), the first connecting shaft A1, the second connecting shaft A2 and the tilting motion shaft F21 are in alignment on one straight line. After the first connecting shaft A1, the second connecting shaft A2 and the tilting motion shaft F21 are in alignment on the straight line (in a late stage of the operation of the seat back frame F2 tilted frontward from the reference position), as shown in FIG. 24, the first transmission link 331 is pulled by the seat back frame F2 in an obliquely-rearward-and-upward direction, and the second transmission link 332 is caused to rotate counterclockwise from the viewpoint of the drawing, and the third transmission link 333 is caused to move frontward.

Accordingly, in the late stage of the operation of the seat back frame F2 tilted frontward from the reference position, a force toward frontward is acted on the movable member 320 from the transmission mechanism 330, and the movable member 320 is caused to move frontward, while the angle of the movable member 320 with reference to the horizontal plane gradually increases by the action of the front link 371 and the rear link 372.

Since the direction of movement of the movable member 320 is switched from rearward to frontward when the seat back S2 is tilted in an intermediate position midway from the reference position (FIG. 22) toward the frontward-tilted position (FIG. 24), interference of the movable member 320 or the rear end portion of the seat cushion 51 provided on the movable member 320 with the seat back S2 can be suppressed, in comparison, for example, with a configuration in which the movable member continues to move rearward for a period of time when the seat back is being tilted from the reference position to the frontward-tilted position.

In the car seat S configured such that a seat cushion pad is movable frontward, rearward, upward and downward in accordance with the reclining motion of the seat back S2, as shown in FIG. 25, at an upper end of the shoulder of the seat back frame F2 (the upper end of the shoulder corresponding to a joint portion at which the side frame 381 and the upper connecting member 383 are joined), the aforementioned belt guide member 210 is provided. The belt guide member 210 has the guide hole 211 formed therein as one example of a belt guide, through which a seat belt SB is passed. One of the side frames 381 and 382 of the seat back frame F2, that is, the side frame 381 at the right side on which the belt guide member 210 is provided has a closed-section structure with an outer side frame 381A and an inner side frame 381B joined together, in order to provide a sufficient level of rigidity. To be more specific, the outer side frame 381A and the inner side frame 381B are each configured to have a shape of a letter U in cross section, and open ends of respective U letters thereof are arranged to face to each other and combined together to form a crossed-section structure. In contrast, the left side frame 382 is formed only with an outer side frame. Accordingly, a load received from the seat belt SB can be received by the right side frame 381 with a higher rigidity, while the costs can be reduced because the left side frame 382 is constructed only with the outer side frame.

The guide hole 211 of the belt guide member 210 is located within a lateral range WD (range in the lateral direction) in which the side frame 310 and the inner frame 340 at the corresponding one of the left and right sides (i.e., at the right side) are disposed. In the present embodiment, the guide hole 211 in its entirety is located within the range WD in the lateral direction.

Figure 26:
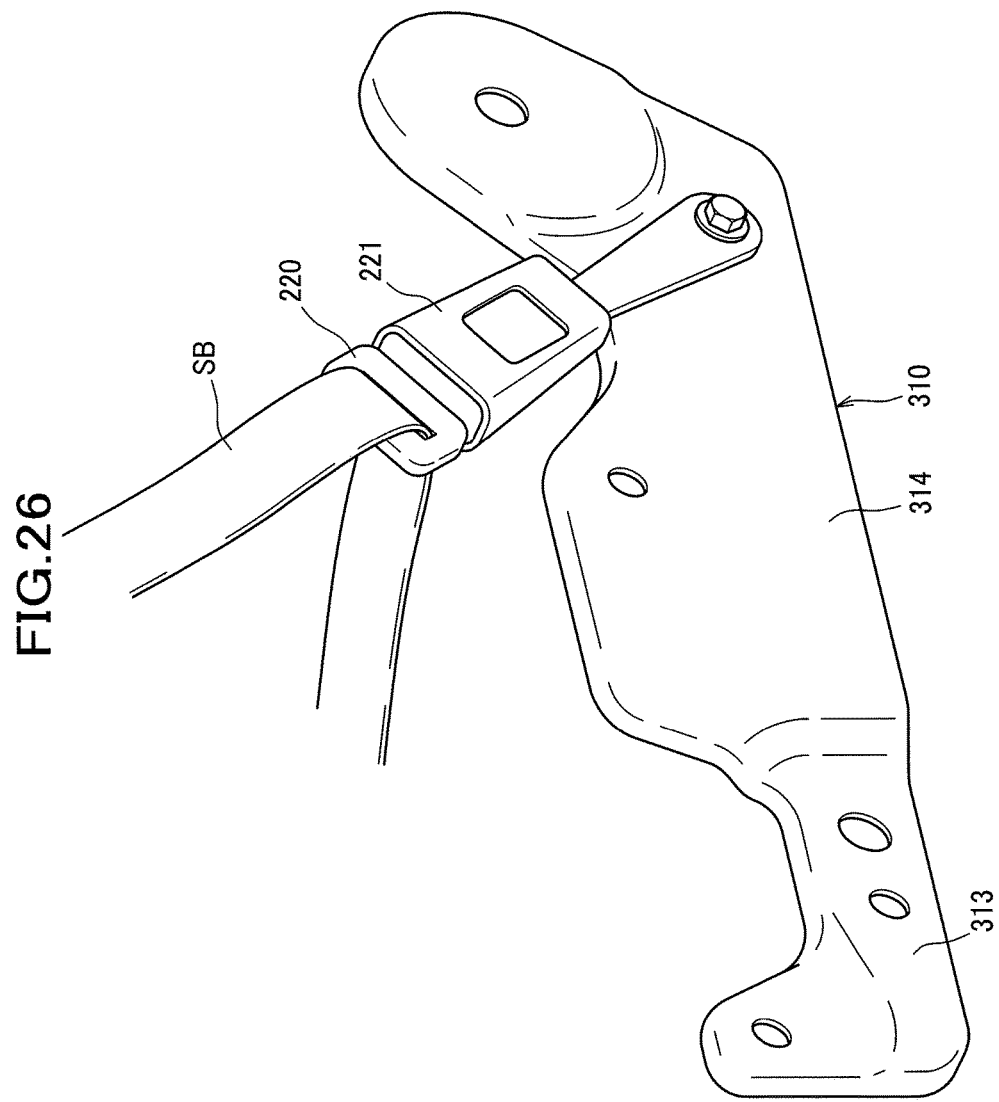
FIG. 26 is a perspective view of a seat cushion frame as viewed from a leftward-and-frontward direction.
Figure 27:
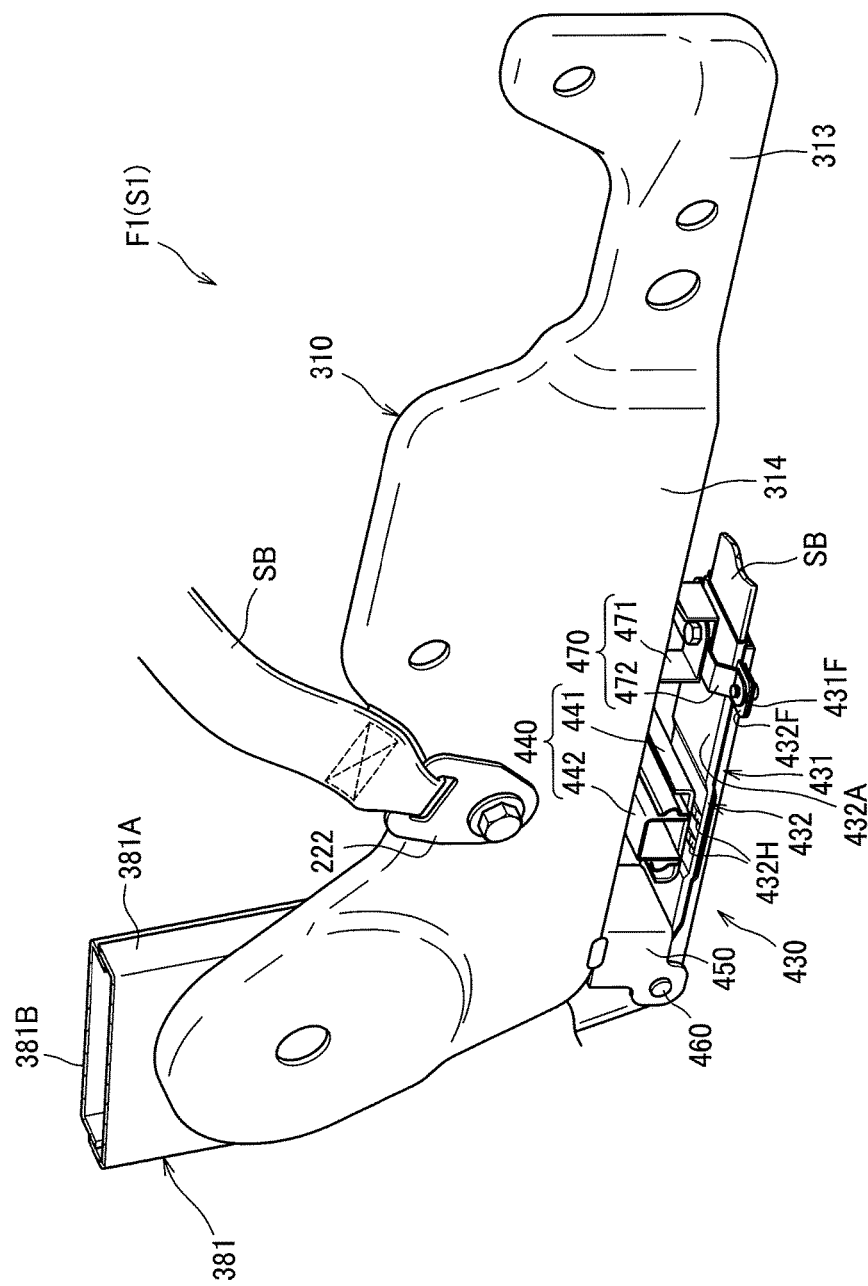
FIG. 27 is a perspective view of the seat cushion frame as viewed from a rightward-and-frontward direction.

As shown in FIG. 26, the seat belt SB is provided with a tongue 220, and a buckle 221 for fastening the tongue 220 is fixed on the left side frame 310. As shown in FIG. 27, an anchor 222 for fastening an end of the seat belt SB is fixed on the right side frame 310.

The seat belt SB is so arranged, as shown in FIG. 25, as to pass through the guide hole 211 of the belt guide member 210 and extend downward. As shown in FIG. 27, the seat belt SB is routed from a rear end of the right side portion of the seat cushion frame F1 under the seat cushion frame F1, and extends frontward along an underside of the seat cushion S1. Under the seat cushion S1, the seat belt SB is guided by a lower guide 430 to extend frontward, and is retracted by a belt retractor (not shown) in a manner that permits the seat belt SB to be pulled out.

Figure 28:
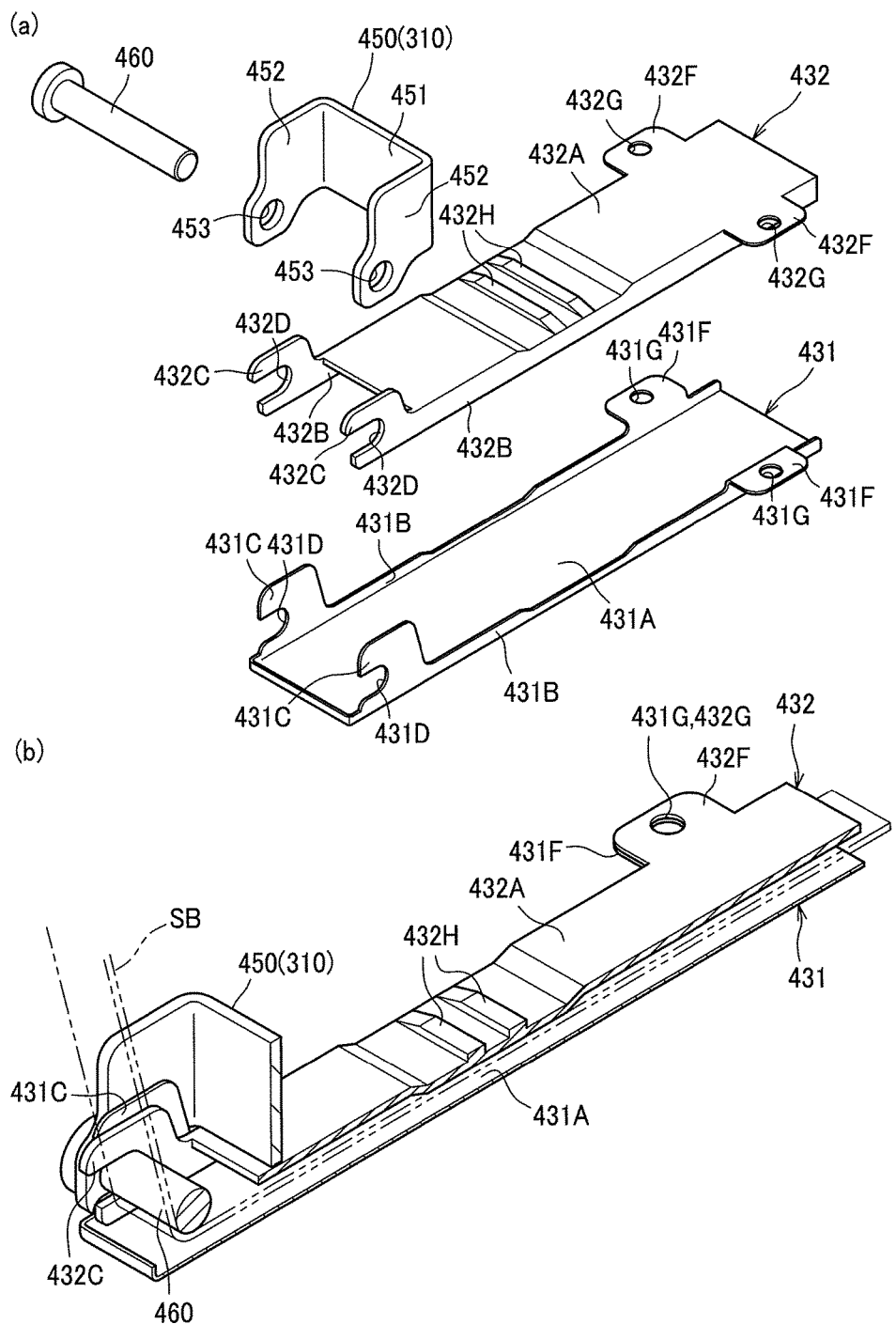
FIG. 28 includes (a) an exploded perspective view of a lower guide and its vicinity; and (b) a cutaway view of the lower guide and its vicinity.

The lower guide 430 is configured, as shown in FIG. 28, to include a rail member 431 as one example of a second cover member, and a cover member 432.

The rail member 431 extends horizontally in the frontward-rearward direction, and is configured to include a guide plate 431A located under the seat belt SB, side guides 431B raised at both of left and right sides of the guide plate 431A, hook portions 431C provided at rear ends of the side guides 431B, and fixed portions 431F provided at front end portions of the side guides 431B. A hook portion 431C has a shape of a plate extending vertically, and has an opening 431D that opens rearward. A fixed portion 431F has a shape of a plate extending horizontally, and has an attachment hole 431G piercing in the upward-downward direction. The rail member 431 is disposed under the seat belt SB and covers the seat belt SB, not only serving to guide the seat belt SB, but also serving to protect the seat belt SB in cooperation with the cover member 432.

The cover member 432 is configured to include a main body portion 432A extending horizontally in the frontward-rearward direction and located above the seat belt SB, side guides 432B extending from both of left and right sides of the main body portion 432A downward, hook portions 432C provided at rear ends of the side guides 432B, and fixed portions 432F provided at a front end portion of the main body portion 432A. A hook portion 432C has a shape of a plate extending vertically, and has an opening 432D that opens rearward. A fixed portion 432F has a shape of a plate extending horizontally, and has an attachment hole 432G piercing in the upward-downward direction. In a position midway of the length of the main body portion 432A in the frontward-rearward direction, laterally elongate protrusions 432H protruding upward are formed thereon.

The lower guide 430 configured as described above is, as shown in FIG. 27, fixed to a rear bracket 450 and a front bracket 470 which are deemed to be part of the side frame 310.

The rear bracket 450 is welded to a rear portion of the side frame 310. The front bracket 470 is configured to include an upper bracket 471 and a lower bracket 472; the upper bracket 471 is welded to the side frame 310, and the lower bracket 472 is fastened to the upper bracket 471 by a screw.

As shown in FIG. 28(a), the rear bracket 450 includes a front wall portion 451 facing in the frontward-rearward direction, and sidewall portions 452 extending from both of left and right ends of the front wall portion 451 rearward; a sidewall portion 452 has a circular through hole 453.

As shown in FIG. 28(b), the cover member 432 is put on the rail member 431, and the seat belt SB is passed through the space formed between the rail member 431 and the cover member 432. The rail member 431 and the cover member 432 are combined together in such a manner that the hook portions 431 of the rail member 431 and the hook portions 432C of the cover member 432 are laid with the openings 431D, 432D thereof aligned with each other. Then, the openings 431D, 432D in alignment are further aligned with the through hole 453 of the rear bracket 450, and a pin 460 as one example of a rod-shaped member is inserted in the through hole 453 and the openings 431D, 432D, so that the rear portion of the cover member 432 is supported. The pin 460, around which the seat belt SB is looped, serves as a guiding member to change a direction of extension of the seat belt extending under the seat cushion frame F1 in the frontward-rearward direction into a direction such that the seat belt SB extends along a rear side of the seat back frame F2.

As shown in FIG. 27, the fixed portions 431F, 432F are aligned with the lower bracket 472, and fastened to the lower bracket 472 by screws.

The seat cushion frame F1 is configured to be slidable in the lateral direction with the help of a slide rail mechanism 440 on which the side frames 310 are supported. To be more specific, laterally extending transverse rails 441 are fixed to sliders of a front-rear slide rail mechanism (now shown), and transverse sliders 442 slidably engaged with the transverse rails 441 are fixed to the left and right side frames 310.

The aforementioned cover member 432 is disposed such that part of the cover member 432 faces to the slide rail mechanism 440, and the protrusions 432H are disposed on a region of the cover member 432 which faces to the slide rail mechanism 440. As described above, the protrusions 432H extend long in the lateral direction, i.e., in the longitudinal direction of the slide rail mechanism 440. Even if actuation of the slide rail mechanism 440 brings the transverse rail 441 into contact with the cover member 432, such contact takes place only at the apexes of the laterally elongate protrusions 432H, and thus the contact noise can be suppressed and the sliding motion can be made smoothly.

The protrusions 432H are provided between the fixed portion 431F, 432F and the pin 460.

In the car seat S configured as described above, the following advantages can be realized.

Since the inner frames 340 connected to the side frames 310 and extending in the frontward-rearward direction are provided at the insides of the pair of side frames 310 of the seat cushion frame F1 as shown in FIG. 19, the side frames 310 can be enhanced in rigidity. Even when a large tensile load is applied to the seat belt SB in a collision of the car or the like, producing a large force in frontward and downward directions which is applied to the guide hole 211 and transmitted to the seat cushion S1, this load can be received by the side frame 310 and the inner frame 340 of the seat cushion S1. Since the guide hole 211 mentioned above is located within the range WD (in the lateral direction) in which the right side frame 310 and the inner frame 340 are disposed, the load imparted from the seat belt SB is directed toward between the side frame 310 and the inner frame 340; therefore, the seat back frame F2 and the seat cushion frame F1 are not likely to be twisted, so that the load can be received stably by the side frame 310 and the inner frame 340. Consequently, deformation of the seat cushion frame F1 can be suppressed.

Since the inner frame 340 includes bent portions 344 each bent with a rear side thereof shifted inward, its high rigidity is ensured, and the deformation of the seat cushion frame F1 can be suppressed more effectively.

Since the left and right inner frames 340 are connected at the rear end portions 347 by the connecting pipe 353, the deformation of the inner frames 340 in the leftward or rightward direction can be suppressed, and the rigidity of the inner frames 340 is increased; consequently, the deformation of the seat cushion frame F1 can be further suppressed.

Since the left and right inner frames 340 are connected at the front end portions (joint portions J) by the connecting pipe 352, the deformation of the inner frames 340 in the leftward or rightward direction can be suppressed, and the rigidity is increased to an extremely high level. Also, the left and right side frames 310 and the inner frames 340 are connected at the rear end portions by the connecting beam 351, and the rigidity is increased to an extremely high level. Accordingly, the deformation of the seat cushion frame F1 can be still further suppressed.

Since the cover member 432 is provided between the seat belt SB and the slide rail mechanism 440 under the seat cushion F1, interference between the seat belt SB and the slide rail mechanism 440 is prevented. Therefore, when the slide rail mechanism 440 is actuated, no interference occurs between the seat belt SB and the slide rail mechanism 440; also, when the seat belt SB is pulled out or retracted, no interference occurs between the seat belt SB and the slide rail mechanism 440. In other words, the interference between the seat belt SB and the slide rail mechanism 440 can be suppressed, so that the smooth operations of the seat belt SB and the slide rail mechanism 440 can be realized, and the service life of the seat belt SB can be increased.

Since the cover member 432 has the protrusions 432H formed in a region facing to the slide rail mechanism 440, which protrusions 432H extend in the longitudinal direction of the slide rail mechanism 440, even when the cover member 432 and the slide rail mechanism 440 interfere with each other, these components slides on each other smoothly, and the slide rail mechanism 440 can be operated smoothly.

Since the cover member 432 and the rail member 431 include at the rear ends thereof hook portions 432C having the opening 432D and the hook portion 431C having the opening 431D, respectively, and the openings 432D, 431D are engaged with the pin 460 engaged in the rear bracket 450 provided at the rear end portion of the side frame 310 to thereby support the cover member 432 and the rail member 431, the cover member 432 and the rail member 431 can be supported stably. Moreover, since the pin 460 serves also as a guide for the seat belt SB, the number of parts can be reduced, in comparison with a configuration in which a guide for the seat belt SB and a member for supporting the cover member 432 are provided separately.

Since the cover member 432 and the rail member 431 are supported by the fixed portions 432F, 431F at the front side of the protrusions 432H and by the pin 460 at the rear side of the protrusions 432H, these components are supported stably; if interference occurs between the protrusions 43211 of the cover member 432 and the slide rail mechanism 440, the protrusions 432H and the slide rail mechanism 440 can be slid stably.

Although the third embodiment has been described above, the present embodiment may be practiced with appropriate modifications made thereto, as will be illustrated in describing the following other embodiments.

In the above-described embodiment, two inner frames 340 are provided for the left and right side frames 310, but provision of the inner frame for at least one of the pair of side frames 310 to which the belt guide is provided may suffice. For example, the above-described embodiment may be modified by providing only one inner frame 340 at the right side while the left inner frame 340 may be dispensed with.

Figure 29:
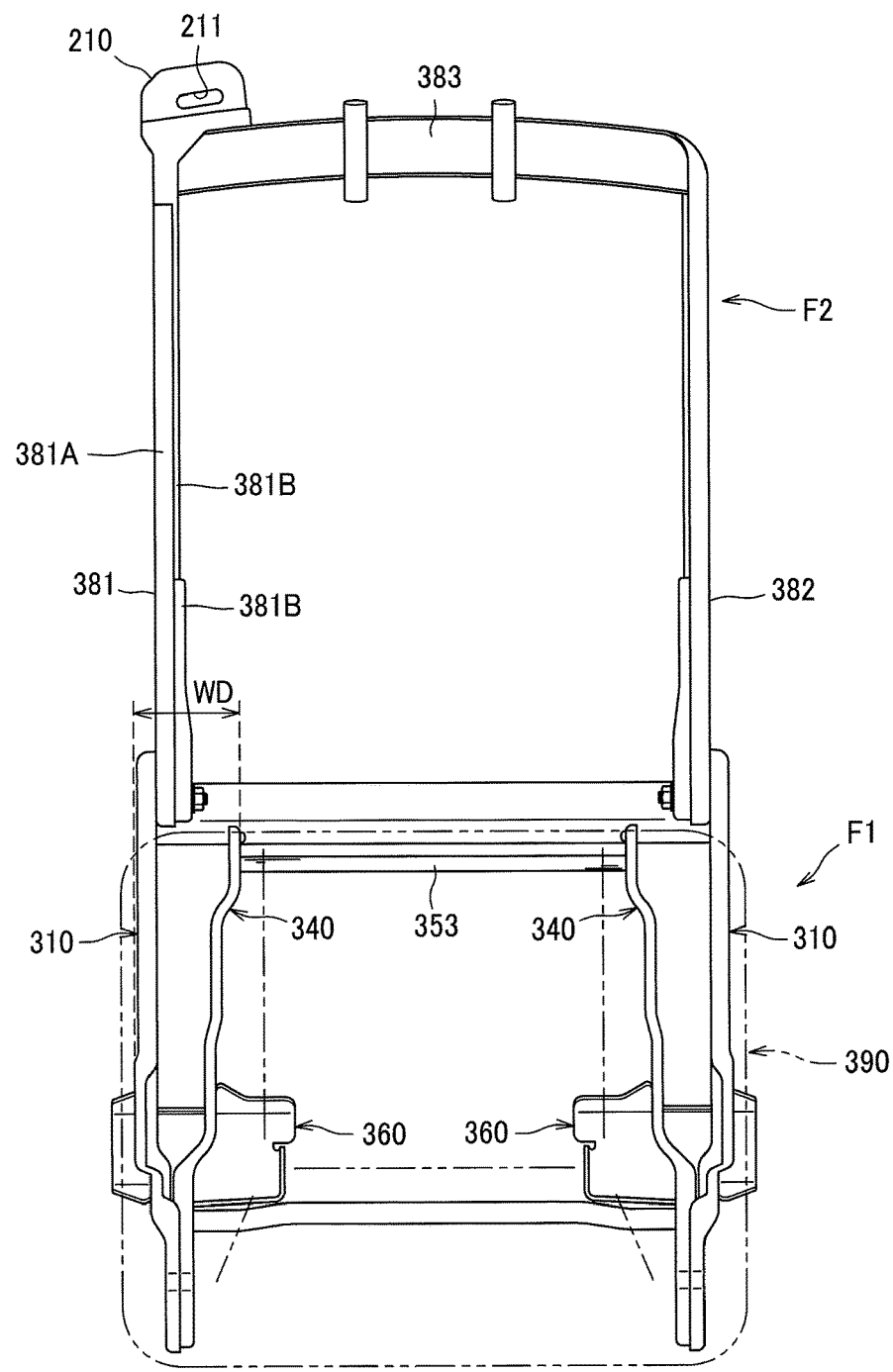
FIG. 29 is a view of a seat frame according to a modified example as viewed from an obliquely-frontward-and-upward direction.

In the above-described embodiment, an exemplary configuration in which the movable member 320 of the seat cushion frame F1 is moved in a manner coordinated with the tilting motion of the seat back S2 is illustrated, but such a mechanism for coordinated motions may not be provided. In such an alternative, a pan frame 390 may preferably be fixed to the side frames 310 and the inner frames 340 as shown in FIG. 29 by way of example. In this alternative configuration, a supporting member (i.e., side frames 310 and inner frames 340) for the pan frame 390 can be upsized, and thus the pan frame 390 can be supported securely, in comparison with the above-described embodiment in which the pan frame is fixed to the movable member 320. Furthermore, since the pan frame 390 connects the left and right side frames 310 and the inner frames 340, the rigidity of the seat cushion frame F1 can be increased to an extremely high level.

In the above-described embodiment, the guide hole 211 is located in its entirety within the range WD in the lateral direction, but an alternative configuration in which only a part of the guide hole is located within the range WD in the lateral direction may also be feasible.

In the above-described embodiment, the connecting member is embodied as the cylindrical connecting pipe 353 by way of example, but the present invention is not limited to this embodiment; for example, a polygonal pipe or rod-shaped member, or the like may be used, instead.

Fourth Embodiment

Next, a detailed description of a fourth embodiment will be given with reference made mainly to FIGS. 30 to 33. In the following description, first, a general setup of a car seat as one example of a vehicle seat will be briefly described, and then the features of the present embodiment will be described in detail.

Figure 30:
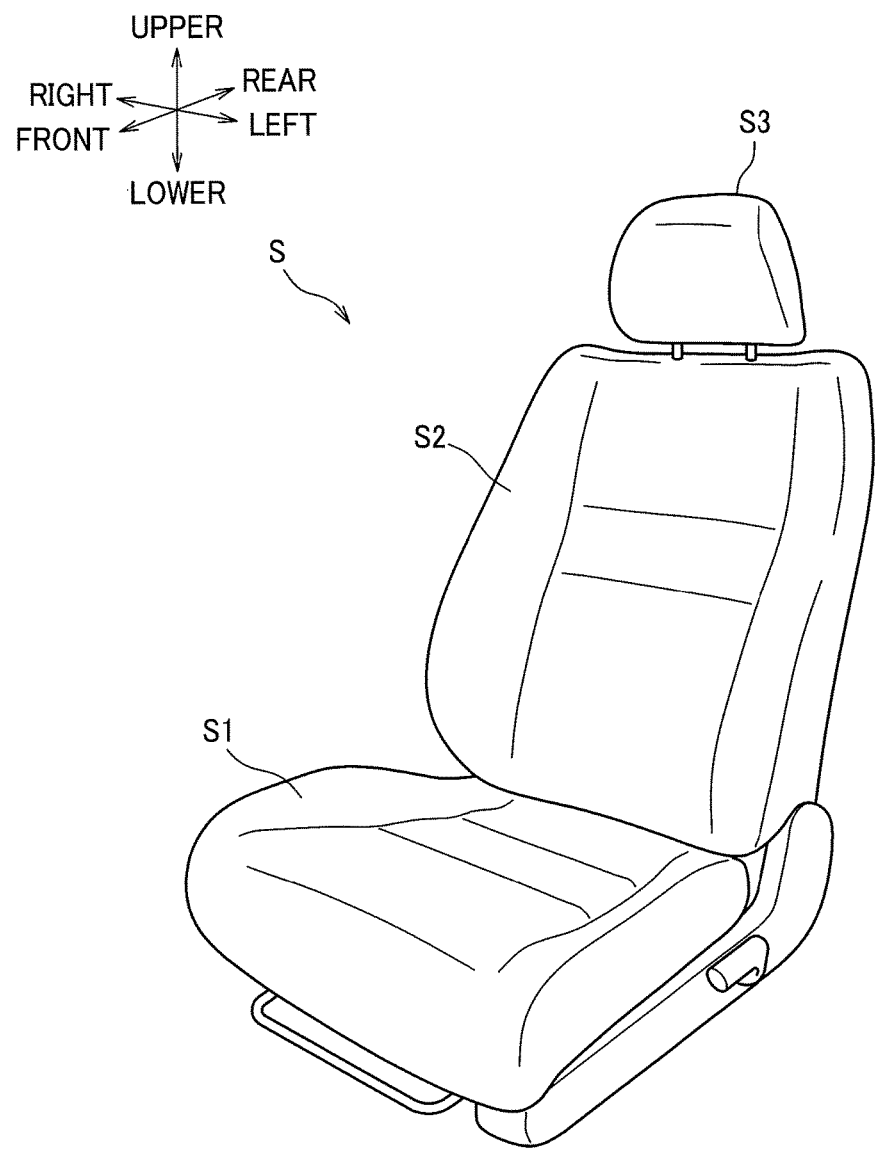
FIG. 30 is a perspective view of a car seat as a vehicle seat according to a fourth embodiment.

As shown in FIG. 30, a car seat S is a seat used as a driver's seat for an automobile, and mainly includes a seat cushion S1, a seat back S2, and a headrest S3.

Figure 31:
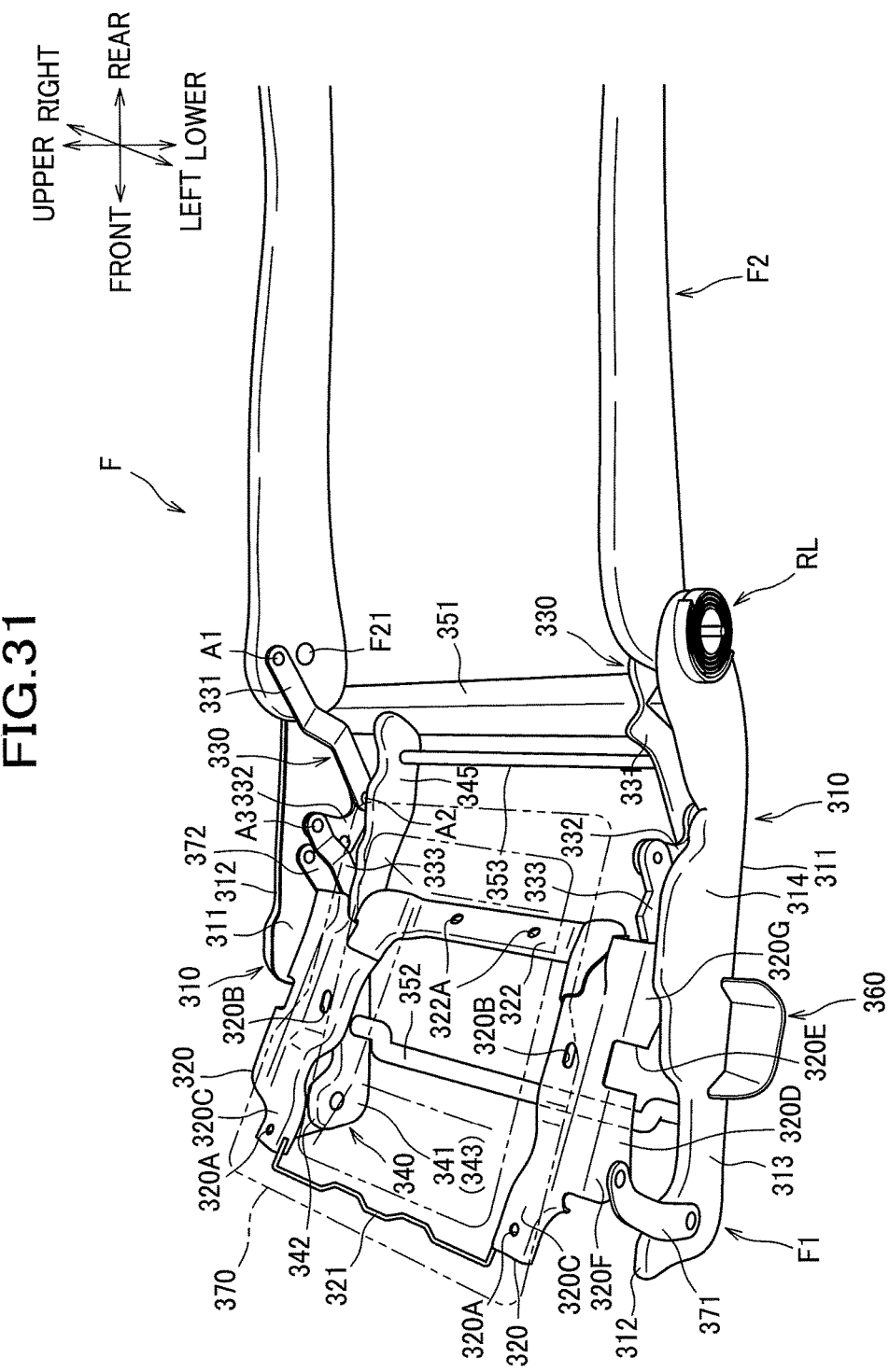
FIG. 31 is a perspective view showing a seat frame in a state with a seat back tilted down.

The seat cushion S1 and the seat back S2 are configured to incorporate a seat frame F as shown in FIG. 31. The seat frame F mainly includes a seat cushion frame F1 constituting a frame of the seat cushion S1 and a seat back frame F2 constituting a frame of the seat back S2. The seat cushion S1 is configured such that the seat cushion frame F1 is upholstered with a seat cushion pad made of a cushiony material such as urethane foam and an outer covering made of synthetic leather, fabric or the like, whereas the seat back S2 is configured such that the seat back frame F2 is upholstered with a seat back pad made of a cushiony material such as urethane foam and an outer covering made of synthetic leather, fabric or the like.

The seat back frame F2 is configured to be rotatable with a lower portion thereof rotatably connected to a rear portion of the seat cushion frame F1 via a reclining mechanism RL. Accordingly, the seat back S2 is allowed to be tilted frontward and rearward with respect to the seat cushion S1.

It is to be understood that FIG. 31 shows a state in which the seat back frame F2 is tilted to a rearmost position (rearward-tilted position similar to the position shown in FIG. 23 of the third embodiment) with respect to the seat cushion frame F1. In this disclosure, the frontward, rearward, leftward, rightward, upward and downward are used to indicate directions with reference to an occupant seated on the car seat S assuming a state in which the seat back S2 is not tilted by the reclining mechanism RL (reference position similar to the position shown in FIG. 22 of the third embodiment).

Next, a detailed description of the seat cushion frame F1 will be given below.

Figure 32:
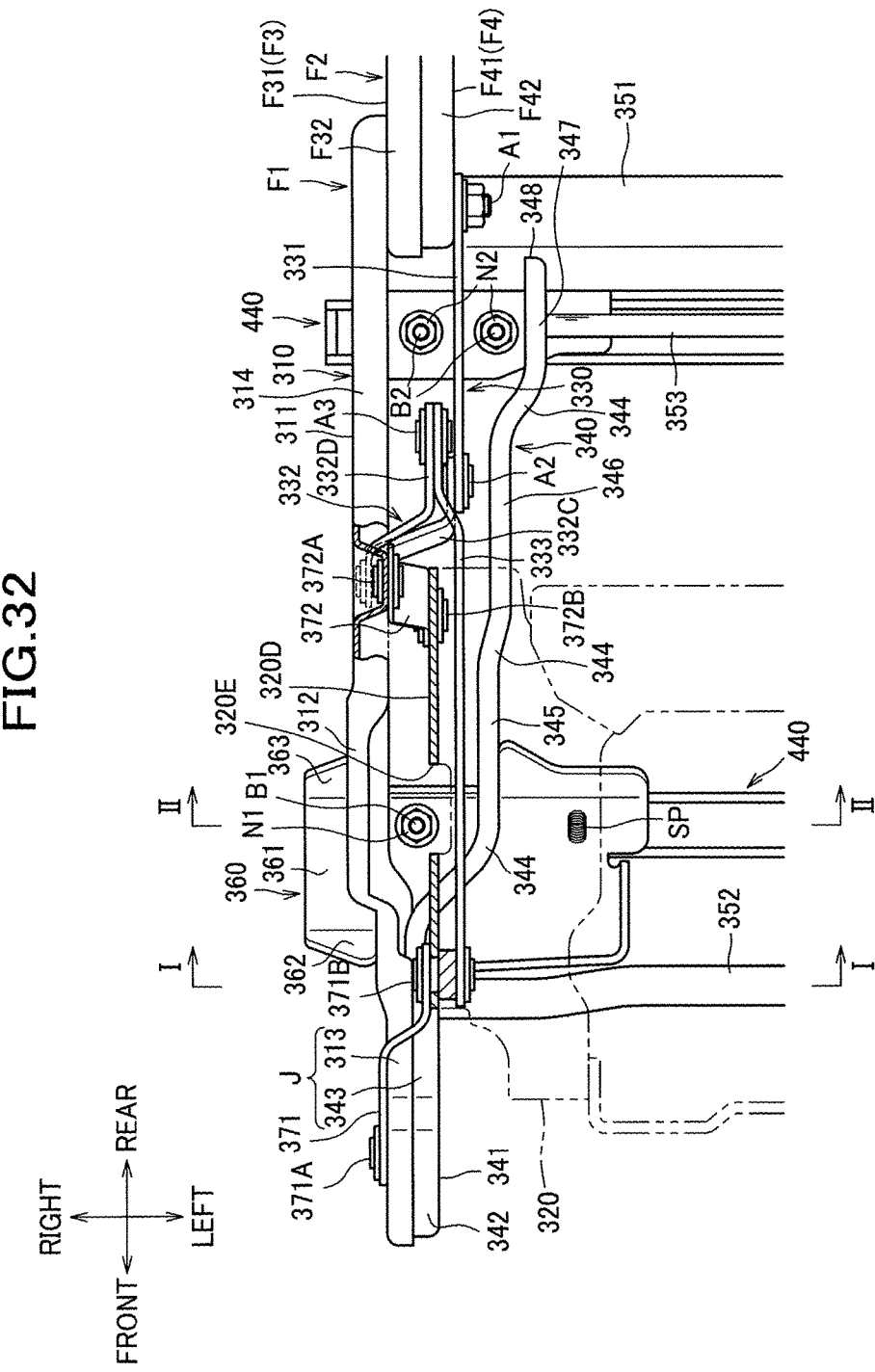
FIG. 32 is a plan view showing a right-side portion of a seat cushion frame.
Figure 33:
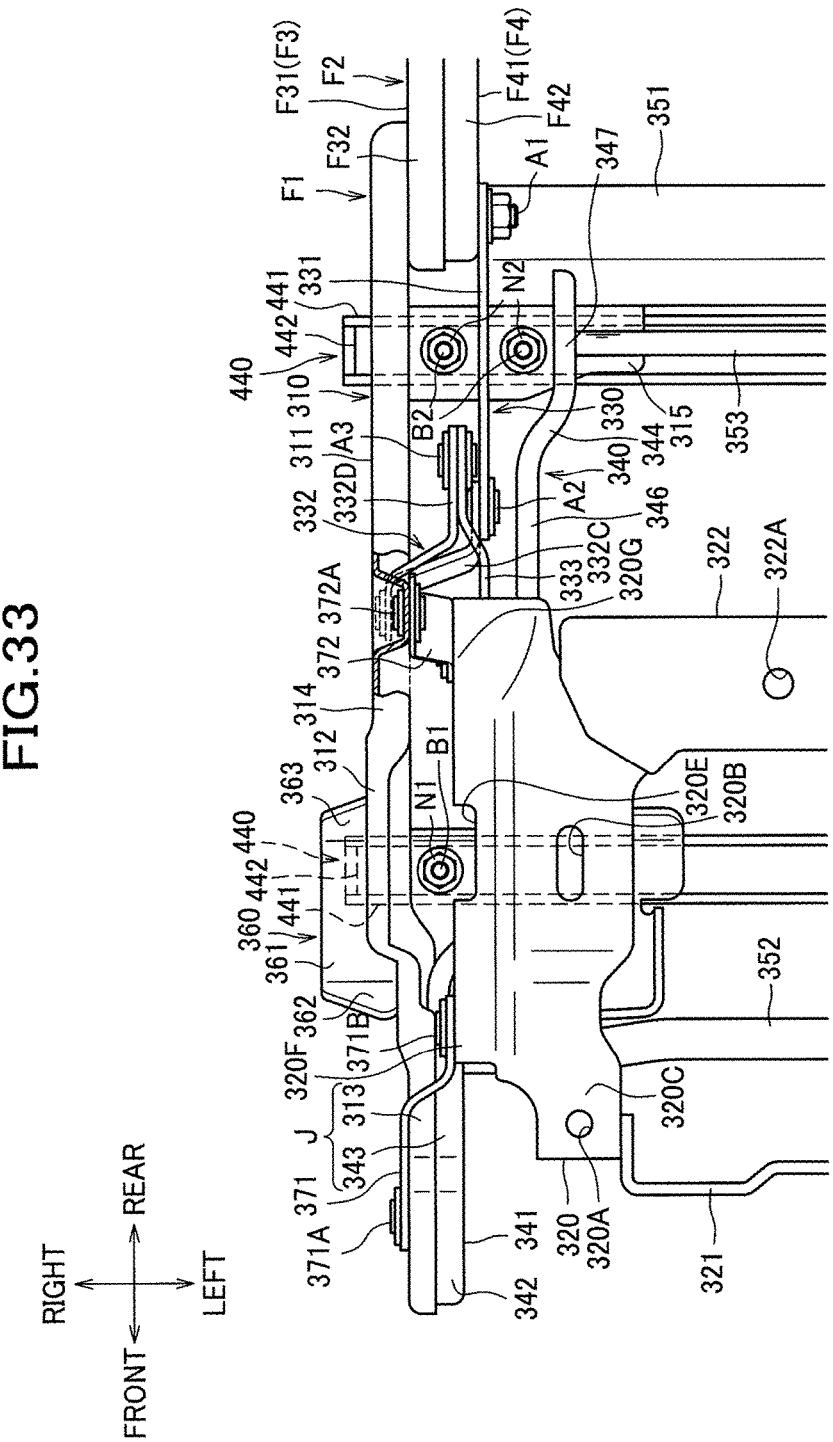
FIG. 33 is a plan view for explaining a cutaway recess and a slide rail mechanism.

As shown in FIGS. 31 to 33, the seat cushion frame F1 includes left and right side frames 310, movable members 320 capable of making a frontward-rearward motion and a tilting motion with respect to the left and right side frames 310, transmission mechanisms 330 connected to the movable members 320 and to the seat back frames F2 to transmit the tilting motion of the seat back frame F2 toe the movable member 320, and slide rail mechanisms 440 as one example of a lateral slide mechanism, configured to support the side frames 310 in a manner that permits the side frames 310 to move in the lateral direction.

The left and right side frames 310 are metal frames extending in the frontward-rearward direction which have substantially the same configuration as that of the side frames described in the third embodiment, and are disposed in laterally separate positions. A side frame 310 includes a first sidewall portion 311 forming a side surface of the side frame 310, and a first flange portion 312 extending from a peripheral edge of the first sidewall portion 311 to a laterally inner side. A front end portion 313 that is a front-end-side portion of the side frame 310 is formed to extend in the frontward-rearward direction, and a rear portion 314 that is a portion rearward of the front end portion 313 is formed to bend at a rear end of the front end portion 313 to a laterally outer side, and further bend to extend rearward.

In the present embodiment, as shown in FIG. 33, part of the rear portion 314 of the side frame 310 (a portion facing to a rear end portion 347 of the inner frame 340 and a bent portion 344 located frontward thereof, that will be described later) has formed therein an extension portion 315 that is bent at a lower edge of the first sidewall portion 311 to a laterally inner side and extends therefrom to the laterally inner side. Provision of the extension portion 315 that is a portion bent and extending from the lower edge of the first sidewall portion 311 makes it possible to enhance the rear portion 314 of the side frame 310 in rigidity.

To be more specific, the extension portion 315 is formed to protrude beyond the inner frame 340 to the laterally inner side thereof, and fixed to the inner frame 340 by welding. The slide rail mechanism 440 that will be described later is attached to this extension portion 315. Since the slide rail mechanism 440 is attached to this extension portion that is enhanced in rigidity by bending, the side frame 310 can be stably supported by the slide rail mechanism 440.

Inner frames 340 (only one of which is shown in the drawing) extending in the frontward-rearward direction and each connected to the corresponding side frame 310 are provided, respectively, at laterally inner sides of the left and right side frames 310.

The inner frame 340 includes, similar to the third embodiment, a second sidewall portion 341 forming a side surface of the inner frame 340, a second flange portion 342 extending from a peripheral edge of the second sidewall portion 341 to a laterally inner side. A front end portion 343 that is a front-end-side portion of the inner frame 340 is formed to extend in the frontward-rearward direction, and directly joined by welding to the front end portion 313 of the side frame 310.

The inner frame 340 includes, besides the aforementioned front end portion 313, three bent portions 344, a first intermediate portion 345, a second intermediate portion 346, and a rear end portion 347; these portions 345, 346 and 347 are disposed laterally inward of the front end portion 313. The first intermediate portion 345 is connected to a rear end of the front end portion 313 via the bent portion 344, and thus disposed in a position shifted to the laterally inner side than that of the front end portion 313; the second intermediate portion 346 is connected to a rear end of the first intermediate portion 345 via the bent portion 344, and thus disposed in a position shifted to the laterally inner side than that of the first intermediate portion 345.

The rear end portion 347 is connected via the bent portion 344 to the rear end of the second intermediate portion 346, and thus disposed in a position shifted to the laterally inner side than that of the second intermediate portion 346. With this configuration, the rear end portion 347 of the inner frame 340 and the rear portion 314 of the side frame 310 are located in positions laterally separate from each other. The rear end portions 347 of the inner frames 340 are connected by a connecting beam 351 as one example of a connecting member. The connecting beam 351 illustrated herein is a tubular member with a generally rectangular cross section, extending in the lateral direction, and the both ends thereof are joined to the rear portions 314 of the left and right side frames 310.

The inner frames 340 are connected at rear end portions 347 in positions separate frontwardly from the connecting beam 351 by a connecting pipe 353 having a cylindrical shape which connects the left and right inner frames 340.

Connection of the inner frames 340 to the side frames 310 as described above serves to reinforce the side frames 310 by the inner frames 340, and thus can enhance the rigidity of the side frames 310. Also, since the inner frames 340 reinforcing the side frames 310 are disposed on laterally inner sides of the side frames 310, the car seat S can be downsized in the lateral direction in comparison, for example, with a configuration in which reinforcing members are provided on laterally outer sides of the side frames.

The inner frames 340 have bent portions 344, and thus assume three-dimensional shapes, which have a high rigidity. The left and right inner frames 340 are connected at the rear end portions 347 by the connecting beam 351 and the connecting pipe 353, and therefore twisting is suppressed, and an extremely high-rigidity structure is achieved.

Since the front end portions 313 of the side frame 310 and the front end portion 343 of the inner frame 340 are directly joined together, obstruction to the motion of a transmission mechanism 330 that will be described later, by a joint portion J between the side frame 310 and the inner frame 340 can be suppressed, in comparison, for example, with a configuration in which the rear end portions of the side frame and the inner frame are directly joined together, and thus the transmission mechanism 330 can be operated smoothly.

The side frame 310, the inner frame 340 and the connecting beam 351 are configured to have a triangular shape in a plan view, and thus have a high rigidity such that deformation is unlikely to occur in a horizontal plane. These members are also configured as plates extending generally vertically, and thus have a high rigidity such that deformation is unlikely to occur upward or downward as well.

The joint portion J provided by directly joining the front end portion 313 of the side frame 310 and the front end portion 343 of the inner frame 340 is, similar to the third embodiment, configured to have a closed-section structure (see FIG. 20). To be more specific, the joint portion J is configured with the front-end-side portions of the first sidewall portion 311 and the first flange portion 312 of the side frame 310, and the front-end-side portions of the second sidewall portion 341 and the second flange portion 342 of the inner frame 340 as described above, such that the front-end-side portion of the first flange portion 312 and the front-end-side portion of the second flange portion 342 are joined together by welding to form the closed-section structure.

Providing the joint portion J with a closed-section structure as described above makes it possible to increase the rigidity of the joint portion J, which increases the rigidity of the side frames 310.

Such a closed-section structure is, as shown in FIG. 32, applied to the seat back frame F2, as well. To be more specific, the seat back frame F2 includes an outside back frame F3 disposed at a laterally outer side, and an inside back frame F4 disposed at a laterally inner side; the outside back frame F3 includes a third sidewall portion F31 forming a side surface of the outside back frame F3, and a third flange portion F32 extending from a peripheral edge of the third sidewall portion F31 to a laterally inner side; the inside back frame F4 includes a fourth sidewall portion F41 forming a side surface of the inside back frame F4, and a fourth flange portion F42 extending from a peripheral edge of the fourth sidewall portion F41 to a laterally outer side. The flange portions F32, F42 are joined together by welding.

The seat back frame F2 having such a closed-section structure is disposed between the side frame 310 and the first transmission link 331.

Left and right joint portions J that are provided, respectively, for the left and right side frames 310 and the left and right inner frames 340 are connected by a laterally extending cylindrical connecting pipe 352. This configuration makes it possible to suppress twisting of the inner frames 340, to further increase the rigidity of the left and right joint portions J, and to further increase the rigidity of the side frames 310.

To lower sides of the side frame 310 and the inner frame 340, specifically in a position near the rear end of the joint portion J, a bracket 360 that laterally sandwiches and holds the side frame 310 and the inner frame 340 is joined by welding. The bracket 360 is an integral part including a base portion 361 having a shape of a plate extending in a direction perpendicular to the vertical direction from a laterally outer side position of the side frame 310 to a laterally inner side position of the inner frame 340, a first holding portion 362 extending from a front end of the base portion 361 upward to hold the joint portion J, and a second holding portion 363 extending from a rear end of the base portion 361 upward to hold a portion other than the joint portion J.

As shown in FIG. 20(a), the first holding portion 362 has a slot 362A having substantially the same width as the lateral width of the joint portion J, such that the joint portion J is held within the slot 362A, and both of left and right side edges of the slot 362A are welded to the joint portion J. As shown in FIG. 20(b), the second holding portion 363 has a slot 363A having substantially the same width as the length from an outer surface at a laterally outer side of the rear portion 314 of the side frame 310 to an inner surface at a laterally inner side of the first intermediate portion 345 of the inner frame 340, such that the rear portion 314 of the side frame 310 and the first intermediate portion 345 of the inner frame 340 are held within the slot 363A, and both of left and right side edges of the slot 363A are welded to the side frame 310 or the inner frame 340.

Provision of the bracket 360 configured as described above makes it possible to further improve the rigidity of the side frame 310. Moreover, since the bracket 360 includes the first holding portion 362 and the second holding portion 363 configured as an integral part, the number of parts can be reduced and an operation of mounting the bracket 360 can be simplified, in comparison, for example, with a configuration in which a bracket for holding a joint portion and a bracket for holding a portion other than the joint portion are provided separately.

Between the bracket 360 and the movable member 320, a spring SP for constantly biasing the movable member 320 is provided.

As shown in FIG. 31, two movable members 320 are provided, one to the left and the other to the right, each extending in the frontward-rearward direction; the pan frame 370 supporting the seat cushion pad is attached to these movable members 320. Each movable member 320 includes a base portion 320C having a shape of a plate extending substantially in a direction perpendicular to the upward-downward direction, and a sidewall portion 320D extending from a laterally outer side of the base portion 320C downward. An end portion of the base portion 320C at its laterally inner side is bent downward, whereby the rigidity of the base portion 320C can be increased.

At the front portions and the rear portions of the base portions 320C, a connecting rod 321 for connecting the front portions and a connecting frame 322 for connecting the rear portions are provided. Connection of the left and right movable members 320 established by the connecting rod 321 and the connecting frame 322 as described above makes it possible to increase the rigidity of the movable members 320.

The connecting rod 321 is formed to have a rigidity increased by bending several times a rod-shaped member made of metal, and the connecting frame 322 is formed generally into a shape of a letter U which opens to the front to have a rigidity increased by providing a substantially U-shaped cross section. Attachment holes 320A, 320B, 322A for attaching the pan frame 370 are formed in the left and right movable members 320 and the connecting frame 322, respectively. To be more specific, a circular attachment hole 320A is formed in the front portion of each movable member 320, and an elongate attachment hole 320B elongated in the frontward-rearward direction is formed in the rear portion of each movable member 320. Further, two circular attachment holes 322A are formed in the connecting frame 322 and arranged in positions separated in the lateral direction. In this arrangement, the left and right movable members 320 and the connecting frame 322 are formed with the attachment holes 320A, 320B, 322A; that is, the left and right movable members 320 and the connecting frame 322 are configured such that the pan frame 370 can be attached thereto, so that the pan frame 370 can be stably supported by each of the movable members 320 and the connecting frame 322.

Portions of the left and right movable members 320 in which the front attachment holes 320A are formed are portions to which the aforementioned connecting rod 321 are connected. With this configuration, the portions near the attachment holes 320A can be enhanced in rigidity, and the pan frame 370 can be stably supported by the movable members 320.

The base portion 320C and the sidewall portion 320D of the movable member 320 have cutaway recesses 320E formed therein. The cutaway recesses 320E are each configured as a clearance through which a nut N1 for attaching a slide rail mechanism 440 that will be described later to the side frame 310 via the bracket 360 is exposed to protrude upward. With this configuration, a tool can be fitted on the nut N1 from above through the cutaway recess 320 E, so that the operation of attachment of the bracket 360 and the slide rail mechanism 440 can be performed easily.

The cutaway recess 320E is formed in the movable member 320 between a first region 320F to which the front link 371 is attached and a second region 320G to which the rear link 372 is attached, in a position separate from the first region 320F and the second region 320G. The first region 320F is a region of the movable member 320 with which the front link 371 is in contact, and the second region 320G is a region of the movable member 320 with which the rear link 372 is in contact. Since the cutaway recess 320E is formed in a position separate from the first region 320F and the second region 320G, reduction of the rigidity of the portions of the movable member 320 to which the front link 371 and the rear link 372 are attached (the first region 320F and the second region 320G) by the cutaway recess 320E can be suppressed, so that the movable member 320 can be configured to have an increased rigidity.

The movable members 320 are supported by the left and right front links 371 and the left and right rear links 372 pivotally provided, respectively, on the left and right side frames 310, and thereby allowed to be moved frontward and rearward and tilted with respect to the side frames 310. The front link 371 is formed to extend from a laterally outer side to a laterally inner side of the front end portion 313 of the side frame 310, with one end portion thereof being pivotally connected to a laterally outer side of the front end portion 313 of the side frame 310, and the other end portion thereof being pivotally connected to the front side portion of the movable member 320 (specifically, to the sidewall portion 320D thereof). Configurations, arrangements and operations of the movable member 320, the front link 371, the rear link 372 and the transmission mechanism 330 are similar to those of the third embodiment, a detailed description thereof will be omitted herein (see FIGS. 21-24 and description made with reference thereto).

As shown in FIG. 33, each of the slide rail mechanisms 440 provided at the side frames 310, one on the front side and the other on the rear side, mainly includes a transverse rail 441, as one example of a rail member extending in the lateral direction, a transverse slider 442 formed to extend in the lateral direction and supported by the transverse rail 441 in such a manner as to be slidable in the lateral direction. The front and rear transverse sliders 442 are respectively attached directly or indirectly to the left and right side frames 310, and the front and rear transverse rails 442 are attached to the sliders of the front-rear slide rail mechanism (not shown).

To be more specific, the front transverse slider 442 is fixed by the bolt B1 and the nut N1 to the bracket 360 fixed to the side frame 310, and thus indirectly attached to the side frame 310. The rear transverse slider 442 is directly attached to the aforementioned extension portion 315 of the side frame 310 by the two pairs of the bolt B2 and the nut N2 as one example of a fastening member. One pair of the bolt B2 and the nut N2 and the other pair of the bolt B2 and the nut N2 are arranged in positions separated in the lateral direction. Since each bolt B2 and each nut N2 are provided in such a manner that the bolts B2 and the nuts N2 are arranged in the lateral direction, each bolt B2 and each nut N2 can be located easily within the front-rear width of the transverse slider 442 extending long in the lateral direction; therefore, the side frame 310 can be stably supported by the transverse rail 441 via the transverse slider 442.

Each bolt B2 and each nut N2 are disposed in positions separated from the rear portion 314 of the side frame 310 and the rear end portion 347 of the inner frame 340 between the rear portion 314 of the side frame 310 and the rear end portion 347 of the inner frame 340. In other words, the inner frame 340 is arranged to pass at the laterally inner side of each bolt B2 and each nut N2 so as not to overlap each bolt B2 and each nut N2 as viewed in the upward or downward direction, and is connected to the connecting beam 351. With this arrangement, the inner frame 340 can be rendered less obstructive to the fastening operation of each bolt B2 and each nut N2, so that the side frame 310 and the slide rail mechanism 440 can be attached easily. Since each bolt B2 and each nut N2 are provided by making use of space between the rear portion 314 of the side frame 310 and the rear end portion 347 of the inner frame 340, the space is utilized effectively, so that upsizing of the car seat S can be suppressed.

Since the inner frame 340 is configured such that the rear end portion 347 thereof is arranged in a position laterally inward of the second intermediate portion 346 frontward of the rear end portion 347 as described above, space between the rear portion 314 of the side frame 310 and the rear end portion 347 of the inner frame 340 can be increased, so that the fastening operation of each bolt B2 and each nut N2 can be rendered easier. The increase of space makes it possible to use larger parts as the bolts B2 and the nuts N2, and thus can increase the rigidity of the portions including the spots at which the bolts B2 and the nuts N2 are applied.

The first transmission link 331 is so arranged as not to overlap each bolt B2 and each nut N2 as viewed in the upward or downward direction. To be more specific, the first transmission link 331 is disposed separate from each bolt B2 and each nut N2 between the bolt B2 and the nut N2 on the right side and the bolt B2 and the nut N2 on the left side. This arrangement can make the first transmission link 331 less obstructive to the fastening operation of each bolt B2 and each nut N2, so that the side frame 310 and the slide rail mechanism 440 can be attached easily.

Although the fourth embodiment has been described above, the present embodiment may be practiced with appropriate modifications made thereto, as will be illustrated in describing the following other embodiments.

In the above-described embodiment, the bolts B2 and the nuts N2 are taken as an example of a fastening member, but the present invention is not limited thereto; for example, screws may be applied. The number of the fastening members is not limited to two as illustrated in the above embodiment; the number may be one, or may be not less than two.

In the above-described embodiment, the first transmission link 331 is connected to the movable member 320 via other member, but the present invention is not limited to this configuration; the first transmission link may be connected directly to the movable member.

In the above-described embodiment, the connecting member (connecting beam 351) is formed in a tubular shape having a generally rectangular cross section, but the present invention is not limited to this configuration; the connecting member may be formed, for example, in a cylindrical shape, or in a shape of a cylindrical column or a polygonal prism.

In the above-described embodiment, the movable member is formed of a member having a shape of a plate, but the present invention is not limited to this configuration; for example, the movable member may be formed of a rod-shaped member.

Fifth Embodiment

Next, a detailed description of a fifth embodiment will be given with reference made mainly to FIGS. 34 to 40. In the following description, first, a general setup of a car seat as one example of a vehicle seat will be briefly described, and then the features of the present embodiment will be described in detail.

Figure 34:
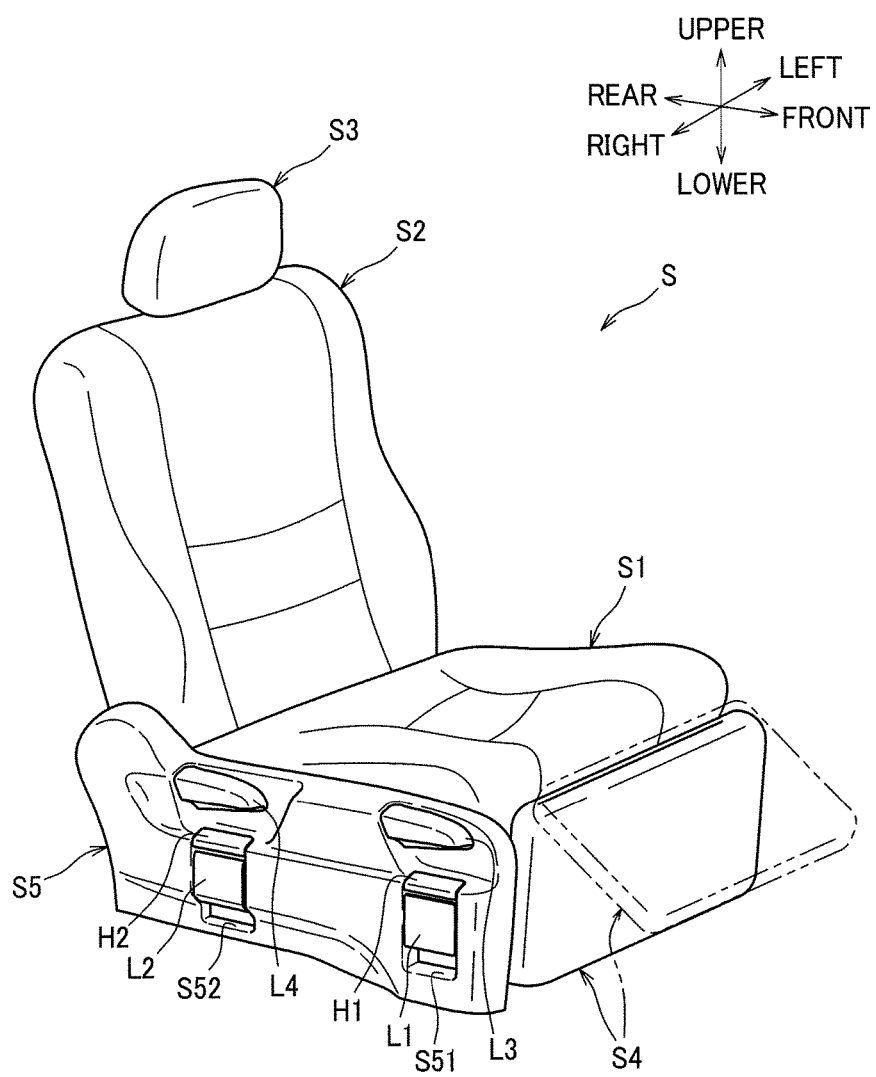
FIG. 34 is a perspective view of a car seat as a vehicle seat according to a fifth embodiment.

As shown in FIG. 34, a car seat S is a seat used as a backseat in the second row of an automobile having a large luggage room, such as a minivan, and is supported on a floor FL of a car CR schematically illustrated in FIG. 35(a), in such a manner that permits the seat to move frontward, rearward, leftward and rightward, via a front-rear slide mechanism and a lateral slide mechanism that are known in the art. The car seat S is movable between a position shown in FIG. 35(a) (hereinafter referred to as "OF position") and a position shown in FIG. 35(b) (hereinafter referred to as "OR position"). Hereupon, the OF position refers to a position outermost in the lateral direction and frontmost in the frontward-rearward direction in a range within which the car seat S is movable; the OR position refers to a position outermost in the lateral direction and rearmost in the frontward-rearward direction in the same range. When the car seat S is in the OF position, the lap of a side cover S5 that will be described later of the car seat S over a wheel house WH of the vehicle CR as viewed in the lateral direction measures a first lap LP1, and when the car seat S is in the OR position, the lap measures a second lap LP2 greater than the first lap LP1.

As shown in FIG. 34, the car seat S mainly includes a seat cushion S1, a seat back S2, a headrest S3, an ottoman S4, and a side cover S5.

The seat cushion S1 is configured such that the seat cushion frame F1 (see FIG. 36) is upholstered with a seat cushion pad made of a cushiony material such as urethane foam and an outer covering made of synthetic leather, fabric or the like, whereas the seat back S2 is configured such that the seat back frame F2 (see FIG. 36) is upholstered with a seat back pad made of a cushiony material such as urethane foam and an outer covering made of synthetic leather, fabric or the like.

The seat back S2 is rotatably connected to the seat cushion S1 via a known reclining mechanism. Thus, the seat back S2 can be tilted frontward and rearward with respect to the seat cushion S1.

The ottoman S4 is a cushion for supporting feet of an occupant, and configured to include a known frame (not shown), an ottoman cushion pad and an outer covering. The ottoman S4 is configured to be movable by a known ottoman actuator mechanism (not shown) between a support position (see chain double-dashed lines) in which the ottoman protrudes frontward beyond the seat cushion S1 to support feet of an occupant and a retracted position (see solid lines) that is below the support position.

The side cover S5 includes a first operation lever L1 for operating the ottoman S4, a second operation lever L2 for sliding the car seat S in the lateral direction, a third operation lever L3 for adjusting the height of the car seat S, and a fourth operation lever L4 for tilting the seat back S2.

As shown in FIGS. 35(a), (b), the first operation lever L1 is, irrespective of the position of the car seat S between the OF position and the OR position, so located as not to face the wheelhouse WH in the lateral direction. With this configuration, the wheelhouse WH is not obstructive to the operation of the first operation lever L1, so that the ease of use of the first operation lever L1 is ensured.

The second operation lever L2 is provided rearward of the first operation lever L1, and is located in such a position that it faces the wheelhouse WH in the lateral direction when the car seat S is in the OR position. Accordingly, in the OR position, the wheelhouse WH is obstructive to the operation of the second operation lever L2, so that the erroneous lateral sliding operation of the car seat S in the OR position can be suppressed.

Next, a detailed description will be given of the seat cushion frame F1, the first operation lever L1 and relevant components.

Figure 36:
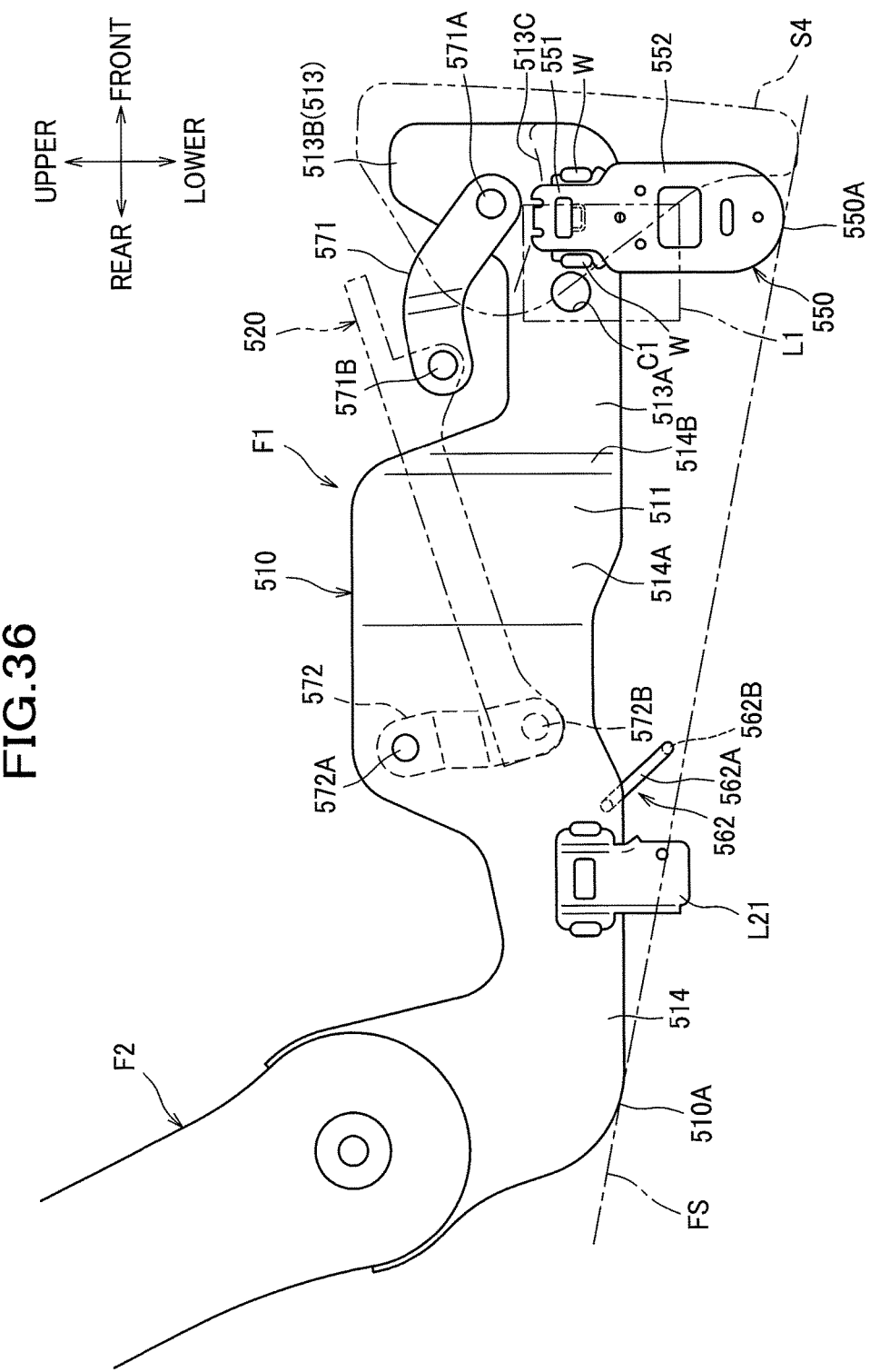
FIG. 36 is a side view of a seat cushion frame as viewed from outside in the lateral direction.
Figure 37:
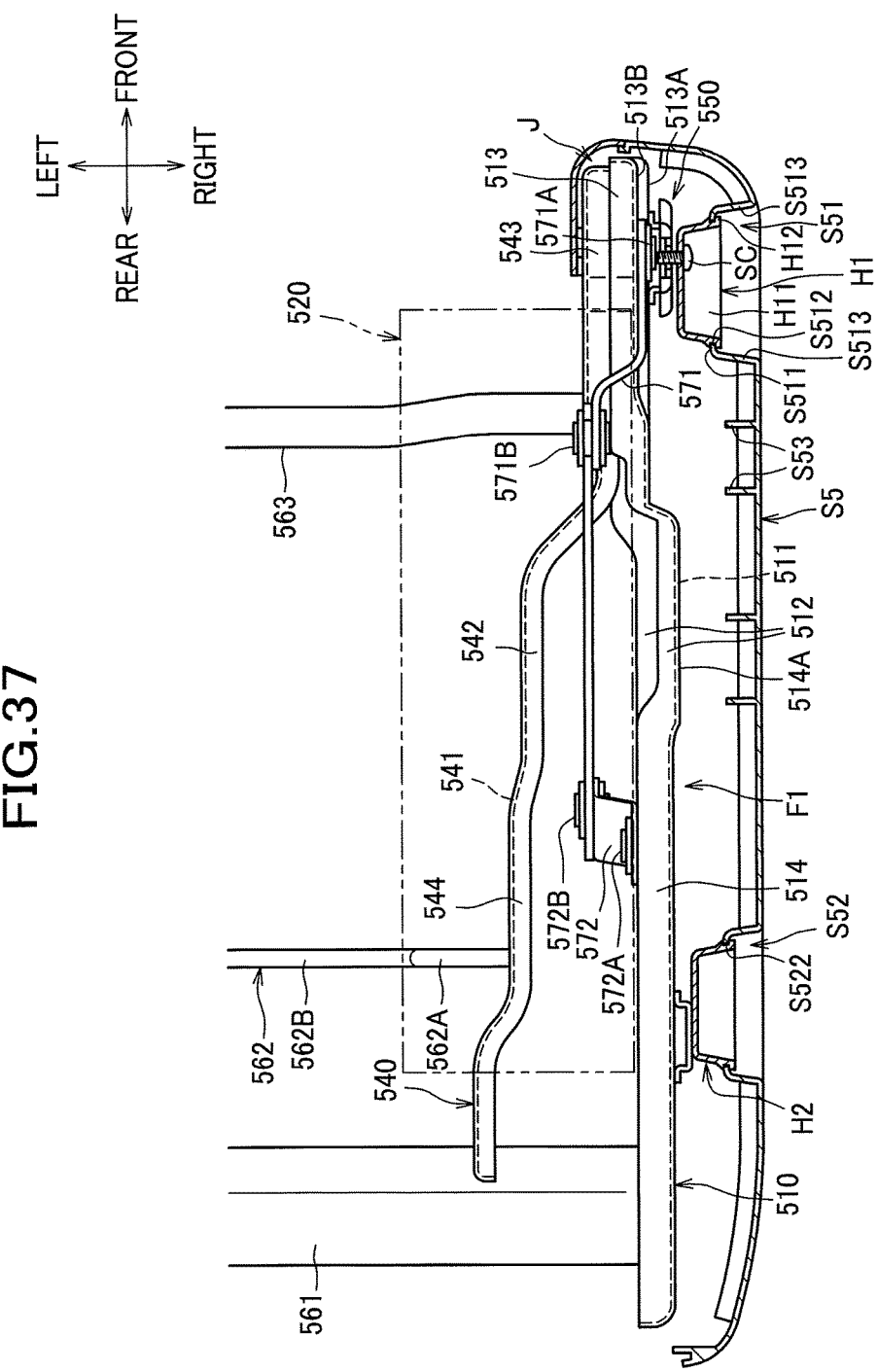
FIG. 37 is a plan view showing a right-side portion of the seat cushion frame.

As shown in FIGS. 36 and 37, the seat cushion frame F1 includes left and right side frames 510, and movable members 520 capable of making a frontward-rearward motion and a tilting motion with respect to the left and right side frames 510.

The left and right side frames 510 are metal frames extending in the frontward-rearward direction, and disposed in laterally separate positions. A side frame 510 includes a first sidewall portion 511 forming a side surface of the side frame 510, and a first flange portion 512 extending from a peripheral edge of the first sidewall portion 511 to a laterally inner side. A front end portion 513 that is a front-end-side portion of the side frame 510 is formed to extend in the frontward-rearward direction, and a rear side portion 514 that is a portion rearward of the front end portion 513 is formed to bend at a rear end of the front end portion 513 to a laterally outer side, and further bend to extend rearward.

To be more specific, the side frame 510 includes a first portion 514A formed on a front end side of the rear side portion 514 thereof and configured as a protrusion protruding toward a laterally outer side. This configuration makes it possible to increase the rigidity of the side frame 510. The first portion 514A is disposed in a position corresponding to a region between a first attachment hole S512 and a second attachment hole S522 formed in a side cover S5 that will be described later. This makes it possible to make good use of a space between the lever housings H1, H2 attached to the attachment holes S512, S522, respectively.

The front end portion 513 of the side frame 510 includes a second portion 513A disposed in a position frontward of the first portion 514A and laterally inward of the first portion 514A, and a third portion 513B disposed in a position upward of the second portion 513A and laterally inward of the second portion 513A. A first stepped portion 514B is formed between the first portion 514A and the second portion 513A; a second stepped portion 513C is formed between the second portion 513A and the third portion 513B.

Inner frames 540 extending in the frontward-rearward direction and each connected to the corresponding side frame 510 are provided, respectively, at laterally inner sides of the left and right side frames 510.

The inner frame 540 includes a second sidewall portion 541 forming a side surface of the inner frame 540, a second flange portion 542 extending from a peripheral edge of the second sidewall portion 541 to a laterally inner side. A front end portion 543 that is a front-end-side portion of the inner frame 540 is formed to extend in the frontward-rearward direction, and directly joined by welding to the front end portion 513 of the side frame 510.

The inner frame 540 includes a rear side portion 544 that is a portion rearward of the front end portion 543, which rear side portion is so formed as to bend at a rear end of the front end portion 543 to a laterally inner side, and further bend to extend rearward, and is disposed in a position separate laterally from the rear end portion 514 of the side frame. The rear end portion of the rear side portion 544 is indirectly joined to a rear end portion of the side frame 510 via a connecting beam 561. The connecting beam 561 is a tubular member with a generally rectangular cross section, extending in the lateral direction, and the both ends thereof are joined to the left and right side frames 510.

Since the inner frame 540 is connected to the side frame 510 as described above, the side frame 510 can be reinforced by the inner frame 540; therefore, the rigidity of the side frame 510 can be increased. Furthermore, since the inner frame 540 reinforcing the side frame 510 is disposed on the laterally inner side of the side frame 510, the car seat S can be downsized in the lateral direction in comparison, for example, with a configuration in which a reinforcing member is provided on an outer side of the side frame.

At the rear side portions 544 of the left and right inner frames 540, a wire member 562 as one example of a connecting member is provided, which is disposed between the left and right inner frame 540 and connected to the left and right inner frames 540. The wire member 562 is a wire with which hooks provided at an end of a rear side portion of an outer covering of the seat cushion S1 are engaged, and includes a pair of oblique portions 562A (only one of which is illustrated in the drawing) that extends obliquely in a laterally-inward-and-downward direction to protrude downward beyond the side frames 510, and a horizontal portion 562B that extends in the lateral direction and connects the lower ends of the pair of oblique portions 562A. Accordingly, part of the wire member 562, i.e., the horizontal portion 562B, is disposed in a position lower than the side frames 510. It is to be understood that the wire member 562 may hold a cable for actuating the seat.

Figure 38:
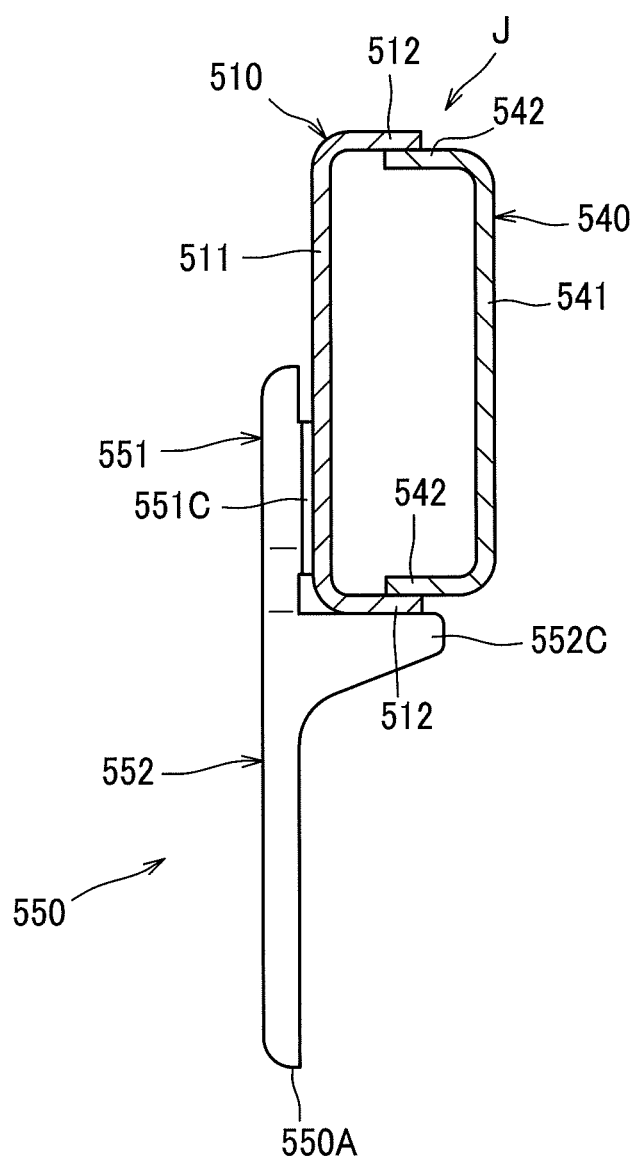
FIG. 38 is a sectional view showing a joint portion and a lever bracket.

A joint portion J provided by directly joining the front end portion 513 of the side frame 510 and the front end portion 543 of the inner frame 540 is, as shown in FIG. 38, configured to have a closed-section structure. To be more specific, the joint portion J is configured with the front-endside portions of the first sidewall portion 511 and the first flange portion 512 of the side frame 510, and the front-end-side portions of the second sidewall portion 541 and the second flange portion 542 of the inner frame 540 as described above, such that the front-end-side portion of the first flange portion 512 and the front-end-side portion of the second flange portion 542 are joined together by welding to form the closed-section structure.

To this joint portion J having a closed-section structure, a lever bracket 550 for attaching the first operation lever L1 to the side frame 510 is attached. With this configuration, the lever bracket 550 can be stably supported by the joint portion J with a high-rigidity closed-section structure. The lever bracket 550 will be described later in detail.

As shown in FIG. 37, left and right joint portions J provided, respectively, to the left and right pairs of the side frame 510 and the inner frame 540 are connected by a connecting pipe 563 having a cylindrical shape and extending in the lateral direction. With this arrangement, the left and right joint portions J can be further enhanced in rigidity, so that the rigidity of the side frames 510 can be increased.

As shown in FIGS. 36 and 37, the movable members 520 are members that support the seat cushion pad via a pan frame; two movable members are provided one to the left and the other to the right, each formed as an elongate plate extending in the frontward-rearward direction. Each movable member 520 is disposed in a position laterally inward of the side frame 510 and upward of the inner frame 540. With this configuration, interference of the movable member 520 with the side cover S5 can be suppressed.

To be more specific, each movable member 520 has a lateral width formed to extend from a position near a laterally inner edge of the side frame 510 to a position laterally inward of the inner frame 540. Furthermore, each movable member 520 has a longitudinal length formed to extend from a position near the front ends of the side frame 510 and the inner frame 540 to a to position near the rear ends of the side frame 510 and the inner frame 540. With this configuration, the clearance between the side frame 510 and the inner frame 540 can be covered by each movable member 520.

The left and right movable members 520 are allowed to be moved frontward and rearward and tilted with respect to the side frames 510, and connected to the seat back frame F2 via a transmission mechanism (not shown). With this configuration, the movable members 520 are allowed to be moved frontward and rearward and tilted in a manner coordinated with the tilting motion of the seat back frame F2.

To be more specific, the left and right movable members 520 are supported by left and right front links 571 and rear links 572 pivotally provided on the left and right side frames 510, respectively. The front link 571 has one end portion thereof pivotally connected to a laterally outer side of the front end portion 513 of the side frame 510 via a front-side fixed shaft 571A as one example of a connecting shaft, and the other end portion thereof pivotally connected to a front side portion of the movable member 520 via a front-side movable shaft 571B. The rear link 572 is disposed in a position rearward of the front link 571 and laterally inward of the side frame 510, and has one end portion thereof pivotally connected to the side frame 510 via a rear-side fixed shaft 572A, and the other end portion thereof pivotally connected to a rear side portion of the movable member 520 via a rear-side movable shaft 572B.

More specifically, the front link 571 and the rear link 572 are configured such that the front-side movable shaft 571B is located in a position shifted in an obliquely-upward-and-rearward direction from the front-side fixed shaft 571A, and the rear-side movable shaft 572B is located in a position lower than the rear-side fixed shaft 572A when the seat back S2 is in the reference position, i.e., raised at a predetermined angle.

To a portion of the side frame 510 under the front link 571, a lever bracket 550 is attached. Since the position of attachment of the lever bracket 550 is under the front link 571, the car seat S can be downsized in the lateral direction in comparison, for example, with a configuration in which the lever bracket and the link overlap as viewed from the lateral direction.

In particular, according to the present embodiment, it is under the front-side fixed shaft 571 that the lever bracket 550 is attached. With this configuration, a portion of the side frame 510 under the front-side fixed shaft 571A is enhanced in rigidity by the lever bracket 550, so that the front-side fixed shaft 571 of the front link 571 can be supported stably.

Moreover, the lever bracket 550 is attached to the second portion 513A located in a position laterally inward of the first portion 514A. With this configuration, the amount of protrusion of the lever bracket 550 to the laterally outer side beyond the first portion 514A can be restricted, so that upsizing of the car seat S in the lateral direction can be suppressed. In particular, according to the present embodiment, the position of the second portion 513A relative to the first portion 514A is set such that the lever bracket 550 is located on the laterally inner side of the first portion 514A, and thus the upsizing of the car seat S in the lateral direction can be further suppressed.

At a region of the side frame 510 between a spot for fixing the lever bracket 550 (weld W) and the front-side fixed shaft 571A, the aforementioned second stepped portion 513C is formed. Therefore, a region adjacent to the front-side fixed shaft 571 and a region adjacent to the spot for fixing the lever bracket 550 can be enhanced in rigidity by this second stepped portion 513C, so that the front-side fixed shaft 571A and the lever bracket 550 can be supported stably by the side frame 510.

The side frame 510 has a cable hole CB formed in a position shifted toward rearward of the lever bracket 550, so as to pass therethrough a cable CA (see FIG. 40) for transmitting a motion of the first operation lever L1 as operated, to the aforementioned ottoman actuator mechanism. This configuration makes it possible to simplify the structure and facilitate the operation of passing the cable CA through the cable hole CB, in comparison, for example, with a configuration in which the both of the lever bracket and the side frame have cable holes formed respectively.

Furthermore, the lever bracket 550 includes a narrow-width portion 551 adjacent to the cable hole CB in the frontward-rearward direction, and a wide-width portion 552 disposed in a position lower than the narrow-width portion 551 and having a width in the frontward-rearward direction wider than that of the narrow-width portion 551. With this configuration, with the narrow-width portion 551 adjacent to the cable hole CB in the frontward-rearward direction being formed to have a width narrower than that of the wide-width portion 552, the lower portion (wide-width portion 552) of the lever bracket 550 can be disposed in a position closer to the cable hole CB, in comparison, for example, with a configuration in which the lever bracket as a whole is formed to have a wide width, so that the structure of the first operation lever L1 to which the cable CA is attached can be made compact.

Figure 39:
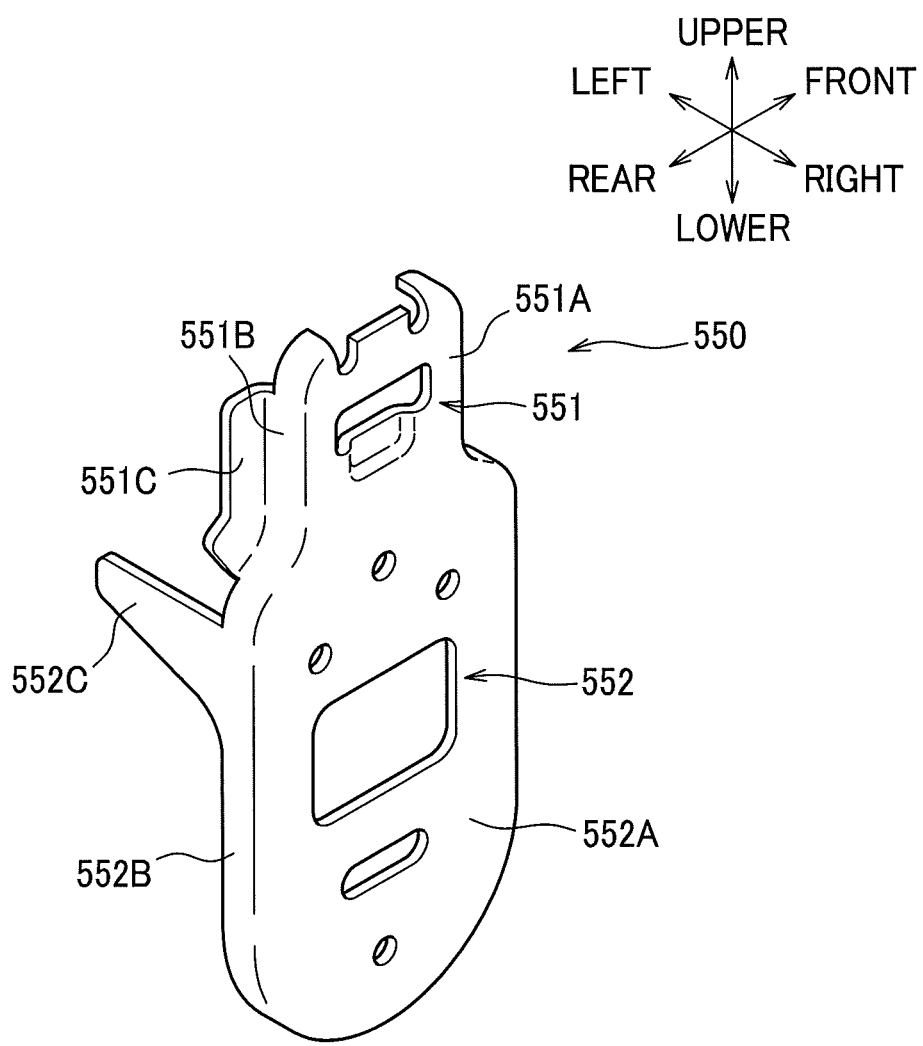
FIG. 39 is a perspective view showing the lever bracket.

To be more specific, as shown in FIG. 39, the narrow-width portion 551 of the lever bracket 550 includes a first wall portion 551A substantially perpendicular in the lateral direction, second wall portions 551B extending from left and right ends of the first wall portion 551A in a laterally inward direction, and third wall portions 551C extending from laterally inner edges of the second wall portions 551B in a laterally outward direction. The wide-width portion 552 includes a fourth wall portion 552A having a width wider than that of the first wall portion 551A, a fifth wall portion 552B extending peripherally from a peripheral edge of the fourth wall portion 552A toward inward, and protruding pieces 552C protruding from upper portions of the fifth wall portion 552B in the laterally inward direction.

As shown in FIG. 38, the lever bracket 550 is fixed to the side frame 510 securely with the third wall portion 551C of the narrow-width portion 551 being joined to the first sidewall portion 511 of the side frame 510 by welding. As shown in FIG. 36, a distance between the cable hole CB and the narrow-width portion 551 is determined so as not to allow the weld W at which the narrow-width portion 551 is joined to the side frame 510 to come in the cable hole CB. Accordingly, entry of the weld W into the cable hole CB, which would make the cable hole CB smaller, can be suppressed.

The lever bracket 550 fixed to the side frame 510 is so positioned that the wide-width portion 552 protrudes from the side frame 510 downward, with its lower end 550A being located in a position separate below from the side frame 510. With this configuration in which the lower end 550 of the lever bracket 550 is located in a position separate below from the side frame 510, the aforementioned horizontal portion 562B of the wire member 562 is located above a horizontal plane FS that is tangent to the lower end 550A of the lever bracket 550 and to the lower end 510A of the rear end portion of the side frame 510.

Accordingly, when the seat cushion frame F1 provided without the front-rear slide mechanism, the lateral slide mechanism, a bracket L21 for attaching the second operation lever L2 to the side frame 510 and other components attached thereto is put on the floor, the wire member 562 is prevented from coming in contact with the floor, so that deformation of the wire member 562 can be suppressed.

As shown in FIGS. 34 and 37, the side cover S5 is so provided as to cover the side frame 510 from a laterally outer side thereof, and has a first recessed portion S51 formed in a front-side lower portion thereof, and a second recessed portion S52 formed in a rear-side lower portion thereof, wherein the first operation lever L1 is attached to the first recessed portion S51 via a first lever housing H1, and the second operation lever L2 is attached to the second recessed portion S52 via a second lever housing H2. Since the configuration of the second recessed portion S52, the second operation lever L2 and the second lever housing H2 are substantially the same as that of the first recessed portion S51, the first operation lever L1 and the first lever housing H1, the following description focuses on the typifying configurations of the first recessed portion S51 and the others, and a description of the second recessed portion S52 and the others will be omitted.

The first recessed portion S51 is so formed as to be recessed from an outer surface of the side cover S5 toward a laterally inner side, with a bottom portion S511 thereof having a first attachment hole S512 piercing therethrough in the lateral direction. The first recessed portion S51 is configured to permit the first lever housing H1 to be mounted to the first attachment hole S512 from the laterally outer side thereof.

Since the side cover S5 is configured such that the first lever housing H1 can be mounted to the first attachment hole S512 of the side cover S5 from the laterally outer side, the first lever housing H1 can be attached to the side cover S5 after the side cover S5 is mounted to the side frame 510, and thus its mounting operation can be made easier, in contrast to a hitherto-known configuration in which a lever housing can be attached to an attachment hole of a side cover only from a laterally inner side. To elaborate, the configuration as hitherto known in the art in which the lever housing can be mounted to the attachment hole of the side cover only from the laterally inner side requires an operator to handle the side cover that is a large part, (i.e., carry it, align its attachment hole with the lever housing, and attach the same to the lever housing) after the lever housing is attached to the side frame, and thus makes the attaching operation cumbersome; however, the above-described configuration makes the attaching operation rather easy.

Since the first attachment hole S512 is formed in the bottom portion S511 of the first recessed portion S51, and the flange portion H12 of the first lever housing H1 can thus be incorporated in the first recessed portion S51, the flange portion H12 is prevented from protruding from the side cover S5, and an outer appearance of the side cover S5 can be improved.

A pair of opposed sidewall portions S513 of the first recessed portion S51 extending in the lateral direction are formed to gradually widen toward laterally outer ends. This configuration makes it easy to insert the bottom portion S511 of the first recessed portion S51 into the first lever housing H1, thus facilitating the operation of attaching the first lever housing H1.

On a back side of the side cover S5, a plurality of reinforcing ribs S53 protruding laterally inward from the back side are so formed as to extend in the upward-downward direction in positions between the first attachment hole S512 formed in the bottom portion S511 of the first recessed portion S51 and the second attachment hole S522 formed in the bottom portion of the second recessed portion S52. With this configuration, portions adjacent to each attachment hole S512, S522 can be enhanced in rigidity by the reinforcing ribs S53.

The first lever housing H1 includes a main body portion H11 so formed as to gradually narrow toward laterally inner end, and flange portions H12 protruding from laterally outer ends of the main body portion H11 outward in the frontward-rearward direction, to engage with laterally outer edges of the first attachment holes S512. The main body portion H11 is formed in the shape of a rectangular tube with a bottom and an opening that opens to a laterally outer side, wherein its bottom portion is fastened to the lever bracket 550 by a screw SC.

Figure 40:
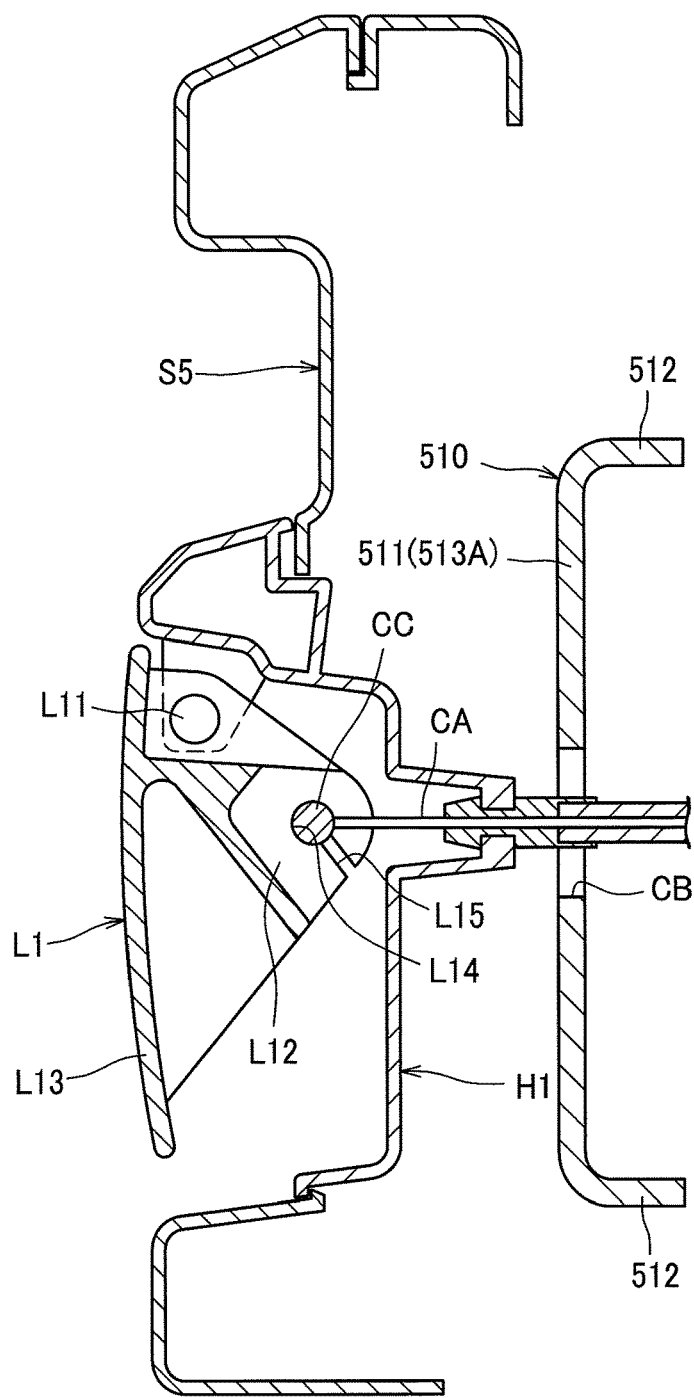
FIG. 40 is a sectional view showing a first operation lever and a cable.

As shown in FIG. 40, the first operation lever L1 supported to the first lever housing H1, rotatably about a rotary shaft L11. To be more specific, the first operation lever L1 includes a pair of front and rear support wall portions L12 configured to rotatably support a cylindrical columnar portion CC provided on a distal end of the cable CA, and an operation tab L13 held by an occupant.

One of the pair of support wall portions L12 has a support hole L14 rotatably supporting the cylindrical columnar portion CC and opening to a laterally outer side, and a slit L15 formed from the support hole L14 in an obliquely downward direction and piercing through the support wall portion L12 in the laterally inward and outward directions. The other of the support wall portions L12 (not shown) has formed a support recess in which the cylindrical columnar portion CC is rotatably supported in cooperation with the support hole L14.

When the cylindrical columnar portion CC at the distal end of the cable CA is attached to the pair of support wall portions L12, first the cylindrical columnar portion CC and the cable CA are passed through the support hole L14 and the slit L15 from the laterally outer side of the one of the support wall portions L12, and the cable CA is positioned inside the one of the support wall portion L12. Thereafter, the cable CA is turned relative to the first operation lever L1 to displace the orientations of the cable CA and the slit L15 relative to each other, so that the cable CA is disposed between the pair of support wall portions L12.

As shown in FIG. 36, the first operation lever L1 is disposed below the front link 571.

Although the fifth embodiment has been described above, the present embodiment may be practiced with appropriate modifications made thereto, as will be illustrated in describing the following other embodiments.

In the above-described embodiment, the front link 571 is located in a position laterally inward of the lever bracket 550 as shown in FIG. 37, but the present invention is not limited thereto; the front link may be located in a position laterally outward of the lever bracket. In this alternative, if the front link and the first operation lever are so arranged as to overlap each other as viewed from the lateral direction, the shape of the first operation lever is upsized toward the laterally outer side, which would upsizes the vehicle seat in the lateral direction; in this configuration, according to the present embodiment in which the first operation lever L1 is disposed below the front link 571, the vehicle seat S can be downsized in the lateral direction.

In the above-described embodiment, the movable member 520 is connected via the links 571, 572 to the side frame 510 and thereby configured to be able to be moved frontward and rearward and tilted with respect to the side frame 510, but the present invention is not limited to this configuration; the links may be omitted and the movable member may be fixed to the side frame. To be more specific, the movable member may be so faulted as to extend from the vicinity of the laterally inner edge of the side frame up to the laterally inward of the inner frame as in the above-described embodiment, and fixed to the side frame. By fixing the movable member to the side frame as with this configuration, the gap between the side frame and the inner frame can be covered by the movable member, and the rigidity of the attachment of the movable member to the side frame can be improved.

Based on the embodiments described above in detail, the following inventive concepts are disclosed herein.

A vehicle seat comprising a seat cushion, a seat back supported by the seat cushion, and a seat belt is disclosed wherein the seat back includes a belt guide configured to support the seat belt in a position corresponding to an upper end of a shoulder in a manner that permits the seat belt to be pulled out, wherein the seat cushion includes a pair of side frames disposed in laterally separate positions and extending in a frontward-rearward direction, and an inner frame provided at an inner side of one of the pair of side frames provided on a side on which the belt guide is provided, the inner frame being joined to the one of the side frames and extending in the frontward-rearward direction, and wherein the belt guide is disposed in a position such that at least part of the belt guide is in a region of which a lateral range is defined by a lateral range in which the one of the side frames and the inner frame are disposed.

With this configuration, first of all, the side frames can be enhanced in rigidity because the inner frame is provided at the inner side of at least one of the pair of side frames which inner frame is joined to the one of the side frames and extends in the frontward-rearward direction. Furthermore, even when a large tensile load is applied to the seat belt for example in a collision of the vehicle and a large force in a frontward or downward direction is imposed on the belt guide and transmitted to the seat cushion, this load can be received by the side frame and the inner frame of the seat cushion. In particular, with the above-described configuration in which the belt guide is disposed in a position such that at least part of the belt guide is disposed in a lateral range covered by the one of the side frames and the inner frame, the load received from the seat belt is directed toward a position between the side frame and the inner frame, and the seat back and the seat cushion is thus unlikely to be distorted so that the side frame and the inner frame can stably receive the load. Accordingly, the deformation of the seat cushion (specifically, the frame included in the seat cushion) can be suppressed.

In the above-described vehicle seat, the inner frame may preferably be bent with a rear side thereof shifted inward.

With this configuration, the inner frame is enhanced in rigidity, and the deformation of the seat cushion can be suppressed more effectively.

In the vehicle seat as described above, the inner frame may be provided to both of the left and right side frames, and a connecting member that connects the both inner frames may further be provided therein.

With this configuration, the deformation of the inner frame to the left or right direction is suppressed, and the inner frame is enhanced in rigidity, so that the deformation of the seat cushion can be suppressed more effectively.

In the vehicle seat as described above, the inner frame may be provided to both of the left and right side frames, and a connecting member that connects the both inner frames in a position rearward of a portion bent as mentioned above may further be provided therein.

With this configuration, besides the enhanced rigidity of the inner frame, the connection of rigidity-enhanced and less distant portions by the connecting member serves to suppress lateral deformation of the inner frame, thus materially increasing the rigidity of the inner frame. Accordingly, the deformation of the seat cushion can be suppressed further more effectively.

A vehicle seat comprising a seat cushion, a seat back supported by the seat cushion, and a seat belt is disclosed wherein the seat belt extends along the seat cushion under the seat cushion, the vehicle seat comprises: a slide rail mechanism configured to support the seat cushion in a manner that renders the seat cushion slidable therealong; and a cover member disposed between the slide rail mechanism and the seat belt under the seat cushion.

With this configuration, in which the cover member is disposed between the seat belt under the seat cushion and the slide rail mechanism, interference between the seat belt and the slide rail mechanism can be prevented. Accordingly, when the slide rail mechanism is actuated, the seat belt and the slide rail mechanism do not interfere with each other; also when the seat belt is pulled out or retracted, the slide rail mechanism and the seat belt do not interfere with each other. Accordingly, interference between the seat belt and the slide rail mechanism can be suppressed so that smooth operations of the seat belt and the slide rail mechanism can be realized and the service life of the seat belt can be increased.

In the vehicle seat as described above, the cover member may preferably have a protrusion formed on a surface of the cover member which faces the slide rail mechanism.

With this configuration, even when the cover member and the slide rail mechanism interfere with each other, the slide rail mechanism and the cover member contact only at an apex of the protrusion, so that the slide rail mechanism can be actuated relatively smoothly.

In the vehicle seat as described above, the protrusion may preferably extend long along a longitudinal direction of the slide rail mechanism.

With this configuration, even when the slide rail mechanism and the cover member interfere with each other, the slide rail mechanism can be actuated smoothly.

The vehicle seat as described above may be further configured to comprise a rod-shaped member supported on the rear end portion of the side frame, the rod-shaped member extending in a lateral direction, wherein the seat belt under the seat cushion and the cover member extend long in a frontward-rearward direction, and wherein the cover member includes a rear end portion having an opening that opens rearward, the opening being engaged with the rod-shaped member.

With this configuration, the rear end portion of the cover member can be stably supported.

This vehicle seat may be configured such that the seat belt is looped around the rod-shaped member, and routed from under the seat cushion upward.

With this configuration, in which the cover member is supported by the member for guiding the routing of the seat belt, the number of parts can thus be reduced.

In the vehicle seat as described above, preferably, a second cover member may be provided under the seat belt under the seat cushion.

With this second cover member provided under the seat belt, the seat belt can be further protected.

In the vehicle seat with this second cover member, preferably, the second cover member includes a rear end portion having an opening that opens rearward, the opening being engaged with the rod-shaped member.

With this configuration, the rear end of the second cover member can be stably supported.

The vehicle seat with the second cover member may preferably be configured such that fixing portions for attaching the cover member and the second cover member are provided, respectively, in the cover member and the second cover member, and the protrusion is provided between the fixing portions and the rod-shaped member.

With this configuration in which the cover member and the second cover member are supported by the fixing portions located in a position frontward of the protrusion and the rod-shaped portion located in a position rearward of the protrusion, these members are supported stably, so that when the slide rail mechanism interferes with the protrusion of the cover member, the protrusion and the slide rail mechanism can slide stably.

A vehicle seat comprising: a seat frame; a cable provided at the seat frame, the cable including a wire and a sheath covering and holding the wire in a manner that renders the wire movable therein; and a guide configured to hold the sheath is disclosed wherein the guide has a pair of openings provided in positions separate in a direction of extension of the sheath held by the guide, the sheath being disposed through the pair of openings, the guide being configured to be capable of guiding the sheath moving along a path connecting the pair of openings.

With this configuration, the sheath is not fixed by the guide and rendered movable relative to the guide; therefore, when the seat frame is moved, the sheath is not pulled by the guide. Accordingly, the seat frame can be slid with ease. In addition, as the sheath is not pulled by the guide, undesirable deformation of the sheath can be suppressed.

The vehicle seat as described above may further comprise a base portion, a first rail fixed to the base portion, and a first slider configured to be engageable with and slidable along the first rail, the first slider being fixed to the seat frame, wherein the aforementioned guide is provided at the base portion or the first rail.

With this configuration, even when the seat frame is slidable with respect to the base portion, the sheath is movable while being guided by the guide, the sheath is therefore not pulled by the guide, and the seat frame can be slid easily. Furthermore, in this operation, the deformation of the sheath otherwise being pulled by the guide can be suppressed.

In this configuration, the base portion may be configured to include a second rail extending in a direction intersecting with the first rail, and a second slider slidably engageable with the second rail, the first rail being fixed to the second slider, such that the guide is fixed to the second slider or the first rail.

Although the seat frame moving in the direction of extension of the second rail may cause the sheath to catch in the guide, the guide if provided at the second slider or the first rail as described above moves together with the seat frame and the sheath, so that the sheath is not pulled by the guide. Accordingly, the seat frame can be slid easily. Furthermore, in this operation, the deformation of the sheath otherwise catching in the guide can be suppressed.

In the configuration with the guide provided in the second slider, preferably, the second slider may include a narrow-width portion and a wide-width portion having a width wider than that of the narrow-width portion, wherein the guide is provided at the wide-width portion.

With this configuration, the guide is provided at a high-rigidity portion of the second slider, and thus the guide can be supported stably.

In the vehicle seat as described above, the guide may preferably be configured to be rotatable relative to the seat frame about an axis perpendicular to the path connecting the pair of openings.

With this configuration, the guide is rendered rotatable, and thus the movable range of the sheath is increased, so that the deformation of the sheath can be suppressed.

In the vehicle seat as described above, the guide may preferably be formed in a cylindrical shape of which two ends provide the aforementioned pair of openings.

With this configuration, the movement of the sheath is guided by the inner cylindrical surface, and thus the sheath is easily movable.

In the vehicle seat as described above, preferably, the seat frame may comprise a pair of side frames opposed to each other in the lateral direction, and a connecting member connecting the pair of side frames, wherein the guide is disposed in a position shifted from the connecting member in a frontward or rearward direction.

With this configuration, when the guide is mounted, the connecting member will not become an obstacle, so that the operation of mounting the guide can be performed easily.

A vehicle seat comprising: left and right side frames that constitute left and right frames of a seat cushion; and a lateral slide mechanism configured to support the side frames in a manner that renders the side frames movable in a lateral direction is disclosed wherein the lateral slide mechanism is attached to an extension portion formed by bending a rear portion of a side frame inward in the lateral direction, the extension portion extending inward in the lateral direction from the rear portion of the side frame.

With this configuration, the rear portion of the side frame can be enhanced by bending the rear portion of the side frame. Moreover, the lateral slide mechanism is attached to the extension portion enhanced in rigidity by bending, and thus the side frame can be stably supported by the lateral slide mechanism.

In the above-described configuration, the lateral slide mechanism may be configured to comprise a rail member extending in a lateral direction, and a slider laterally movably supported by the rail member, such that the aforementioned extension portion is attached to the slider by a plurality of fastening members arranged in the lateral direction.

With this configuration, in which the fastening members are arranged in the lateral direction, the fastening members can be easily arranged within the width in the frontward-rearward direction of the laterally elongate rail member; therefore, the side frame can be supported stably by the rail member through the slider.

In the above-described configuration with an inner frame provided at a laterally inner side of the side frame, extending in the frontward-rearward direction, and joined to the side frame, as well as a connecting member connecting the rear end portions of the left and right side frames, the inner frame may be joined to the connecting member so as not to overlap the fastening member as viewed from an upward or downward direction.

With this configuration, the inner frame can be rendered less obstructive to the fastening operation of the fastening member, so that the side frame and the lateral slide mechanism can be attached easily.

In the above-described configuration, where the rear portion of the side frame and the rear portion of the inner frame are disposed separately from each other in the lateral direction, the plurality of fastening members may be arranged between the rear portion of the side frame and the rear portion of the inner frame.

With this configuration, the space between the rear portion of the side frame and the rear portion of the inner frame is utilized to provide the fastening members; such effective use of the space contributes to suppression of upsizing of the vehicle seat.

In the above-described configuration, the rear portion of the inner frame may be disposed in a position shifted laterally inward of a middle portion that is located in a position frontward of the rear portion.

With this configuration, in which the rear portion of the inner frame is disposed in a position shifted laterally inward of the middle portion thereof, the space between the rear portion of the side frame and the rear portion of the inner frame can be broadened, so that the fastening operation for the fastening members can be made easier, and the operation of mounting the side frame and the lateral slide mechanism can be made easier. Moreover, the broadening of the space makes it possible to adopt larger-sized parts for the fastening members, and thus the rigidity of the side frame on and around the fastening members can be increased.

In the above-described configuration where a movable member movable relative to the side frame and a transmission member having one end connected to the seat back frame constituting the seat back and another end directly or indirectly connected to the movable member to transmit a tilting motion of the seat back to the movable member are provided therein, the transmission member may be arranged so as not to overlap the fastening member as viewed from an upward or downward direction.

With this configuration, transmission member can be rendered less obstructive to the fastening operation of the fastening member, so that the side frame and the lateral slide mechanism can be attached easily.

A vehicle seat is disclosed which comprises: left and right side frames that constitute left and right frames of a seat cushion; a movable member configured to be movable relative to the side frames by being supported by the side frames via a plurality of links; an ottoman configured to be movable between a support position in which the ottoman protrudes frontward beyond the seat cushion to support feet of an occupant and a retracted position that is below the support position; an operation lever configured to be manipulated to operate the ottoman; and a lever bracket provided to attach the operation lever to a side frame, wherein the lever bracket is disposed below one of the plurality of links and attached to the side frame.

With this configuration, the vehicle seat can be downsized in the lateral direction, for example, in comparison with a configuration in which the lever bracket and the link overlap as viewed from the lateral direction.

In the above-described configuration, where a wire member which is provided between the left and right side frames and part of which is disposed in a position lower than the side frame, the part of the wire member may be disposed in a position higher than a plane tangent to a lower end of a rear end portion of the side frame and a lower end of the lever bracket.

With this configuration, when the seat frame in a state prior to attachment of the slide mechanisms for sliding the seat in a frontward-rearward and lateral (leftward-rightward) directions, or the like is placed on the floor, the wire member does not get in contact with the floor, so that deformation of the wire member can be suppressed.

In the above-described configuration, where an inner frame extending in a frontward-rearward direction and joined to the side frame is provided at a laterally inner side of the side frame, the lever bracket may be attached to a joint portion at which the inner frame is joined to the side frame.

With this configuration, the lever bracket can be stably supported by the high-rigidity joint portion.

In the above-described configuration, the joint portion may include a first sidewall portion forming a side surface of the side frame, a first flange portion extending from a peripheral edge of the first sidewall portion to a laterally inner side, a second sidewall portion forming a side surface of the inner frame, and a second flange portion extending from a peripheral edge of the second sidewall portion to a laterally outer side, wherein the first flange portion and the second flange portion are joined to each other.

With this configuration, the joint portion has a closed-section structure, and thus the rigidity of the joint portion can be increased, and the lever bracket can be supported by the side frame more stably.

In the above-described configuration, a hole for a cable which is configured to allow a cable attached to the operation lever to pass therethrough may be formed in the side frame at a position shifted from the lever bracket.

With this configuration, the structure can be simplified, for example, in comparison with a configuration in which holes for a cable are formed on both of the lever bracket and the side frame; therefore, the operation of passing the cable through the hole for a cable can be made easier.

In the above-described configuration, the lever bracket may be attached under a joint shaft by which the one of the links is attached to the side frame.

With this configuration, a region of the side frame under the joint shaft is enhanced in rigidity by the lever bracket, so that the joint shaft for the link can be supported stably.

In the above-described configuration, the side frame may have a stepped shape formed between a fixing spot thereof at which the lever bracket is fixed and the joint shaft.

With this configuration, a region adjacent to the joint shaft and a region adjacent to the fixing spot at which the lever bracket is fixed can be enhanced in rigidity by the stepped shape, and thus the joint shaft and the lever bracket can be supported more stably.

In the above-described configuration, the lever bracket may have a narrow-width portion disposed adjacent to the hole for a cable in the frontward-rearward direction, and a wide-width portion disposed in a position lower than the narrow-width portion, the wide-width portion having a width in the frontward-rearward direction wider than that of the narrow-width portion.

With this configuration, with the narrow-width portion adjacent to the hole for a cable in the frontward-rearward direction being formed with a width narrower than that of the wide-width portion, the lever bracket can be located in a position closer to the hole for a cable, for example, in comparison with a configuration in which the lever bracket as a whole is formed to have a wide width, so that the operation lever structure can be made compact.

In the above-described configuration, the side frame may be configured to include a first region and a second region disposed in a position laterally inward of the first region, wherein the lever bracket is attached to the second region.

With this configuration, an amount (length) of laterally outward protrusion of the lever bracket from the first region can be suppressed, so that lateral upsizing of the vehicle seat can be suppressed.

In the above-described configuration, where a side cover configured to cover the side frame from laterally outer side and a lever housing configured to support the operation lever and attached to an attachment hole formed in the side cover, the lever housing may be configured to be mountable from laterally outer side to the attachment hole of the side cover.

With this configuration, the lever housing can be attached to the side cover after the side cover is mounted to the side frame, in contrast, for example, to a configuration in which the lever housing cannot be mounted to the side cover unless the lever housing is mounted from laterally inner side; therefore, the operation of attachment of the lever housing to the side cover can be made easier.

In the above-described configuration, the operation lever may be disposed under the link.

With this configuration, although for example in a configuration where the link is disposed in a position laterally outer side of the lever bracket, the link and the operation lever disposed to overlap each other as viewed from the lateral direction would result in upsizing of the operation lever toward the laterally outer side, which in turn upsizes the vehicle seat in the lateral direction, the operation lever disposed under the link in the same configuration can result in downsizing of the vehicle seat in the lateral direction.

In the above-described embodiments, the car seat S for use in an automobile is illustrated by way of example of a vehicle seat, but the present invention is not limited to this configuration, and may be applicable to other vehicle seats, for example, any seat for use in vehicles other than automobiles, ships and aircrafts.

The invention claimed is:

1. A vehicle seat comprising
a seat cushion;
a seat back supported by the seat cushion; and
a seat belt,
wherein the seat back includes a belt guide configured to support the seat belt in a position corresponding to an upper end of a shoulder in a manner that permits the seat belt to be pulled out,
wherein the seat cushion includes a pair of side frames disposed in laterally separate positions and extending in a front-rear direction, and an inner frame provided at an inner side of one of the pair of side frames provided on a side on which the belt guide is provided, the inner frame extending in the front-rear direction and including a front portion and a rear portion, the front portion being joined to the one of the side frames, the rear portion being separated from the one of the pair of side frames, with space between the rear portion of the inner frame and the one of the pair of side frames increasing with distance from the front portion of the inner frame toward rearward, and
wherein the belt guide is disposed in a position such that at least part of the belt guide is in a region of which a lateral range is defined by a lateral range in which the one of the side frames and the inner frame are disposed.

2. The vehicle seat according to claim 1, wherein the rear portion of the inner frame includes a plurality of bent portions that are bent with a rear side thereof shifted inward.

3. A vehicle seat comprising:
a seat cushion;
a seat back supported by the seat cushion; and
a seat belt,
wherein the seat back includes a belt guide configured to support the seat belt in a position corresponding to an upper end of a shoulder in a manner that permits the seat belt to be pulled out,
wherein the seat cushion includes a pair of side frames disposed in laterally separate positions and extending in a front-rear direction, and an inner frame provided at an inner side of one of the pair of side frames provided on a side on which the belt guide is provided, the inner frame being joined to the one of the side frames and extending in the front-rear direction,
wherein rear portions of the pair of side frames are joined via a connecting beam extending in a lateral direction,
wherein the inner frame includes a front-end portion joined to the one of the pair of side frames to form a closed-section structure together with the one of the pair of side frames, and a rear-end portion joined to the connecting beam in a position inwardly separate from the one of the pair of side frames, and
wherein the belt guide is disposed in a position such that at least part of the belt guide is in a region of which a lateral range is defined by a lateral range in which the one of the side frames and the inner frame are disposed.

4. The vehicle seat according to claim 3, wherein the seat cushion includes a movable member capable of making a frontward-rearward motion and a tilting motion with respect to the pair of side frames, and a transmission mechanism connected to the movable member and the seat back to transmit tilting motion of the seat back to the movable member, and
wherein part of the transmission mechanism is disposed between the one of the pair of side frames and the inner frame in the lateral direction.

5. A vehicle seat comprising
a seat cushion;
a seat back supported by the seat cushion; and
a seat belt,
wherein the seat back includes a belt guide configured to support the seat belt in a position corresponding to an upper end of a shoulder in a manner that permits the seat belt to be pulled out,
wherein the seat cushion includes a pair of side frames disposed in laterally separate positions and extending in a front-rear direction, and a pair of inner frames provided at inner sides of the pair of side frames, each inner frame extending in the front-rear direction and including a front portion and a rear portion, the front portion being joined to a corresponding side frame, the rear portion being separated from the corresponding side frame, with space between the rear portion of the inner frame and the corresponding side frame increasing with distance from the front portion of the inner frame toward rearward,
wherein the belt guide is disposed in a position such that at least part of the belt guide is in a region of which a lateral range is defined by a lateral range in which one of the inner frames and the corresponding side frame are disposed, and
wherein the vehicle seat further comprises a connecting member that connects the pair of inner frames.

6. The vehicle seat according to claim 5, wherein the rear portion of each inner frame includes a plurality of bent portions that are bent with a rear side thereof shifted inward.

7. The vehicle seat according to claim 6, wherein the connecting member connects the rear portions of the pair of inner frames at positions thereof rearward of the plurality of bent portions.

* * * * *